(12) United States Patent
Hsieh et al.

(10) Patent No.: US 10,613,297 B2
(45) Date of Patent: Apr. 7, 2020

(54) IMAGE CAPTURING ASSEMBLY, IMAGING APPARATUS AND ELECTRONIC DEVICE

(71) Applicant: LARGAN PRECISION CO., LTD., Taichung (TW)

(72) Inventors: Tung-Yi Hsieh, Taichung (TW); Cheng-Chen Lin, Taichung (TW); Chun-Che Hsueh, Taichung (TW); Chun-Yen Chen, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 106 days.

(21) Appl. No.: 15/677,126

(22) Filed: Aug. 15, 2017

(65) Prior Publication Data
US 2018/0188496 A1    Jul. 5, 2018

(30) Foreign Application Priority Data

Dec. 29, 2016   (TW) .............................. 105143962 A

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
USPC ................................. 359/713, 756, 757, 658
See application file for complete search history.

(56) References Cited

U.S. PATENT DOCUMENTS

| | | | | |
|---|---|---|---|---|
| 4,093,348 A | * | 6/1978 | Yasukuni | G02B 9/34 359/739 |
| 4,303,313 A | * | 12/1981 | Imai | G02B 13/02 359/747 |
| 5,798,869 A | * | 8/1998 | Watanabe | G02B 21/33 359/656 |
| 8,335,043 B2 | | 12/2012 | Huang | |
| 8,385,006 B2 | | 2/2013 | Tsai et al. | |
| 8,854,745 B1 | | 10/2014 | Chen | |
| 8,867,149 B2 | | 10/2014 | Hsu et al. | |
| 8,891,177 B2 | | 11/2014 | Huang | |
| 2013/0242362 A1 | | 9/2013 | Nakayama et al. | |
| 2014/0111876 A1 | * | 4/2014 | Tang | G02B 13/0045 359/757 |
| 2014/0254029 A1 | * | 9/2014 | Hsu | G02B 5/005 359/713 |

(Continued)

FOREIGN PATENT DOCUMENTS

JP     2004-354572 A    12/2004
JP     2015-176002 A    10/2015

*Primary Examiner* — Travis S Fissel
(74) *Attorney, Agent, or Firm* — McClure, Qualey & Rodack, LLP

(57) ABSTRACT

An image capturing assembly includes six lens elements, the six lens elements being, in order from an object side to an image side, a first lens element, a second lens element, a third lens element, a fourth lens element, a fifth lens element and a sixth lens element. The first lens element has positive refractive power. The fourth lens element with positive refractive power has an image-side surface being convex. The fifth lens element has an image-side surface being concave. The sixth lens element has an image-side surface being concave, wherein the image-side surface of the sixth lens element includes at least one inflection point.

31 Claims, 31 Drawing Sheets

(56) References Cited

U.S. PATENT DOCUMENTS

2015/0109692 A1    4/2015  Son
2015/0168686 A1    6/2015  Nishihata et al.
2015/0338611 A1*  11/2015  Jung .................. G02B 13/0045
                                                          359/713

* cited by examiner

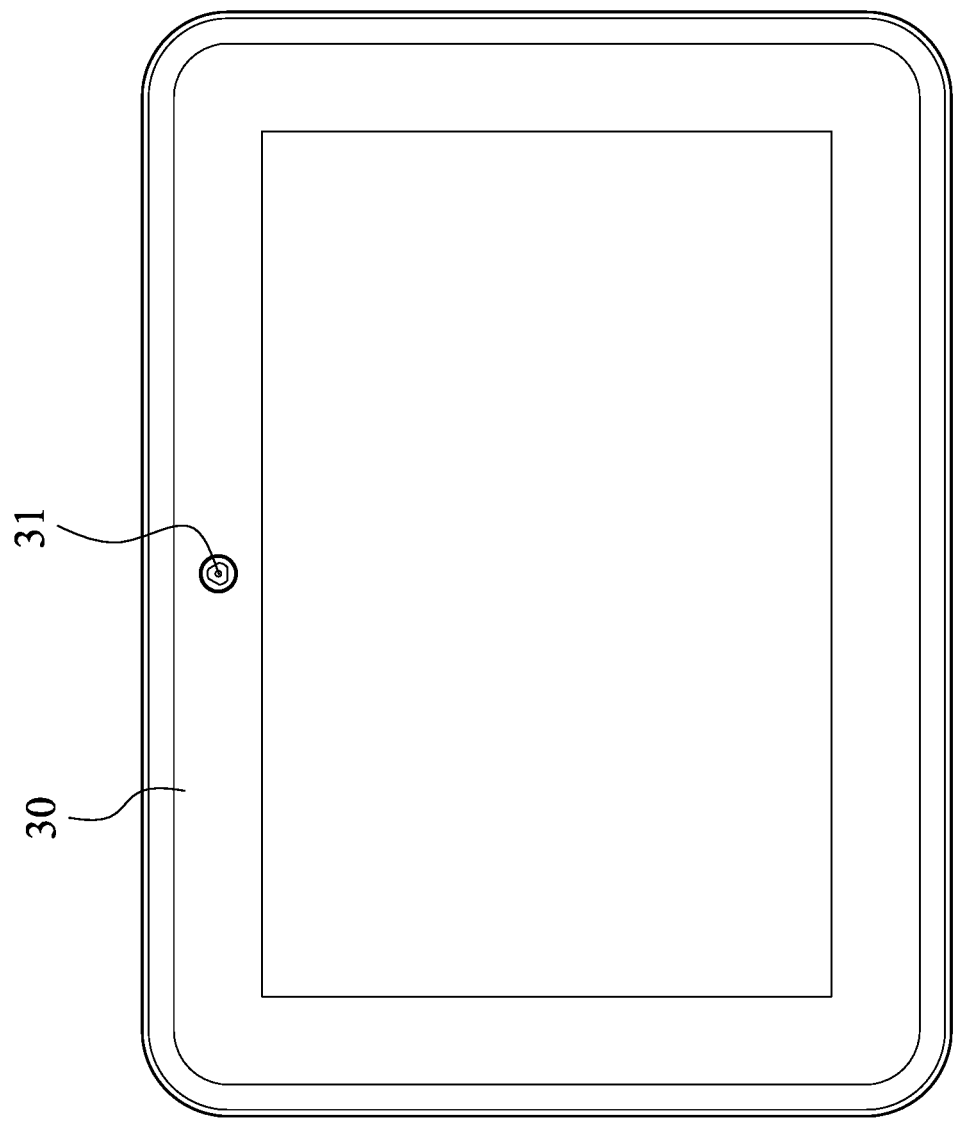

IMAGE CAPTURING ASSEMBLY, IMAGING APPARATUS AND ELECTRONIC DEVICE

RELATED APPLICATIONS

This application claims priority to Taiwan Application Serial Number 105143962, filed Dec. 29, 2016, which is herein incorporated by reference.

BACKGROUND

Technical Field

The present disclosure relates to an image capturing assembly and an imaging apparatus. More particularly, the present disclosure relates to an image capturing assembly and an imaging apparatus with a compact size applicable to electronic devices.

Description of Related Art

With the wider application of photographing modules, installing photographing modules in various smart electronic devices, portables, mobile devices, recognition devices, entertainment systems, sporting devices and smart home assisting systems is becoming a major trend in developments for the future technology, especially portables which are in high public demands. In order to obtain more extensive experiences in utilizations, smart devices with one, two or more than three lens assemblies are becoming the market mainstream, and various photographing modules with different features are developed in response to different demands.

However, the size of lens assemblies being hard to reduce and miniaturize is a problem in general for photographing modules, which is a characteristic unfavorable for requirements of portables. Thus, conventional optical systems cannot satisfy the developing trend of current technology.

SUMMARY

According to one aspect of the present disclosure, an image capturing assembly includes six lens elements, the six lens elements being, in order from an object side to an image side, a first lens element, a second lens element, a third lens element, a fourth lens element, a fifth lens element and a sixth lens element. The first lens element has positive refractive power. The fourth lens element with positive refractive power has an image-side surface being convex. The fifth lens element has an image-side surface being concave. The sixth lens element has an image-side surface being concave, wherein the image-side surface of the sixth lens element includes at least one inflection point. When an Abbe number of the second lens element is V2, an Abbe number of the third lens element is V3, an Abbe number of the fifth lens element is V5, a focal length of the image capturing assembly is f, a central thickness of the third lens element is CT3, a focal length of the first lens element is f1, and a focal length of the third lens element is f3, the following conditions are satisfied:

$30.0 < V2 + V3 + V5 < 90.0;$ $1.50 < f/CT3 < 9.0;$ and $-1.0 < f1/f3 < 0.40.$

According to another aspect of the present disclosure, an imaging apparatus includes the image capturing assembly of the aforementioned aspect, a driving apparatus and an image sensor, wherein the driving apparatus is connected to the image capturing assembly, and the image sensor is disposed on an image surface of the image capturing assembly.

According to another aspect of the present disclosure, an electronic device includes the imaging apparatus of the aforementioned aspect.

According to one aspect of the present disclosure, an image capturing assembly includes six lens elements, the six lens elements being, in order from an object side to an image side, a first lens element, a second lens element, a third lens element, a fourth lens element, a fifth lens element and a sixth lens element. The first lens element has positive refractive power. The fourth lens element with positive refractive power has an image-side surface being convex. The fifth lens element has an object-side surface being convex. The sixth lens element has an image-side surface being concave, wherein the image-side surface of the sixth lens element includes at least one inflection point. When an Abbe number of the second lens element is V2, an Abbe number of the third lens element is V3, an Abbe number of the fifth lens element is V5, a central thickness of the first lens element is CT1, a central thickness of the third lens element is CT3, a focal length of the image capturing assembly is f, and a focal length of the third lens element is f3, the following conditions are satisfied:

$30.0 < V2 + V3 + V5 < 90.0;$ $0.15 < CT1/CT3 < 1.50;$ and $-1.80 < f/f3 < 0.25.$

BRIEF DESCRIPTION OF THE DRAWINGS

The present disclosure can be more fully understood by reading the following detailed description of the embodiment, with reference made to the accompanying drawings as follows:

FIG. 28 is a schematic view of an electronic device according to the 15th embodiment of the present disclosure.

DETAILED DESCRIPTION

Figure 1:
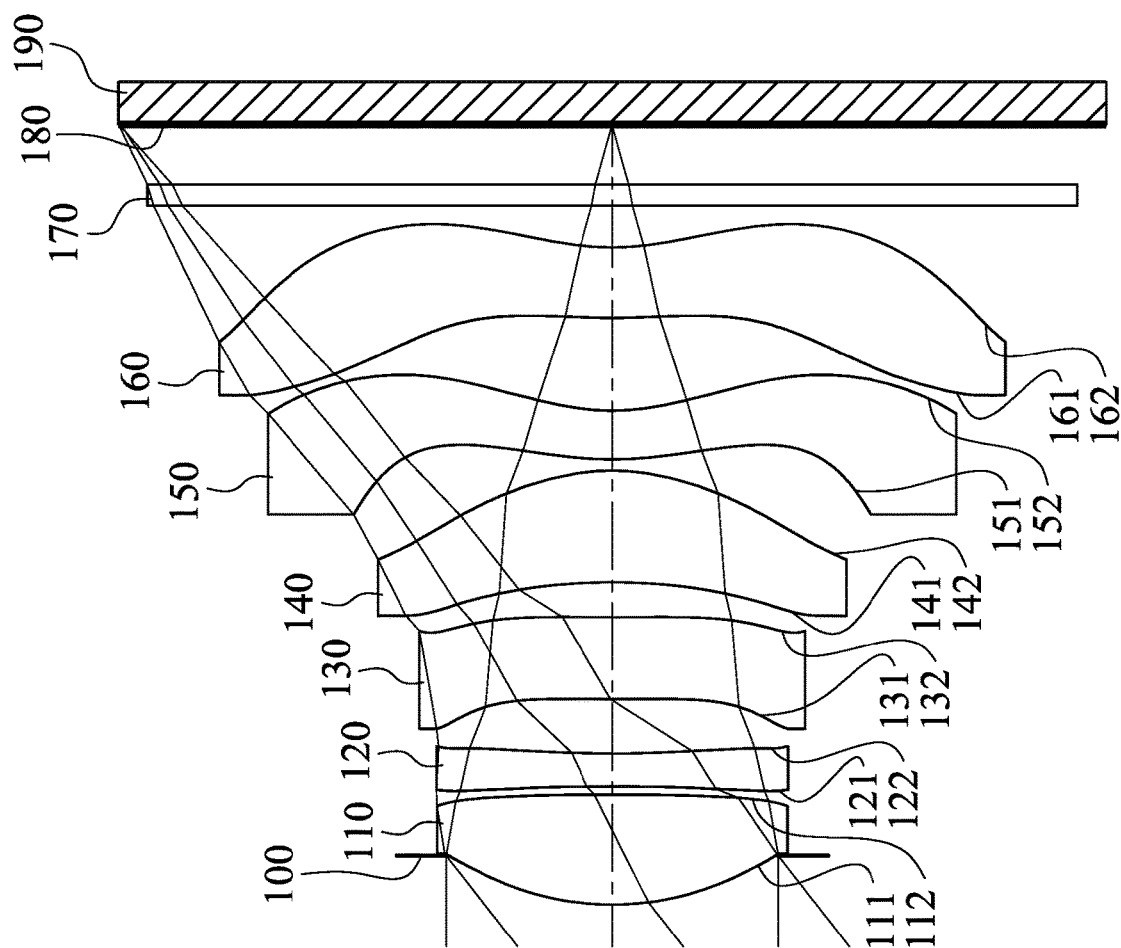
FIG. 1 is a schematic view of an imaging apparatus according to the 1st embodiment of the present disclosure.

An image capturing assembly includes six lens elements, which are, in order from an object side to an image side, a first lens element, a second lens element, a third lens element, a fourth lens element, a fifth lens element and a sixth lens element.

The first lens element has positive refractive power, so that the light converging ability of the object side of the image capturing assembly can be provided for reducing the total track length thereof so as to obtain the compactness.

The second lens element can have negative refractive power. Therefore, it is favorable for balancing aberrations generated from the first lens element and correcting chromatic aberration of the image capturing assembly, so that the image overlaps of the image captured by the electronic device due to deviations of focal points from different light wavelengths can be avoided.

The third lens element can have negative refractive power. Therefore, it is favorable for distributing the light divergent ability of the second lens element and then moderating the curvature of the lens surface so as to avoid total reflection due to the excessive incident angle into the lens surface.

The fourth lens element with positive refractive power has an image-side surface being convex. Therefore, the light converging ability of the image capturing assembly can be distributed effectively by the fourth lens element with positive refractive power, and the principal point can be positioned closer to the image side so as to enlarge the angle of view for satisfying further application demands. Further, it is favorable for enhancing the symmetrical property by the convex image-side surface of the fourth lens element to avoid excessive aberrations.

The fifth lens element can have an object-side surface being convex, so that the distribution of the surface curvature of the fifth lens element can be balanced for correcting aberrations of the image capturing assembly, thus it is favorable for designs and applications of the compact device. The fifth lens element can have an image-side surface being concave, which can enable the sixth lens element to control the back focal length so as to avoid the overly large size of the image capturing assembly and the difficulty to miniaturize the device. Furthermore, at least one surface of the fifth lens element includes at least one inflection point, so that the distortion can be reduced effectively for avoiding vignetting in the off-axial region of the image, and it is favorable for correcting off-axial aberrations of the image capturing assembly.

The sixth lens element can have negative refractive power, so that it is favorable for controlling the back focal length of the image capturing assembly effectively and being applicable in the compact electronic device. The sixth lens element has an object-side surface being convex, thus it is favorable for the light of tangential and sagittal directions converging by effectively controlling the lens shape and the refractive power of the sixth lens element, and the astigmatism of the image capturing assembly can be corrected. The sixth lens element has an image-side surface being concave and including at least one inflection point. Therefore, a compact image capturing assembly can be obtained by effectively controlling the back focal length thereof, off-axial aberrations can be corrected effectively and the Petzval field can be improved.

When an Abbe number of the second lens element is V2, an Abbe number of the third lens element is V3, and an Abbe number of the fifth lens element is V5, the following condition is satisfied: $30.0<V2+V3+V5<90.0$. Therefore, material characteristics of the second lens element, the third lens element and the fifth lens element can be controlled effectively, which can increase the density difference between each lens element and air, so as to enhance the refraction capabilities of the lens elements. Thus, sufficient light deflection effects can be obtained in smaller space so as to reduce the total track length thereof. Preferably, the following condition can be satisfied: $35.0<V2+V3+V5<72.0$. More preferably, the following condition can be satisfied: $40.0<V2+V3+V5<62.0$.

When a focal length of the image capturing assembly is f, and a central thickness of the third lens element is CT3, the following condition is satisfied: $1.50<f/CT3<9.0$. Therefore, it is favorable for obtaining sufficient range of field of view and avoiding the third lens element being too thin, which may affect the strength of the lens element and the product yield rate. Preferably, the following condition can be satisfied: $1.50<f/CT3<8.20$. More preferably, the following condition can be satisfied: $1.50<f/CT3<7.30$.

When a focal length of the first lens element is f1, and a focal length of the third lens element is f3, the following condition is satisfied: $-1.0<f1/f3<0.40$. Therefore, the refractive power distribution of the first lens element and the third lens element can be adjusted against each other for enhancing aberration corrections of the third lens element as well as image quality.

When a central thickness of the first lens element is CT1 and the central thickness of the third lens element is CT3, the following condition is satisfied: $0.15<CT1/CT3<1.50$. Therefore, the thicknesses of the first lens element and the third lens element can be balanced. Preferably, the following condition can be satisfied: $0.35<CT1/CT3<1.30$.

When the focal length of the image capturing assembly is f and the focal length of the third lens element is f3, the following condition is satisfied: $-1.80<f/f3<0.25$. Therefore, the refractive power of the third lens element can be controlled so as to obtain better aberration corrections.

The image capturing assembly can further include an aperture stop located on an object side of the second lens element (which is between an imaged object and the second lens element). When an axial distance between the aperture stop and the image-side surface of the sixth lens element is SD and an axial distance between an object-side surface of the first lens element and the image-side surface of the sixth lens element is TD, the following condition is satisfied: $0.85<SD/TD<0.98$. Therefore, it is favorable for miniaturizing electronic devices by controlling the position of the aperture stop which can balance field of view and the total track length, and also favorable for improved utility. Preferably, the following condition can be satisfied: $0.90 \leq SD/TD<0.98$.

When the focal length of the image capturing assembly is f, the focal length of the first lens element is f1, and a focal length of the second lens element is f2, the following condition is satisfied: $0.40<(f/f1)+(f/f2)<1.0$. Therefore, it is favorable for avoiding the excessive refractive power of the first lens element generating aberrations and the reduced manufacturability by adjusting the refractive power of the first lens element and the second lens element. Preferably, the following condition can be satisfied: $0.45<(f/f1)+(f/f2)<0.74$.

When an axial distance between the first lens element and the second lens element is T12 and an axial distance between the second lens element and the third lens element is T23, the following condition is satisfied: $0<T12/T23<0.80$. Therefore, the distances between each lens element on the object side of the image capturing assembly can be effectively controlled, so that the first lens element and the second lens element can be jointly enhanced while becoming correction lens elements of each other. Thus, aberrations can be corrected so as to enhance the image quality. Preferably, the following condition can be satisfied: $0.13<T12/T23<0.80$.

When an axial distance between the fifth lens element and the sixth lens element is T56 and a central thickness of the sixth lens element is CT6, the following condition is satisfied: $1.20<T56/CT6<3.50$. Therefore, the sufficient distance between the fifth lens element and the sixth lens element is favorable for moderating the direction of light path and enhancing aberration corrections in the off-axial region, so that image blurs in the off-axial region can be avoided.

When the focal length of the first lens element is f1 and a focal length of the fourth lens element is f4, the following condition is satisfied: $0.50<f1/f4<1.80$. Therefore, the distribution of the refractive power of the first lens element and the fourth lens element can be balanced effectively so as to avoid aberrations generated by a single lens element with excessive refractive power, or total reflection with light spots of the image due to the lens surface with excessive curvature. Preferably, the following condition can be satisfied: $0.75<f1/f4<1.30$.

When an axial distance between the object-side surface of the first lens element and an image surface is TL and the focal length of the image capturing assembly is f, the following condition is satisfied: $1.20<TL/f<1.45$. Therefore, it is favorable for balancing the total track length and field of view of the image capturing assembly so as to obtain both compactness and wide field of view. Preferably, the following condition can be satisfied: $1.26 \leq TL/f<1.45$.

When an entrance pupil diameter of the image capturing assembly is EPD and the axial distance between the object-side surface of the first lens element and the image-side surface of the sixth lens element is TD, the following condition is satisfied: $0.35<EPD/TD<1.0$. Therefore, the ratio between the incident light range and height of the image capturing assembly can be controlled so as to maintain sufficient incident light of the image sensor which can avoid insufficient illumination of the image.

When a central thickness of the fourth lens element is CT4, and the axial distance between the fifth lens element and the sixth lens element is T56, the following condition is satisfied: $0.60<CT4/T56<1.50$. Therefore, it is favorable for controlling the direction of light path of the image capturing assembly by maintaining sufficient thickness of the fourth lens element, so that the high image quality can be obtained. Preferably, the following condition can be satisfied: $0.70<CT4/T56<1.25$.

When the axial distance between the first lens element and the second lens element is T12, and the axial distance between the fifth lens element and the sixth lens element is T56, the following condition is satisfied: $0<T12/T56<0.21$. Therefore, the space arrangement of the image capturing assembly can be balanced so as to improve the collaboration of the lens elements on the object side and moderate aberrations by arranging sufficient distance between each of the lens elements on the image side.

When a focal length of the fifth lens element is f5 and a focal length of the sixth lens element is f6, the following condition is satisfied: $f5/f6<2.75$. Therefore, the refractive power on the image side of the image capturing assembly can be balanced so as to improve aberration corrections in the off-axial region.

When the central thickness of the first lens element is CT1 and the central thickness of the second lens element is CT2, the following condition is satisfied: $CT1/CT2<3.15$. Therefore, it is favorable for controlling the ratio of the thicknesses of the lens elements by avoiding the thickness of the first lens element being too thick which may cause deformation due to uneven cool-down after molding, or avoiding the thickness of the second lens element being too thin which may cause structural breakage easily.

When the axial distance between the third lens element and the fourth lens element is T34 and the central thickness of the third lens element is CT3, the following condition is satisfied: $0.22 \leq T34/CT3<0.55$. Therefore, the space arranging efficiency of the middle of the image capturing assembly can be increased so as to reduce the total track length and size.

When the axial distance between the second lens element and the third lens element is T23, the axial distance between the third lens element and the fourth lens element is T34, and the axial distance between the fifth lens element and the sixth lens element is T56, the following condition is satisfied: (T23+T34)/T56<1.0. Therefore, the space arrangement can be balanced effectively so as to improve space utilization. Preferably, the following condition can be satisfied: (T23+T34)/T56<0.87.

When a vertical distance between a non-axial critical point on the image-side surface of the sixth lens element and an optical axis is Yc62, and the focal length of the image capturing assembly is f, the following condition is satisfied: 0.10<Yc62/f<1.0. Therefore, it is favorable for controlling light refractive angle in the off-axial region and correcting off-axial aberrations, and also maintaining sufficient image height and image capturing range.

When a curvature radius of the object-side surface of the second lens element is R3 and a curvature radius of the image-side surface of the second lens element is R4, the following condition is satisfied: −0.10<(R3−R4)/(R3+R4)<1.15. Therefore, the curvature arrangement of the second lens element can be effectively controlled so as to balance the lens shape arrangement and enhance the image quality.

When a refractive index of the third lens element is N3, a refractive index of the fifth lens element is N5, the Abbe number of the third lens element is V3 and the Abbe number of the fifth lens element is V5, the following condition is satisfied: 0.12<(N3/V3)+(N5/V5)<0.25. Thus, better refractive abilities of the third lens element and the fifth lens element can be obtained. It is favorable for configuring the lens elements of the entire image capturing assembly so as to satisfy demands of better aberration balance and shorter total track length.

When the axial distance between the object-side surface of the first lens element and the image surface is TL, and a maximum image height of the image capturing assembly is ImgH, the following condition is satisfied: TL/ImgH<2.0. Therefore, the compactness of the image capturing assembly can be obtained, and the sufficient incident light range can be obtained so as to increase the illumination of the image and enhance the image quality.

When half of a maximum field of view of the image capturing assembly is HFOV, the following condition is satisfied: 0.75<tan(HFOV)<1.40. Therefore, the imaging range of the image capturing assembly can be controlled effectively so as to satisfy a wider range of usage demands.

When an f-number of the image capturing assembly is Fno, the following condition is satisfied: 1.20<Fno<2.20. Therefore, the light retention of the image capturing assembly can be increased to have clearer captured images.

According to the image capturing assembly of the present disclosure, the lens elements thereof can be made of glass or plastic materials. When the lens elements are made of glass materials, the distribution of the refractive power of the image capturing assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing assembly. Therefore, the total track length of the image capturing assembly can also be reduced.

According to the image capturing assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the image capturing assembly of the present disclosure, the refractive power or the focal length of a lens element being positive or negative may refer to the refractive power or the focal length in a paraxial region of the lens element.

According to the image capturing assembly of the present disclosure, the image capturing assembly can include at least one stop, such as an aperture stop, a glare stop or a field stop. Said glare stop or said field stop is for eliminating the stray light and thereby improving the image resolution thereof.

According to the image capturing assembly of the present disclosure, the image surface of the image capturing assembly, based on the corresponding image sensor, can be flat or curved. In particular, the image surface can be a concave curved surface facing towards the object side.

According to the image capturing assembly of the present disclosure, an aperture stop can be configured as a front stop or a middle stop. A front stop disposed between an object and the first lens element can provide a longer distance between an exit pupil of the image capturing assembly and the image surface, and thereby obtains a telecentric effect and improves the image-sensing efficiency of the image sensor, such as CCD or CMOS. A middle stop disposed between the first lens element and the image surface is favorable for enlarging the field of view of the image capturing assembly and thereby provides a wider field of view for the same.

According to the image capturing assembly of the present disclosure, a critical point is a non-axial point of the lens surface where its tangent is perpendicular to the optical axis, wherein a convex critical point is a critical point located on a convex shape of the lens surface, and the shape of the critical point (convex or concave) is determined by the positive or negative sign of the curvature at the critical point.

According to the image capturing assembly of the present disclosure, the image capturing assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an imaging apparatus is provided. The imaging apparatus includes the aforementioned image capturing assembly, a driving apparatus and an image sensor, wherein the driving apparatus is connected to the image capturing assembly, and the image sensor is disposed on the image side of the aforementioned image capturing assembly that is, the image sensor can be disposed on or near the image surface of the aforementioned image capturing assembly. By arranging both of the first lens element and the fourth lens element have positive refractive power, the light converging ability can be adjusted so as to obtain compactness and wide field of view for demands of wider adaptions. Preferably, the image capturing apparatus can further include a barrel member, a holder member or a combination thereof.

According to the present disclosure, an electronic device is provided, which includes the aforementioned imaging apparatus. Preferably, the electronic device can further include but not limited to a control unit, a display, a storage unit, a random access memory unit (RAM) or a combination thereof.

According to the above description of the present disclosure, the following 1st-16th specific embodiments are provided for further explanation.

1st Embodiment

Figure 2:
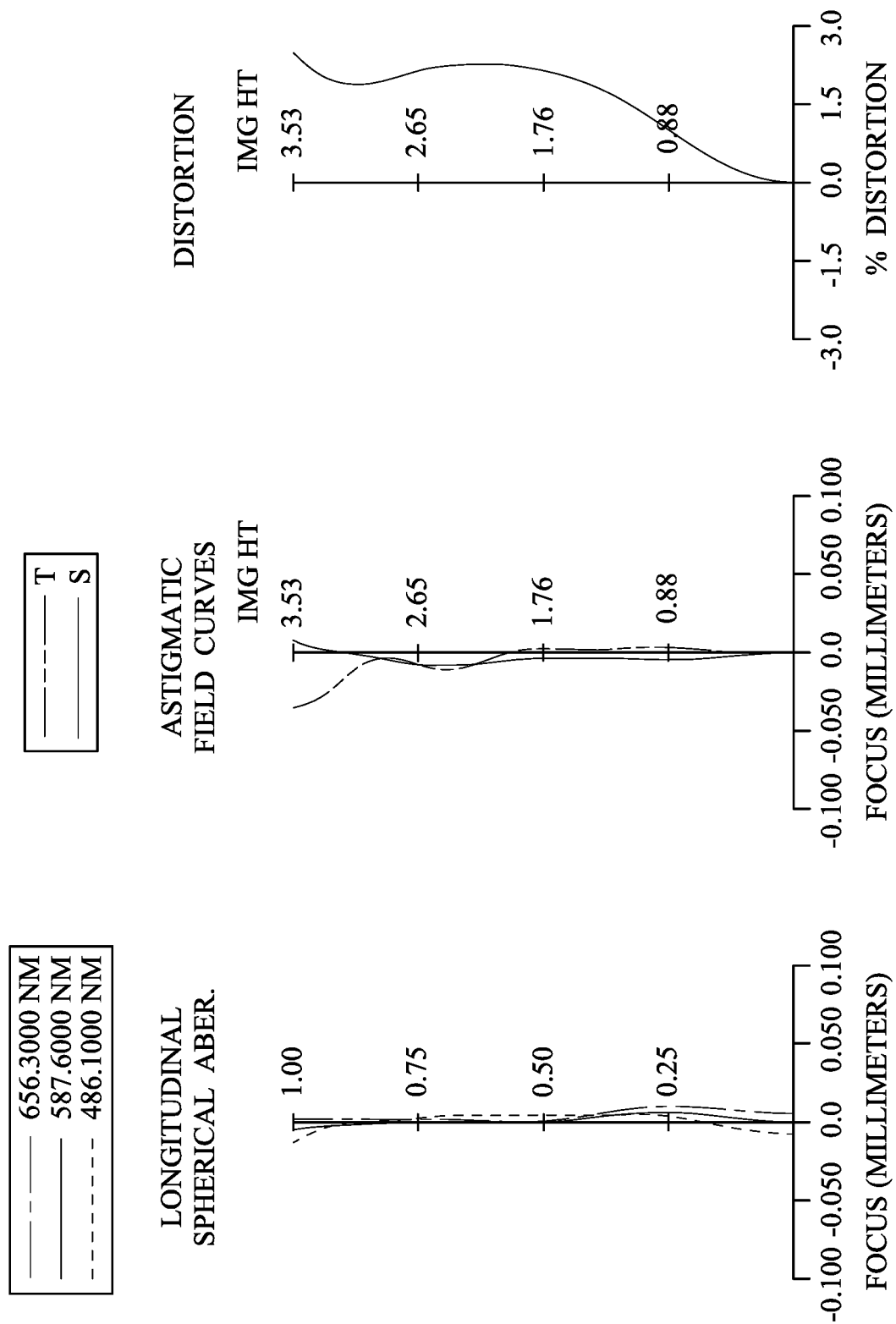
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing assembly (its reference numeral is omitted) and an image sensor 190. The image capturing assembly includes, in order from an object side to an image side, an aperture stop 100, a first lens element 110, a second lens element 120, a third lens element 130, a fourth lens element 140, a fifth lens element 150, a sixth lens element 160, a filter 170 and an image surface 180, wherein the image sensor 190 is disposed on the image surface 180 of the image capturing assembly. The image capturing assembly includes six lens elements (110, 120, 130, 140, 150, 160) without additional one or more lens elements inserted between the first lens element 110 and the sixth lens element 160.

The first lens element 110 with positive refractive power has an object-side surface 111 being convex and an image-side surface 112 being concave. The first lens element 110 is made of a plastic material, and has the object-side surface 111 and the image-side surface 112 being both aspheric.

The second lens element 120 with negative refractive power has an object-side surface 121 being convex and an image-side surface 122 being concave. The second lens element 120 is made of a plastic material, and has the object-side surface 121 and the image-side surface 122 being both aspheric.

The third lens element 130 with positive refractive power has an object-side surface 131 being convex and an image-side surface 132 being concave. The third lens element 130 is made of a plastic material, and has the object-side surface 131 and the image-side surface 132 being both aspheric.

The fourth lens element 140 with positive refractive power has an object-side surface 141 being concave and an image-side surface 142 being convex. The fourth lens element 140 is made of a plastic material, and has the object-side surface 141 and the image-side surface 142 being both aspheric.

The fifth lens element 150 with negative refractive power has an object-side surface 151 being convex and an image-side surface 152 being concave. The fifth lens element 150 is made of a plastic material, and has the object-side surface 151 and the image-side surface 152 being both aspheric. Furthermore, each of the object-side surface 151 and the image-side surface 152 of the fifth lens element 150 includes at least one inflection point.

The sixth lens element 160 with negative refractive power has an object-side surface 161 being convex and an image-side surface 162 being concave. The sixth lens element 160 is made of a plastic material, and has the object-side surface 161 and the image-side surface 162 being both aspheric. Furthermore, the image-side surface 162 of the sixth lens element 160 includes at least one inflection point.

The filter 170 is made of a glass material and located between the sixth lens element 160 and the image surface 180, and will not affect the focal length of the image capturing assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing assembly according to the 1st embodiment, when a focal length of the image capturing assembly is f, an f-number of the image capturing assembly is Fno, and half of a maximum field of view of the image capturing assembly is HFOV, these parameters have the following values: f=4.41 mm; Fno=1.85; and HFOV=38.0 degrees.

In the image capturing assembly according to the 1st embodiment, when an Abbe number of the second lens element 120 is V2, an Abbe number of the third lens element 130 is V3, an Abbe number of the fifth lens element 150 is V5, a refractive index of the third lens element 130 is N3, and a refractive index of the fifth lens element 150 is N5, the following conditions are satisfied: V2+V3+V5=65.9; and (N3/V3)+(N5/V5)=0.14.

In the image capturing assembly according to the 1st embodiment, when the focal length of the image capturing assembly is f, and a central thickness of the third lens element 130 is CT3, the following condition is satisfied: f/CT3=7.45.

In the image capturing assembly according to the 1st embodiment, when a central thickness of the first lens element 110 is CT1, a central thickness of the second lens element 120 is CT2, the central thickness of the third lens element 130 is CT3, the following conditions are satisfied: CT1/CT2=3.35; and CT1/CT3=1.34.

In the image capturing assembly according to the 1st embodiment, when the central thickness of the third lens element 130 is CT3, a central thickness of the fourth lens element 140 is CT4, a central thickness of the sixth lens element 160 is CT6, an axial distance between the third lens element 130 and the fourth lens element 140 is T34, and an axial distance between the fifth lens element 150 and the sixth lens element 160 is T56, the following conditions are satisfied: CT4/T56=1.20; T34/CT3=0.43; and T56/CT6=1.32.

In the image capturing assembly according to the 1st embodiment, when an axial distance between the first lens element 110 and the second lens element 120 is T12, an axial distance between the second lens element 120 and the third lens element 130 is T23, the axial distance between the third lens element 130 and the fourth lens element 140 is T34, and the axial distance between the fifth lens element and the sixth lens element is T56, the following conditions are satisfied: T12/T23=0.15; T12/T56=0.09; and (T23+T34)/T56=0.96.

In the image capturing assembly according to the 1st embodiment, when a curvature radius of the object-side surface 121 of the second lens element 120 is R3, and a curvature radius of the image-side surface 122 of the second lens element 120 is R4, the following condition is satisfied: (R3−R4)/(R3+R4)=1.00.

In the image capturing assembly according to the 1st embodiment, when the focal length of the image capturing assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: f/f3=0.02; f1/f3=0.02; f1/f4=0.82; f5/f6=1.56; and (f/f1)+(f/f2)=0.71.

In the image capturing assembly according to the 1st embodiment, when an entrance pupil diameter of the image capturing assembly is EPD, an axial distance between the object-side surface 111 of the first lens element 110 and the image-side surface 162 of the sixth lens element 160 is TD, and an axial distance between the aperture stop 100 and the image-side surface 162 of the sixth lens element 160 is SD, the following conditions are satisfied: EPD/TD=0.50; and SD/TD=0.93.

In the image capturing assembly according to the 1st embodiment, when an axial distance between the object-side surface 111 of the first lens element 110 and the image surface 180 is TL, a maximum image height of the image capturing assembly is ImgH (half of a diagonal length of an effective photosensitive area of the image sensor 190), and the focal length of the image capturing assembly is f, the following conditions are satisfied: TL/ImgH=1.59; and TL/f=1.27.

In the image capturing assembly according to the 1st embodiment, when the half of a maximum field of view of the image capturing assembly is HFOV, the following condition is satisfied: tan(HFOV)=0.78.

Figure 25:
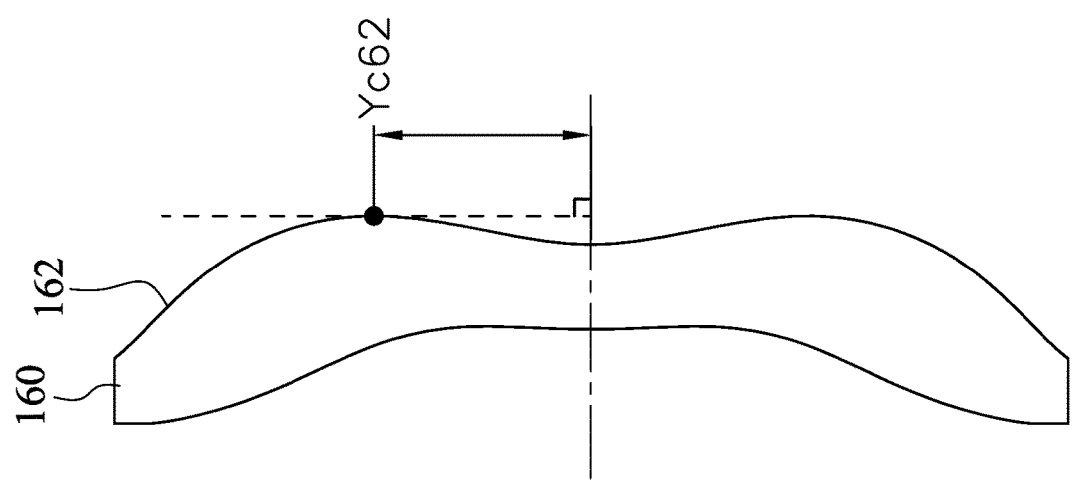
FIG. 25 is a schematic view of a parameter Yc62 according to the 1st embodiment of FIG. 1.

FIG. 25 is a schematic view of a parameter Yc62 according to the 1st embodiment of FIG. 1. In FIG. 25, when a vertical distance between a non-axial critical point on the image-side surface 162 of the sixth lens element 160 and an optical axis is Yc62, and the focal length of the image capturing assembly is f, the following condition is satisfied: Yc62/f=0.29.

The detailed optical data of the 1st embodiment are shown in Table 1 and the aspheric surface data are shown in Table 2 below.

TABLE 1

1st Embodiment
f = 4.41 mm, Fno = 1.85, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.351 | | | | |
| 2 | Lens 1 | 2.031 | ASP | 0.790 | Plastic | 1.545 | 56.1 | 3.75 |
| 3 | | 237.357 | ASP | 0.057 | | | | |
| 4 | Lens 2 | 2943.776 | ASP | 0.236 | Plastic | 1.671 | 19.5 | −9.58 |
| 5 | | 6.414 | ASP | 0.391 | | | | |
| 6 | Lens 3 | 21.229 | ASP | 0.591 | Plastic | 1.660 | 20.4 | 238.44 |
| 7 | | 24.268 | ASP | 0.252 | | | | |
| 8 | Lens 4 | −4.387 | ASP | 0.800 | Plastic | 1.545 | 56.1 | 4.55 |
| 9 | | −1.687 | ASP | 0.082 | | | | |
| 10 | Lens 5 | 2.758 | ASP | 0.350 | Plastic | 1.614 | 26.0 | −8.87 |
| 11 | | 1.742 | ASP | 0.667 | | | | |
| 12 | Lens 6 | 5.609 | ASP | 0.506 | Plastic | 1.534 | 55.9 | −5.68 |
| 13 | | 1.907 | ASP | 0.300 | | | | |
| 14 | Filter | Plano | | 0.150 | Glass | 1.517 | 64.2 | — |
| 15 | | Plano | | 0.432 | | | | |
| 16 | Image | Plano | | — | | | | |

Reference wavelength is 587.6 nm (d-line).

TABLE 2

Aspheric Coefficients

| | Surface # | | | | | |
|---|---|---|---|---|---|---|
| | 2 | 3 | 4 | 5 | 6 | 7 |
| k = | −1.1567E−01 | −8.7665E+01 | −1.7407E+01 | −9.0000E+01 | 8.3881E+01 | −9.0000E+01 |
| A4 = | −1.6681E−03 | −1.1017E−01 | −1.6455E−01 | −6.9721E−02 | −1.1408E−01 | −8.2824E−02 |
| A6 = | 7.4590E−03 | 1.4093E−01 | 2.8120E−01 | 1.4858E−01 | 5.9835E−02 | 5.9401E−02 |
| A8 = | −2.2226E−02 | 1.2063E−02 | −1.3012E−01 | −1.5243E−01 | −1.8407E−01 | −1.0404E−01 |
| A10 = | 2.0623E−02 | −1.7029E−01 | −9.6410E−02 | 7.9337E−02 | 3.1091E−01 | 1.0669E−01 |
| A12 = | −8.1586E−03 | 1.2350E−01 | 1.0771E−01 | −3.4837E−02 | −3.2126E−01 | −6.6209E−02 |
| A14 = | 3.1279E−13 | −2.7943E−02 | −2.5877E−02 | 1.1198E−02 | 1.6818E−01 | 2.4288E−02 |
| A16 = | | −1.0571E−13 | | | −3.2259E−02 | −3.4514E−03 |

TABLE 2-continued

Aspheric Coefficients

| Surface # | | | | | |
|---|---|---|---|---|---|
| 8 | 9 | 10 | 11 | 12 | 13 |
| k = 2.6067E+00 | −1.0521E+00 | −6.2891E−01 | −1.3523E+00 | −6.4215E+00 | −9.8756E−01 |
| A4 = −2.2639E−02 | 1.5800E−02 | −9.3542E−02 | −1.1382E−01 | −1.2427E−01 | −1.5426E−01 |
| A6 = 4.8714E−02 | 2.3033E−02 | 2.5342E−02 | 3.3023E−02 | 2.0065E−02 | 5.2976E−02 |
| A8 = −5.0670E−02 | −3.8647E−02 | −2.1378E−02 | −9.1089E−03 | 4.1174E−03 | −1.5602E−02 |
| A10 = 1.6653E−02 | 3.0152E−02 | 1.0430E−02 | 1.8807E−03 | −1.8409E−03 | 3.2528E−03 |
| A12 = 2.7159E−03 | −1.3342E−02 | −2.8925E−03 | −2.3455E−04 | 2.5931E−04 | −4.2921E−04 |
| A14 = −1.3858E−03 | 3.3593E−03 | 3.1413E−04 | 1.5012E−05 | −1.6533E−05 | 3.1143E−05 |
| A16 = | −3.6032E−04 | | −3.6967E−07 | 4.0036E−07 | −9.2537E−07 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
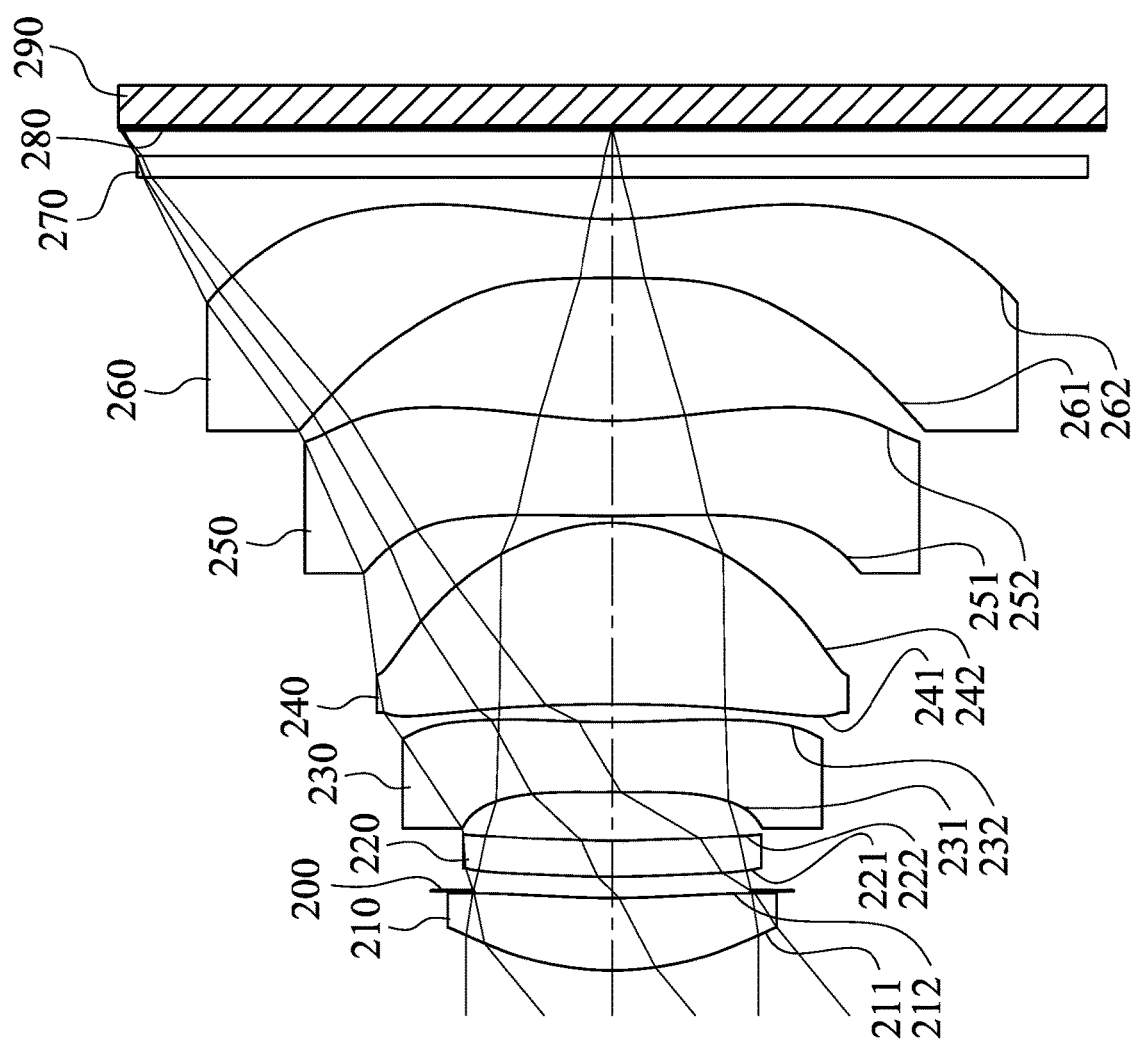
FIG. 3 is a schematic view of an imaging apparatus according to the 2nd embodiment of the present disclosure.
Figure 4:
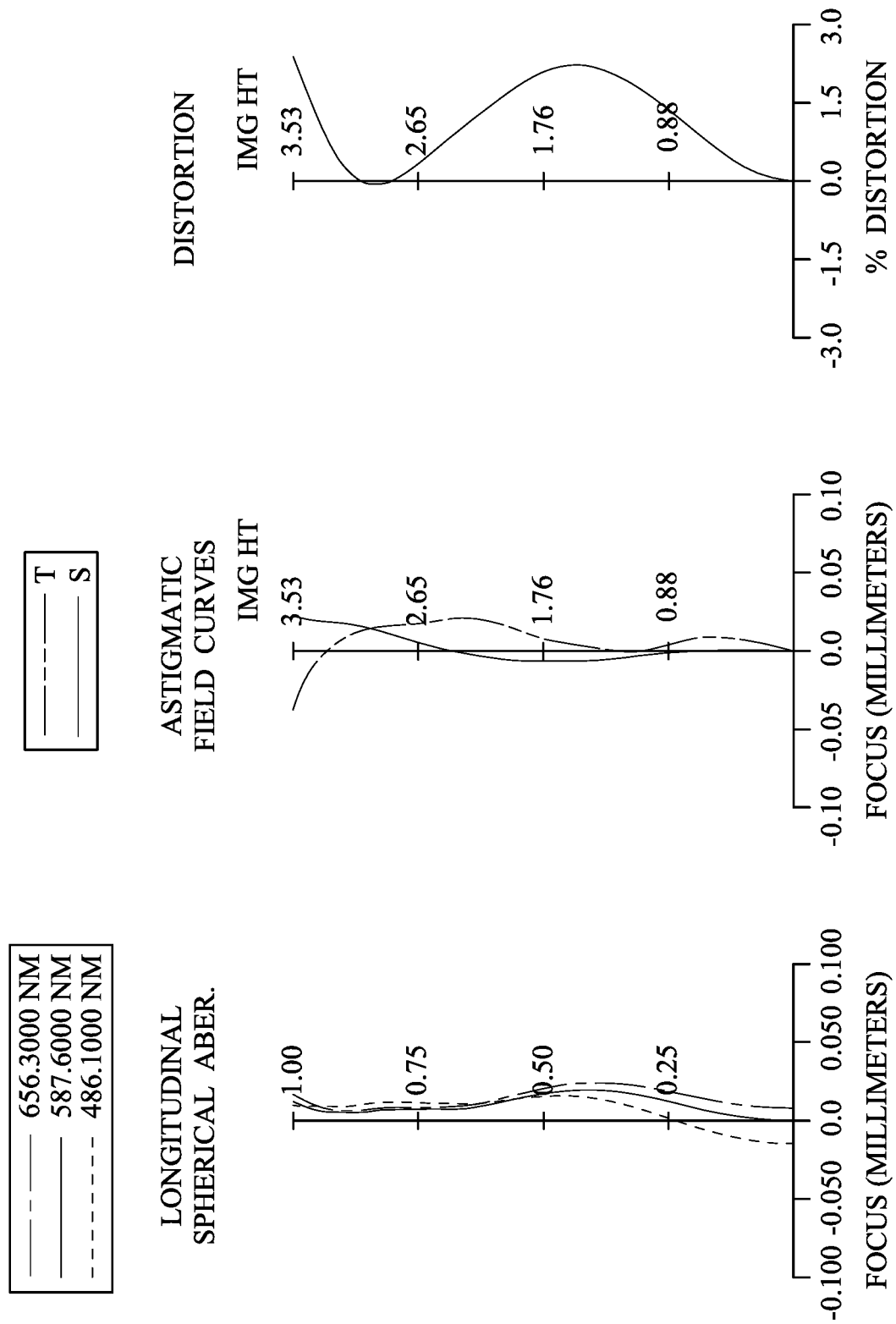
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an image capturing assembly (its reference numeral is omitted) and an image sensor 290. The image capturing assembly includes, in order from an object side to an image side, a first lens element 210, an aperture stop 200, a second lens element 220, a third lens element 230, a fourth lens element 240, a fifth lens element 250, a sixth lens element 260, a filter 270 and an image surface 280, wherein the image sensor 290 is disposed on the image surface 280 of the image capturing assembly. The image capturing assembly includes six lens elements (210, 220, 230, 240, 250, 260) without additional one or more lens elements inserted between the first lens element 210 and the sixth lens element 260.

The first lens element 210 with positive refractive power has an object-side surface 211 being convex and an image-side surface 212 being concave. The first lens element 210 is made of a plastic material, and has the object-side surface 211 and the image-side surface 212 being both aspheric.

The second lens element 220 with positive refractive power has an object-side surface 221 being convex and an image-side surface 222 being concave. The second lens element 220 is made of a plastic material, and has the object-side surface 221 and the image-side surface 222 being both aspheric.

The third lens element 230 with negative refractive power has an object-side surface 231 being convex and an image-side surface 232 being concave. The third lens element 230 is made of a plastic material, and has the object-side surface 231 and the image-side surface 232 being both aspheric.

The fourth lens element 240 with positive refractive power has an object-side surface 241 being concave and an image-side surface 242 being convex. The fourth lens element 240 is made of a plastic material, and has the object-side surface 241 and the image-side surface 242 being both aspheric.

The fifth lens element 250 with negative refractive power has an object-side surface 251 being convex and an image-side surface 252 being concave. The fifth lens element 250 is made of a plastic material, and has the object-side surface 251 and the image-side surface 252 being both aspheric. Furthermore, each of the object-side surface 251 and the image-side surface 252 of the fifth lens element 250 includes at least one inflection point.

The sixth lens element 260 with negative refractive power has an object-side surface 261 being concave and an image-side surface 262 being concave. The sixth lens element 260 is made of a plastic material, and has the object-side surface 261 and the image-side surface 262 being both aspheric. Furthermore, the image-side surface 262 of the sixth lens element 260 includes at least one inflection point.

The filter 270 is made of a glass material and located between the sixth lens element 260 and the image surface 280, and will not affect the focal length of the image capturing assembly.

The detailed optical data of the 2nd embodiment are shown in Table 3 and the aspheric surface data are shown in Table 4 below.

TABLE 3

2nd Embodiment
f = 4.18 mm, Fno = 2.00, HFOV = 39.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.270 | ASP | 0.516 | Plastic | 1.545 | 56.1 | 6.09 |
| 2 | | 6.604 | ASP | 0.050 | | | | |
| 3 | Ape. Stop | Plano | | 0.100 | | | | |
| 4 | Lens 2 | 5.409 | ASP | 0.258 | Plastic | 1.671 | 19.5 | 199.12 |
| 5 | | 5.530 | ASP | 0.352 | | | | |

TABLE 3-continued

2nd Embodiment
f = 4.18 mm, Fno = 2.00, HFOV = 39.4 deg.

| Surface # | | Curvature Radius | Thickness | Material | Index | Abbe # | Focal Length |
|---|---|---|---|---|---|---|---|
| 6 | Lens 3 | 63.633 ASP | 0.500 | Plastic | 1.660 | 20.4 | −10.84 |
| 7 | | 6.410 ASP | 0.129 | | | | |
| 8 | Lens 4 | −12.126 ASP | 1.298 | Plastic | 1.545 | 56.1 | 2.81 |
| 9 | | −1.410 ASP | 0.050 | | | | |
| 10 | Lens 5 | 7.615 ASP | 0.679 | Plastic | 1.614 | 26.0 | −7.08 |
| 11 | | 2.672 ASP | 1.020 | | | | |
| 12 | Lens 6 | −45.635 ASP | 0.424 | Plastic | 1.534 | 55.9 | −4.95 |
| 13 | | 2.812 ASP | 0.300 | | | | |
| 14 | Filter | Plano | 0.150 | Glass | 1.517 | 64.2 | — |
| 15 | | Plano | 0.202 | | | | |
| 16 | Image | Plano | — | | | | |

Reference wavelength is 587.6 nm (d-line).

TABLE 4

Aspheric Coefficients

| | Surface # | | | | | |
|---|---|---|---|---|---|---|
| | 1 | 2 | 4 | 5 | 6 | 7 |
| k = | −2.0676E−02 | 1.6073E+01 | 2.2567E+01 | −9.0000E+01 | 8.3881E+01 | −9.0000E+01 |
| A4 = | −2.6770E−03 | −7.8133E−02 | −1.6972E−01 | −7.4081E−02 | −1.4591E−01 | −4.4837E−02 |
| A6 = | 1.4152E−02 | 1.3753E−02 | 1.2861E−01 | 5.8558E−02 | −8.1054E−02 | −5.7352E−02 |
| A8 = | −2.2741E−02 | 1.1903E−01 | 5.2489E−02 | 6.7284E−02 | 4.2470E−01 | 1.2510E−01 |
| A10 = | 1.7112E−02 | −2.0192E−01 | −1.7997E−01 | −7.6533E−02 | −8.5947E−01 | −9.9924E−02 |
| A12 = | −8.1587E−03 | 1.2350E−01 | 1.2918E−01 | −5.6360E−03 | 8.8093E−01 | 4.0286E−02 |
| A14 = | −2.0895E−08 | −2.7943E−02 | −3.6304E−02 | 1.5544E−02 | −4.5463E−01 | −9.0116E−03 |
| A16 = | | −5.9068E−10 | | | 6.7806E−02 | 9.3719E−04 |

| | Surface # | | | | | |
|---|---|---|---|---|---|---|
| | 8 | 9 | 10 | 11 | 12 | 13 |
| k = | 2.6067E+00 | −6.6215E−01 | 6.7773E+00 | −8.4554E−01 | −6.4215E+00 | −4.6347E−01 |
| A4 = | 1.0711E−02 | −3.4523E−02 | −1.6904E−01 | −1.8231E−01 | −1.5896E−01 | −1.2421E−01 |
| A6 = | −7.1073E−02 | 1.2361E−01 | 1.8281E−01 | 1.2546E−01 | 4.5899E−02 | 5.0090E−02 |
| A8 = | 1.0041E−01 | −1.2591E−01 | −1.3172E−01 | −5.9528E−02 | −1.0873E−03 | −1.5688E−02 |
| A10 = | −6.1429E−02 | 5.8791E−02 | 5.1313E−02 | 1.7237E−02 | −9.3741E−04 | 3.2669E−03 |
| A12 = | 1.7429E−02 | −1.1538E−02 | −1.0932E−02 | −3.0592E−03 | −3.8710E−04 | −4.2747E−04 |
| A14 = | −1.8128E−03 | −5.0140E−04 | 9.9122E−04 | 3.0687E−04 | 1.5026E−04 | 3.1148E−05 |
| A16 = | | 3.9015E−04 | | −1.3013E−05 | −1.2492E−05 | −9.5187E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.18 | (T23 + T34)/T56 | 0.47 |
| Fno | 2.00 | (R3 − R4)/(R3 + R4) | −0.01 |
| HFOV [deg.] | 39.4 | f/f3 | −0.39 |
| V2 + V3 + V5 | 65.9 | f1/f3 | −0.56 |
| (N3/V3) + (N5/V5) | 0.14 | f1/f4 | 2.17 |
| f/CT3 | 8.36 | f5/f6 | 1.43 |
| CT1/CT2 | 2.00 | (f/f1) + (f/f2) | 0.71 |
| CT1/CT3 | 1.03 | EPD/TD | 0.39 |

-continued

| 2nd Embodiment | | | |
|---|---|---|---|
| CT4/T56 | 1.27 | SD/TD | 0.89 |
| T34/CT3 | 0.26 | TL/ImgH | 1.71 |
| T56/CT6 | 2.41 | TL/f | 1.44 |
| T12/T23 | 0.43 | tan(HFOV) | 0.82 |
| T12/T56 | 0.15 | Yc62/f | 0.31 |

3rd Embodiment

Figure 5:
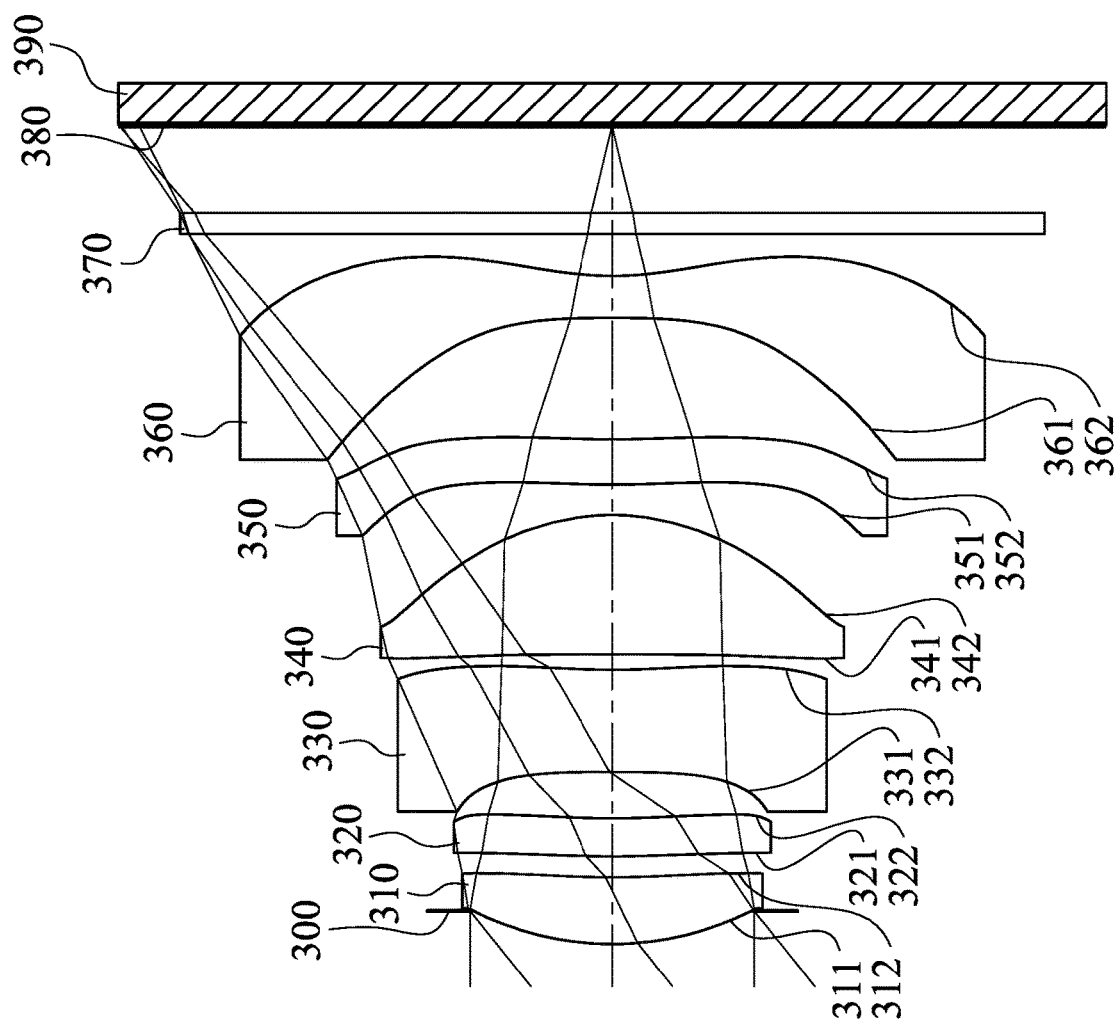
FIG. 5 is a schematic view of an imaging apparatus according to the 3rd embodiment of the present disclosure.
Figure 6:
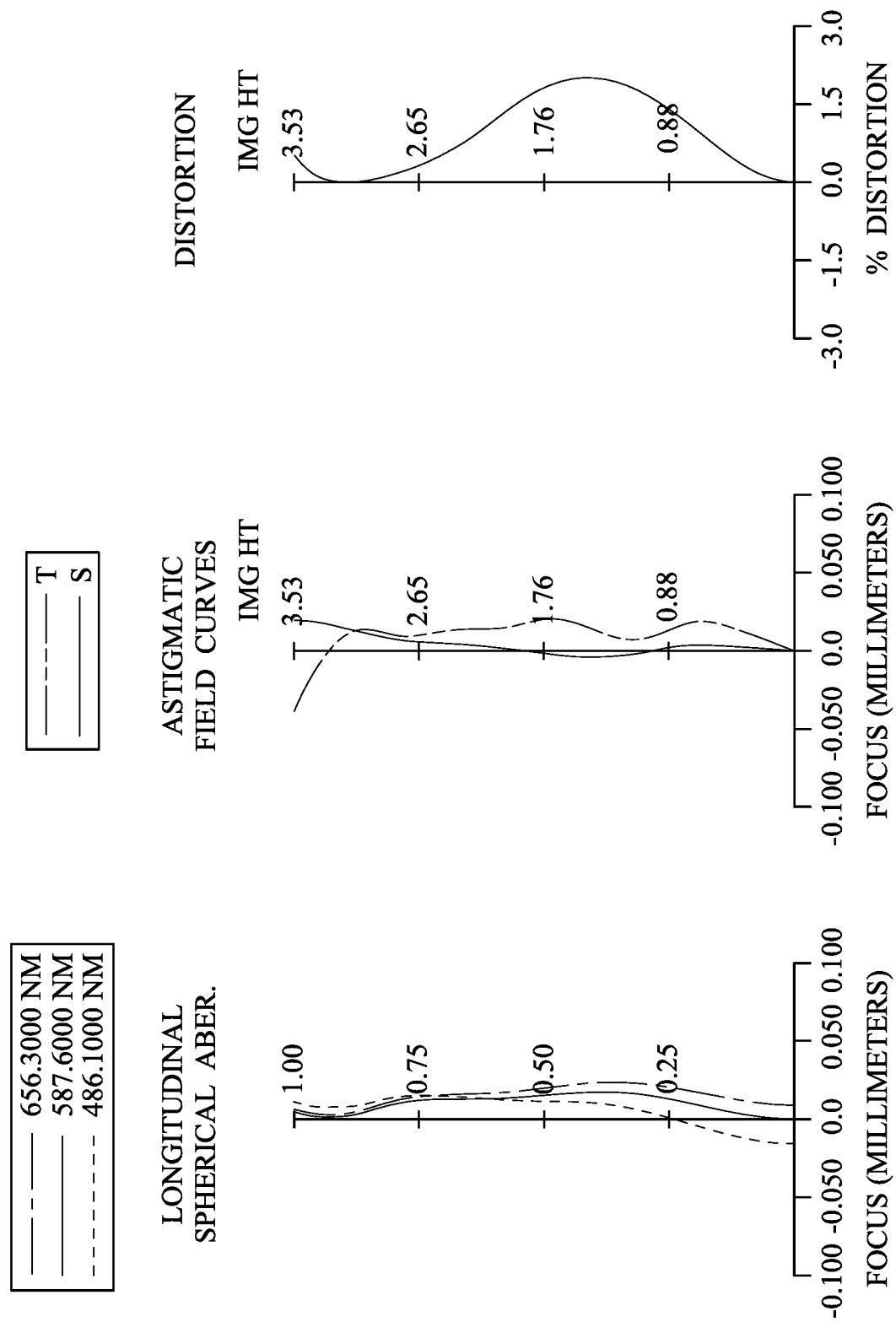
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an image capturing assembly (its reference numeral is omitted) and an image sensor 390. The image capturing assembly includes, in order from an object side to an image side, an aperture stop 300, a first lens element 310, a second lens element 320, a third lens element 330, a fourth lens element 340, a fifth lens element 350, a sixth lens element 360, a filter 370 and an image surface 380, wherein the image sensor 390 is disposed on the image surface 380 of the image capturing assembly. The image capturing assembly includes six lens elements (310, 320, 330, 340, 350, 360) without additional one or more lens elements inserted between the first lens element 310 and the sixth lens element 360.

The first lens element 310 with positive refractive power has an object-side surface 311 being convex and an image-side surface 312 being concave. The first lens element 310 is made of a plastic material, and has the object-side surface 311 and the image-side surface 312 being both aspheric.

The second lens element 320 with negative refractive power has an object-side surface 321 being convex and an image-side surface 322 being concave. The second lens element 320 is made of a plastic material, and has the object-side surface 321 and the image-side surface 322 being both aspheric.

The third lens element 330 with negative refractive power has an object-side surface 331 being concave and an image-side surface 332 being concave. The third lens element 330 is made of a plastic material, and has the object-side surface 331 and the image-side surface 332 being both aspheric.

The fourth lens element 340 with positive refractive power has an object-side surface 341 being concave and an image-side surface 342 being convex. The fourth lens element 340 is made of a plastic material, and has the object-side surface 341 and the image-side surface 342 being both aspheric.

The fifth lens element 350 with positive refractive power has an object-side surface 351 being convex and an image-side surface 352 being concave. The fifth lens element 350 is made of a plastic material, and has the object-side surface 351 and the image-side surface 352 being both aspheric. Furthermore, each of the object-side surface 351 and the image-side surface 352 of the fifth lens element 350 includes at least one inflection point.

The sixth lens element 360 with negative refractive power has an object-side surface 361 being concave and an image-side surface 362 being concave. The sixth lens element 360 is made of a plastic material, and has the object-side surface 361 and the image-side surface 362 being both aspheric. Furthermore, the image-side surface 362 of the sixth lens element 360 includes at least one inflection point.

The filter 370 is made of a glass material and located between the sixth lens element 360 and the image surface 380, and will not affect the focal length of the image capturing assembly.

The detailed optical data of the 3rd embodiment are shown in Table 5 and the aspheric surface data are shown in Table 6 below.

TABLE 5

3rd Embodiment
f = 4.39 mm, Fno = 2.15, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.238 | | | | |
| 2 | Lens 1 | 2.187 | ASP | 0.481 | Plastic | 1.545 | 56.1 | 5.69 |
| 3 | | 6.844 | ASP | 0.150 | | | | |
| 4 | Lens 2 | 6.018 | ASP | 0.273 | Plastic | 1.642 | 22.5 | −122.75 |
| 5 | | 5.492 | ASP | 0.333 | | | | |
| 6 | Lens 3 | −24.943 | ASP | 0.738 | Plastic | 1.660 | 20.4 | −7.46 |
| 7 | | 6.203 | ASP | 0.110 | | | | |
| 8 | Lens 4 | −78.966 | ASP | 1.000 | Plastic | 1.545 | 56.1 | 3.20 |
| 9 | | −1.714 | ASP | 0.218 | | | | |
| 10 | Lens 5 | 6.874 | ASP | 0.326 | Plastic | 1.614 | 26.0 | 115.39 |
| 11 | | 7.476 | ASP | 0.875 | | | | |
| 12 | Lens 6 | −14.471 | ASP | 0.301 | Plastic | 1.534 | 55.9 | −3.68 |
| 13 | | 2.286 | ASP | 0.300 | | | | |
| 14 | Filter | Plano | | 0.150 | Glass | 1.517 | 64.2 | — |
| 15 | | Plano | | 0.633 | | | | |
| 16 | Image | Plano | | — | | | | |

Reference wavelength is 587.6 nm (d-line).

TABLE 6

Aspheric Coefficients

| | Surface # | | | | | |
|---|---|---|---|---|---|---|
| | 2 | 3 | 4 | 5 | 6 | 7 |
| k = | −1.1582E−04 | 1.9758E+01 | 2.3992E+01 | −9.0000E+01 | 8.3881E+01 | −9.0000E+01 |
| A4 = | −2.3414E−03 | −7.8117E−02 | −1.6128E−01 | −6.9427E−02 | −1.3690E−01 | −7.8992E−03 |
| A6 = | 9.2808E−03 | 1.8522E−02 | 1.1104E−01 | 8.1053E−03 | 1.2750E−02 | −9.8427E−02 |
| A8 = | −1.5176E−02 | 1.1199E−02 | 7.8543E−02 | 1.9911E−01 | 7.7215E−02 | 1.2761E−01 |
| A10 = | 1.3942E−02 | −2.0101E−01 | −2.1307E−01 | −3.2778E−01 | −1.7974E−01 | −7.1056E−02 |
| A12 = | −8.1587E−03 | 1.2350E−01 | 1.3348E−01 | 2.1049E−01 | 1.6176E−01 | 1.6633E−02 |
| A14 = | −2.0895E−08 | −2.7943E−02 | −2.9448E−02 | −5.9008E−02 | −7.2756E−02 | −6.2711E−04 |
| A16 = | | −5.9073E−10 | | | 2.2338E−03 | −2.2155E−04 |

TABLE 6-continued

Aspheric Coefficients

| | Surface # | | | | |
|---|---|---|---|---|---|
| 8 | 9 | 10 | 11 | 12 | 13 |
| k = 2.6067E+00 | −6.9242E−01 | 1.1565E+01 | 4.6665E+00 | −6.4215E+00 | −4.0342E−01 |
| A4 = 4.0100E−02 | 1.1256E−02 | −1.0251E−01 | −9.4723E−02 | −1.4326E−01 | −1.4089E−01 |
| A6 = −1.4020E−01 | −3.4758E−02 | 3.7825E−02 | 4.4249E−02 | 4.3042E−02 | 5.0156E−02 |
| A8 = 1.5857E−01 | 5.5625E−02 | 4.6327E−03 | −4.1352E−03 | −5.0854E−03 | −1.5539E−02 |
| A10 = −8.4941E−02 | −4.8493E−02 | −1.4268E−02 | −7.8987E−03 | −1.5634E−03 | 3.2714E−03 |
| A12 = 2.1948E−02 | 2.3126E−02 | 4.6239E−03 | 3.3964E−03 | 9.2151E−04 | −4.2904E−04 |
| A14 = −2.1802E−03 | −5.7788E−03 | −4.5154E−04 | −5.1711E−04 | −1.9136E−04 | 3.0961E−05 |
| A16 = | 6.1833E−04 | | 2.7369E−05 | 1.4746E−05 | −9.5491E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.39 | (T23 + T34)/T56 | 0.51 |
| Fno | 2.15 | (R3 − R4)/(R3 + R4) | 0.05 |
| HFOV [deg.] | 38.6 | f/f3 | −0.59 |
| V2 + V3 + V5 | 68.9 | f1/f3 | −0.76 |
| (N3/V3) + (N5/V5) | 0.14 | f1/f4 | 1.78 |
| f/CT3 | 5.94 | f5/f6 | −31.40 |
| CT1/CT2 | 1.76 | (f/f1) + (f/f2) | 0.73 |
| CT1/CT3 | 0.65 | EPD/TD | 0.42 |
| CT4/T56 | 1.14 | SD/TD | 0.95 |
| T34/CT3 | 0.15 | TL/ImgH | 1.67 |
| T56/CT6 | 2.91 | TL/f | 1.34 |
| T12/T23 | 0.45 | tan(HFOV) | 0.80 |
| T12/T56 | 0.17 | Yc62/f | 0.30 |

4th Embodiment

Figure 7:
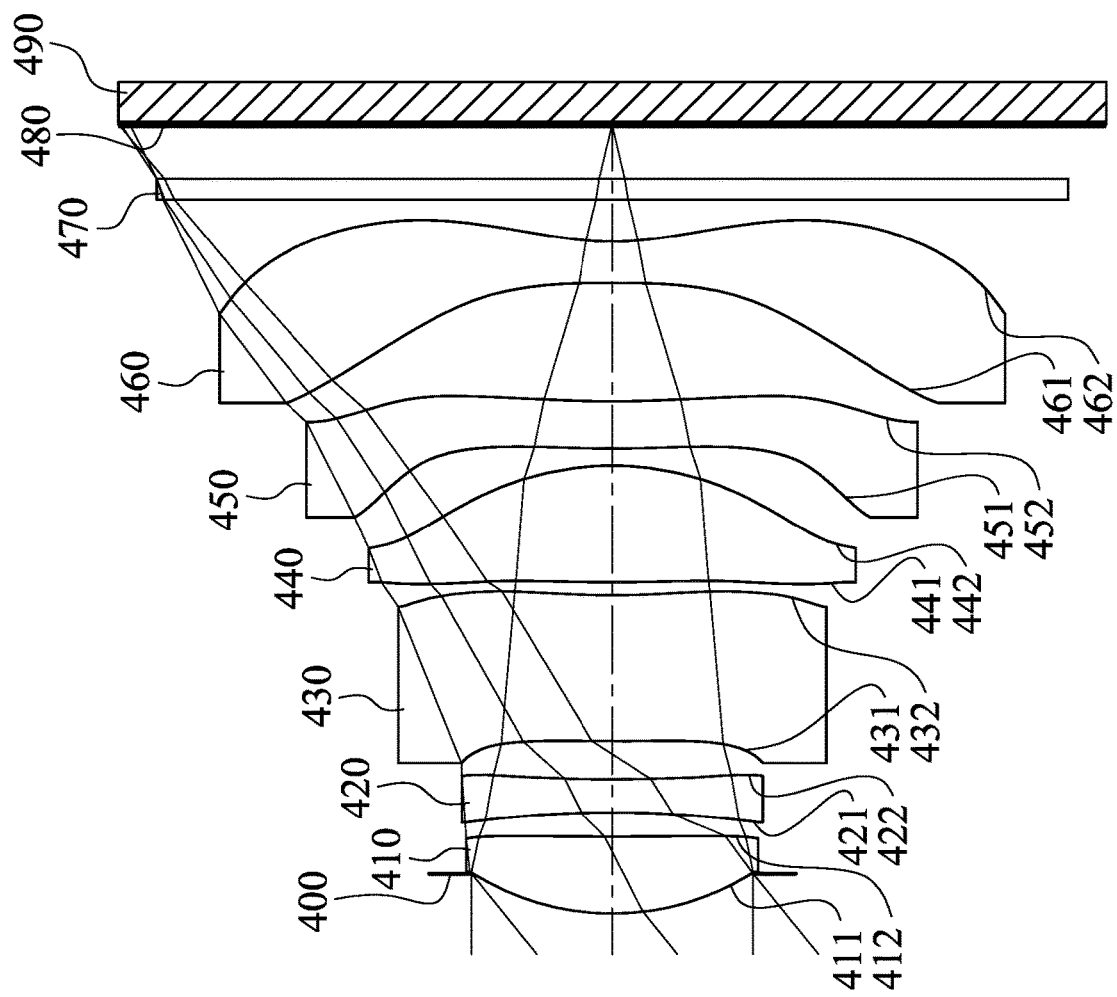
FIG. 7 is a schematic view of an imaging apparatus according to the 4th embodiment of the present disclosure.
Figure 8:
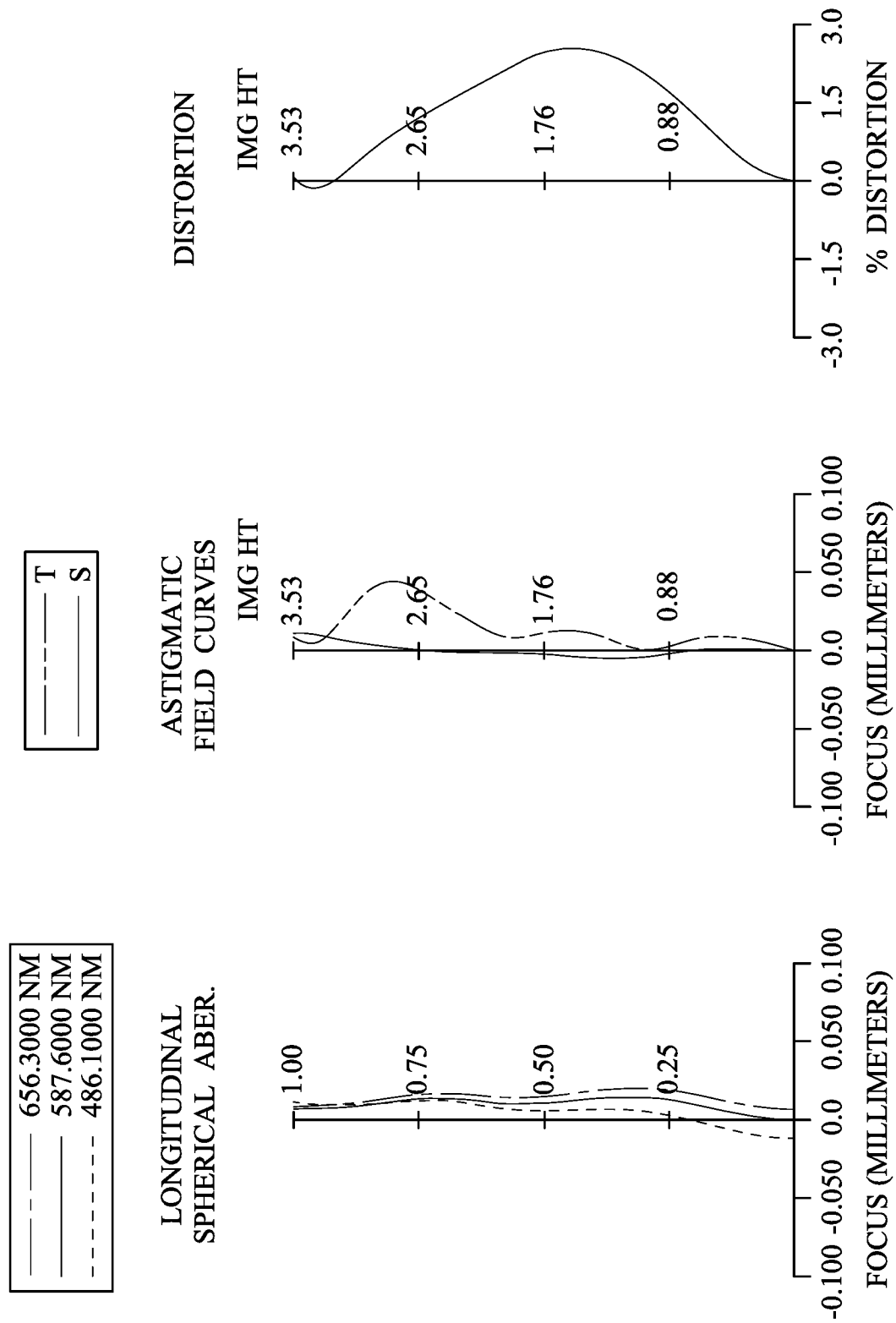
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an image capturing assembly (its reference numeral is omitted) and an image sensor 490. The image capturing assembly includes, in order from an object side to an image side, an aperture stop 400, a first lens element 410, a second lens element 420, a third lens element 430, a fourth lens element 440, a fifth lens element 450, a sixth lens element 460, a filter 470 and an image surface 480, wherein the image sensor 490 is disposed on the image surface 480 of the image capturing assembly. The image capturing assembly includes six lens elements (410, 420, 430, 440, 450, 460) without additional one or more lens elements inserted between the first lens element 410 and the sixth lens element 460.

The first lens element 410 with positive refractive power has an object-side surface 411 being convex and an image-side surface 412 being concave. The first lens element 410 is made of a plastic material, and has the object-side surface 411 and the image-side surface 412 being both aspheric.

The second lens element 420 with negative refractive power has an object-side surface 421 being concave and an image-side surface 422 being concave. The second lens element 420 is made of a plastic material, and has the object-side surface 421 and the image-side surface 422 being both aspheric.

The third lens element 430 with negative refractive power has an object-side surface 431 being convex and an image-side surface 432 being concave. The third lens element 430 is made of a plastic material, and has the object-side surface 431 and the image-side surface 432 being both aspheric.

The fourth lens element 440 with positive refractive power has an object-side surface 441 being convex and an image-side surface 442 being convex. The fourth lens element 440 is made of a plastic material, and has the object-side surface 441 and the image-side surface 442 being both aspheric.

The fifth lens element 450 with negative refractive power has an object-side surface 451 being convex and an image-side surface 452 being concave. The fifth lens element 450 is made of a plastic material, and has the object-side surface 451 and the image-side surface 452 being both aspheric. Furthermore, each of the object-side surface 451 and the image-side surface 452 of the fifth lens element 450 includes at least one inflection point.

The sixth lens element 460 with negative refractive power has an object-side surface 461 being concave and an image-side surface 462 being concave. The sixth lens element 460 is made of a plastic material, and has the object-side surface 461 and the image-side surface 462 being both aspheric. Furthermore, the image-side surface 462 of the sixth lens element 460 includes at least one inflection point.

The filter 470 is made of a glass material and located between the sixth lens element 460 and the image surface 480, and will not affect the focal length of the image capturing assembly.

The detailed optical data of the 4th embodiment are shown in Table 7 and the aspheric surface data are shown in Table 8 below.

TABLE 7

4th Embodiment
f = 4.35 mm, Fno = 2.15, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.287 | | | | |
| 2 | Lens 1 | 1.887 | ASP | 0.554 | Plastic | 1.545 | 56.1 | 3.76 |
| 3 | | 21.557 | ASP | 0.172 | | | | |
| 4 | Lens 2 | −13.278 | ASP | 0.240 | Plastic | 1.614 | 26.0 | −7.35 |
| 5 | | 6.882 | ASP | 0.277 | | | | |
| 6 | Lens 3 | 16.089 | ASP | 1.046 | Plastic | 1.614 | 26.0 | −17.20 |
| 7 | | 6.217 | ASP | 0.093 | | | | |
| 8 | Lens 4 | 26.020 | ASP | 0.840 | Plastic | 1.545 | 56.1 | 3.69 |
| 9 | | −2.154 | ASP | 0.123 | | | | |
| 10 | Lens 5 | 6.987 | ASP | 0.338 | Plastic | 1.614 | 26.0 | −234.05 |
| 11 | | 6.540 | ASP | 0.849 | | | | |
| 12 | Lens 6 | −16.603 | ASP | 0.301 | Plastic | 1.534 | 55.9 | −3.68 |
| 13 | | 2.244 | ASP | 0.300 | | | | |
| 14 | Filter | Plano | | 0.150 | Glass | 1.517 | 64.2 | — |
| 15 | | Plano | | 0.391 | | | | |
| 16 | Image | Plano | | — | | | | |

Reference wavelength is 587.6 nm (d-line).

TABLE 8

Aspheric Coefficients

| | Surface # | | | | | |
|---|---|---|---|---|---|---|
| | 2 | 3 | 4 | 5 | 6 | 7 |
| k = | 3.6385E−02 | 8.5254E+01 | −9.0000E+01 | −8.9799E+01 | 8.3881E+01 | −9.0000E+01 |
| A4 = | −4.4972E−04 | −5.1461E−02 | −1.6507E−01 | −1.2968E−01 | −1.2421E−01 | 4.0849E−02 |
| A6 = | 6.4481E−03 | 2.1523E−02 | 3.7792E−01 | 3.2130E−01 | 4.0820E−02 | −2.2797E−01 |
| A8 = | −1.1268E−02 | 1.1187E−01 | −4.1430E−01 | −2.9464E−01 | 1.1722E−02 | 2.6462E−01 |
| A10 = | 1.7942E−02 | −2.0484E−01 | 2.8357E−01 | 1.6546E−02 | −6.1477E−02 | −1.5365E−01 |
| A12 = | −8.3173E−03 | 1.2031E−01 | −1.7166E−01 | −1.9852E−03 | 1.2925E−02 | 4.8302E−02 |
| A14 = | −3.8138E−03 | −2.7937E−02 | 6.1227E−02 | −1.6155E−03 | 7.5280E−03 | −8.7650E−03 |
| A16 = | | −5.8102E−10 | | | −1.0773E−02 | 8.7843E−04 |

| | Surface # | | | | | |
|---|---|---|---|---|---|---|
| | 8 | 9 | 10 | 11 | 12 | 13 |
| k = | 2.6067E+00 | −7.4555E−01 | 1.1020E+01 | 6.3982E+00 | −5.3252E+00 | −4.2329E−01 |
| A4 = | 8.1922E−02 | 2.2823E−03 | −1.2808E−01 | −9.5347E−02 | −1.4978E−01 | −1.3703E−01 |
| A6 = | −2.9889E−01 | −6.5992E−02 | 7.5606E−02 | 9.7692E−02 | 7.0834E−02 | 4.9296E−02 |
| A8 = | 3.2746E−01 | 1.0458E−01 | −2.2091E−02 | −6.4730E−02 | −2.3950E−02 | −1.5508E−02 |
| A10 = | −1.7105E−01 | −7.8467E−02 | −9.1784E−03 | 2.1771E−02 | 6.5024E−03 | 3.2759E−03 |
| A12 = | 4.4042E−02 | 3.1922E−02 | 5.1730E−03 | −3.9419E−03 | −1.2056E−03 | −4.2854E−04 |
| A14 = | −4.4836E−03 | −6.3688E−03 | −6.0917E−04 | 3.7723E−04 | 1.2546E−04 | 3.0960E−05 |
| A16 = | | 4.8014E−04 | | −1.5332E−05 | −5.3651E−06 | −9.6448E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

4th Embodiment

| f [mm] | 4.35 | (T23 + T34)/T56 | 0.44 |
|---|---|---|---|
| Fno | 2.15 | (R3 − R4)/(R3 + R4) | 3.15 |

-continued

4th Embodiment

| HFOV [deg.] | 39.0 | f/f3 | −0.25 |
|---|---|---|---|
| V2 + V3 + V5 | 77.9 | f1/f3 | −0.22 |
| (N3/V3) + (N5/V5) | 0.12 | f1/f4 | 1.02 |
| f/CT3 | 4.15 | f5/f6 | 63.56 |
| CT1/CT2 | 2.31 | (f/f1) + (f/f2) | 0.57 |
| CT1/CT3 | 0.53 | EPD/TD | 0.42 |
| CT4/T56 | 0.99 | SD/TD | 0.94 |
| T34/CT3 | 0.09 | TL/ImgH | 1.61 |
| T56/CT6 | 2.82 | TL/f | 1.31 |
| T12/T23 | 0.62 | tan(HFOV) | 0.81 |
| T12/T56 | 0.20 | Yc62/f | 0.32 |

5th Embodiment

Figure 9:
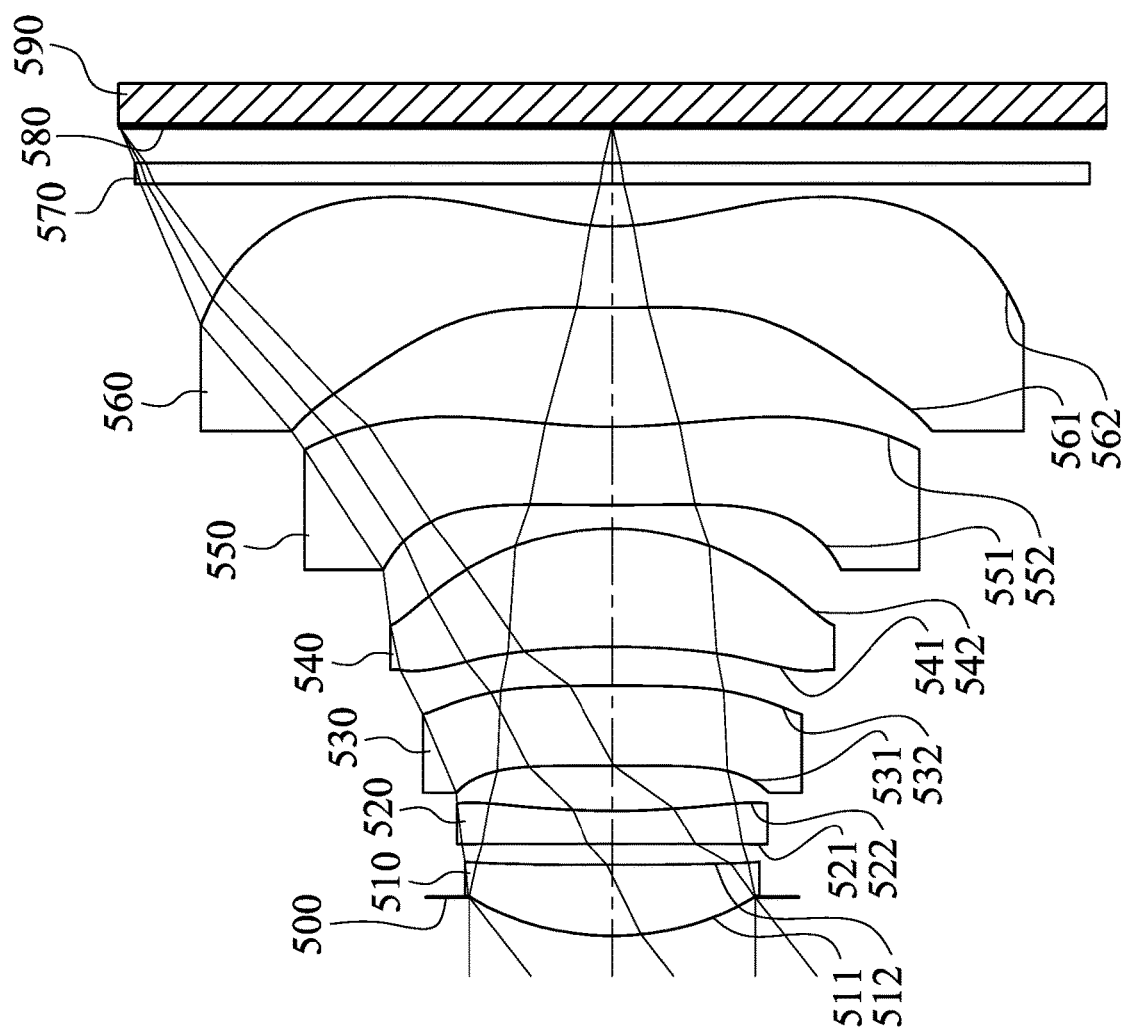
FIG. 9 is a schematic view of an imaging apparatus according to the 5th embodiment of the present disclosure.
Figure 10:
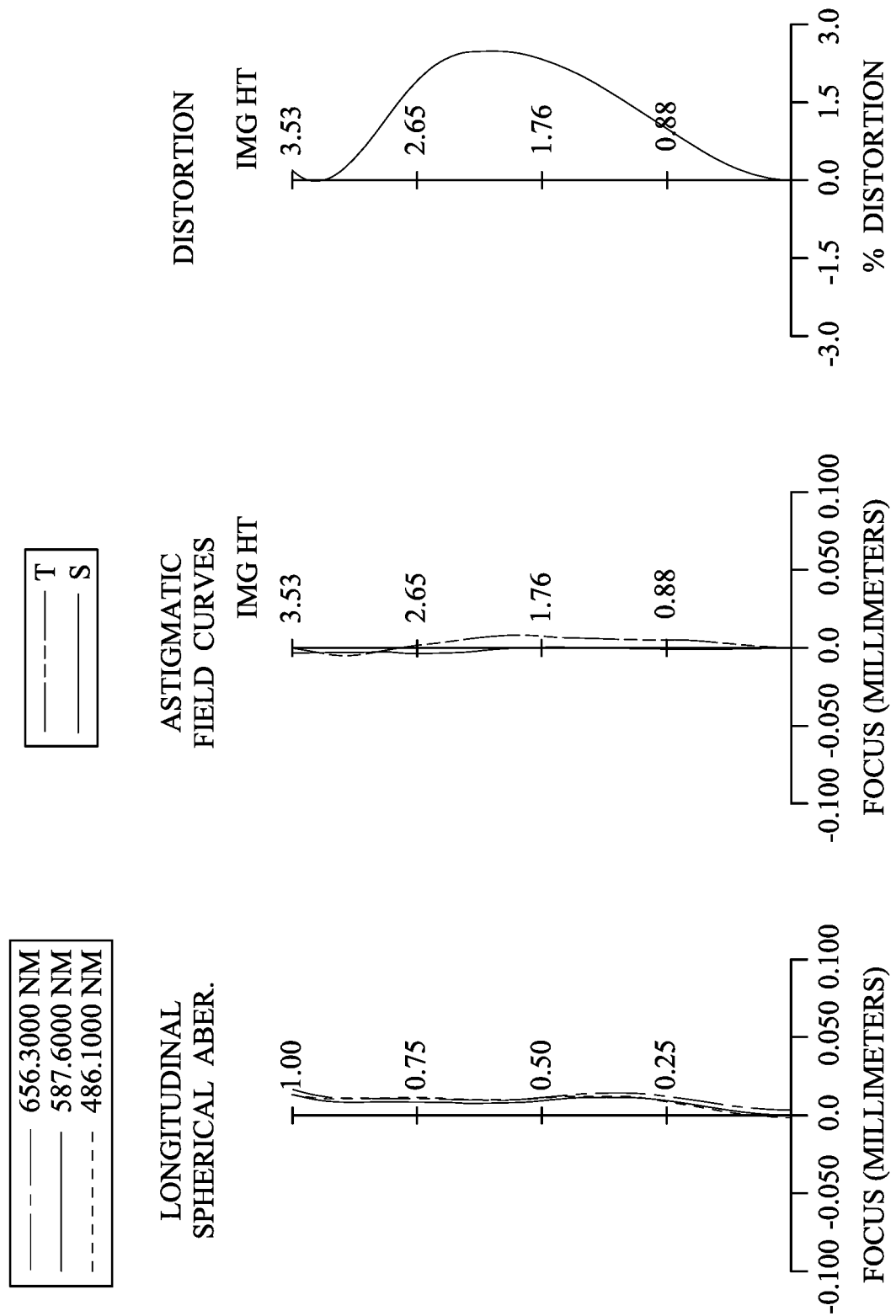
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing assembly (its reference numeral is omitted) and an image sensor 590. The image capturing assembly includes, in order from an object side to an image side, an aperture stop 500, a first lens element 510, a second lens element 520, a third lens element 530, a fourth lens element 540, a fifth lens element 550, a sixth lens element 560, a filter 570 and an image surface 580, wherein the image sensor 590 is disposed on the image surface 580 of the image capturing assembly. The image capturing assembly includes six lens elements (510, 520, 530, 540, 550, 560) without additional one or more lens elements inserted between the first lens element 510 and the sixth lens element 560.

The first lens element 510 with positive refractive power has an object-side surface 511 being convex and an image-side surface 512 being concave. The first lens element 510 is made of a plastic material, and has the object-side surface 511 and the image-side surface 512 being both aspheric.

The second lens element 520 with negative refractive power has an object-side surface 521 being convex and an image-side surface 522 being concave. The second lens element 520 is made of a plastic material, and has the object-side surface 521 and the image-side surface 522 being both aspheric.

The third lens element 530 with positive refractive power has an object-side surface 531 being convex and an image-side surface 532 being convex. The third lens element 530 is made of a plastic material, and has the object-side surface 531 and the image-side surface 532 being both aspheric.

The fourth lens element 540 with positive refractive power has an object-side surface 541 being concave and an image-side surface 542 being convex. The fourth lens element 540 is made of a plastic material, and has the object-side surface 541 and the image-side surface 542 being both aspheric.

The fifth lens element 550 with negative refractive power has an object-side surface 551 being convex and an image-side surface 552 being concave. The fifth lens element 550 is made of a plastic material, and has the object-side surface 551 and the image-side surface 552 being both aspheric. Furthermore, each of the object-side surface 551 and the image-side surface 552 of the fifth lens element 550 includes at least one inflection point.

The sixth lens element 560 with negative refractive power has an object-side surface 561 being convex and an image-side surface 562 being concave. The sixth lens element 560 is made of a plastic material, and has the object-side surface 561 and the image-side surface 562 being both aspheric. Furthermore, the image-side surface 562 of the sixth lens element 560 includes at least one inflection point.

The filter 570 is made of a glass material and located between the sixth lens element 560 and the image surface 580, and will not affect the focal length of the image capturing assembly.

The detailed optical data of the 5th embodiment are shown in Table 9 and the aspheric surface data are shown in Table 10 below.

TABLE 9

5th Embodiment
f = 4.50 mm, Fno = 2.20, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.276 | | | | |
| 2 | Lens 1 | 2.070 | ASP | 0.508 | Plastic | 1.534 | 55.9 | 4.11 |
| 3 | | 34.154 | ASP | 0.150 | | | | |
| 4 | Lens 2 | 33.153 | ASP | 0.240 | Plastic | 1.671 | 19.5 | −9.05 |
| 5 | | 5.115 | ASP | 0.322 | | | | |
| 6 | Lens 3 | 35.424 | ASP | 0.573 | Plastic | 1.671 | 19.5 | 27.68 |
| 7 | | −38.759 | ASP | 0.278 | | | | |
| 8 | Lens 4 | −6.735 | ASP | 0.850 | Plastic | 1.530 | 55.8 | 4.65 |
| 9 | | −1.884 | ASP | 0.168 | | | | |
| 10 | Lens 5 | 19.654 | ASP | 0.561 | Plastic | 1.671 | 19.5 | −9.19 |
| 11 | | 4.640 | ASP | 0.850 | | | | |
| 12 | Lens 6 | 12.836 | ASP | 0.587 | Plastic | 1.530 | 55.8 | −4.49 |
| 13 | | 1.976 | ASP | 0.300 | | | | |
| 14 | Filter | Plano | | 0.150 | Glass | 1.517 | 64.2 | — |
| 15 | | Plano | | 0.265 | | | | |
| 16 | Image | Plano | | — | | | | |

Reference wavelength is 587.6 nm (d-line).

TABLE 10

Aspheric Coefficients

| | Surface # | | | | | |
|---|---|---|---|---|---|---|
| | 2 | 3 | 4 | 5 | 6 | 7 |
| k = | 9.9850E−02 | 9.0000E+01 | 9.0000E+01 | −8.9806E+01 | 8.4369E+01 | −9.0000E+01 |
| A4 = | 9.0469E−04 | −1.1700E−02 | −6.4965E−02 | 5.8799E−03 | −9.5182E−02 | −6.9170E−02 |

TABLE 10-continued

| Aspheric Coefficients | | | | | |
|---|---|---|---|---|---|
| A6 =  | 1.0929E−02 | 1.2750E−03 | 1.0165E−01 | −1.7346E−02 | 1.9329E−02 | 2.2260E−02 |
| A8 =  | −1.4608E−02 | 9.4283E−02 | −3.2651E−02 | 8.8416E−02 | −6.1482E−02 | −5.9601E−02 |
| A10 = | 1.5692E−02 | −1.8140E−01 | −8.4842E−02 | −1.6128E−01 | 5.4133E−02 | 7.3371E−02 |
| A12 = | −5.4863E−03 | 1.4255E−01 | 9.7606E−02 | 1.1183E−01 | −2.6750E−02 | −4.7741E−02 |
| A14 = | 3.3642E−04 | −4.0169E−02 | −3.2243E−02 | −3.1200E−02 | −1.1409E−02 | 1.7279E−02 |
| A16 = |  | −1.4079E−03 |  |  | 6.9310E−03 | −2.5312E−03 |

| | Surface # | | | | | |
|---|---|---|---|---|---|---|
| | 8 | 9 | 10 | 11 | 12 | 13 |
| k =  | 2.6067E+00 | −7.5414E−01 | −9.0000E+01 | 2.1052E+00 | −5.3252E+00 | −5.9115E−01 |
| A4 = | −2.1064E−02 | 6.4284E−03 | −4.2911E−02 | −5.4811E−02 | −1.3331E−01 | −1.4186E−01 |
| A6 = | 2.2366E−02 | 5.9578E−03 | 8.6581E−03 | 1.4046E−02 | 3.2512E−02 | 5.0908E−02 |
| A8 = | −5.1201E−02 | −2.6828E−02 | −2.5141E−02 | −1.0548E−02 | −6.8923E−05 | −1.5702E−02 |
| A10 = | 4.1436E−02 | 1.7270E−02 | 1.4465E−02 | 5.0273E−03 | −2.7043E−03 | 3.2675E−03 |
| A12 = | −1.2224E−02 | −3.5098E−03 | −3.5547E−03 | −1.2139E−03 | 9.4918E−04 | −4.2794E−04 |
| A14 = | 1.2634E−03 | −4.2236E−04 | 2.2940E−04 | 1.4298E−04 | −1.4331E−04 | 3.1111E−05 |
| A16 = |  | 2.2475E−04 |  | −6.6555E−06 | 7.9813E−06 | −9.6294E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.50 | (T23 + T34)/T56 | 0.71 |
| Fno | 2.20 | (R3 − R4)/(R3 + R4) | 0.73 |
| HFOV [deg.] | 38.0 | f/f3 | 0.16 |
| V2 + V3 + V5 | 58.4 | f1/f3 | 0.15 |
| (N3/V3) + (N5/V5) | 0.17 | f1/f4 | 0.88 |
| f/CT3 | 7.85 | f5/f6 | 2.05 |
| CT1/CT2 | 2.12 | (f/f1) + (f/f2) | 0.60 |
| CT1/CT3 | 0.89 | EPD/TD | 0.40 |
| CT4/T56 | 1.00 | SD/TD | 0.95 |
| T34/CT3 | 0.49 | TL/ImgH | 1.64 |
| T56/CT6 | 1.45 | TL/f | 1.29 |
| T12/T23 | 0.47 | tan(HFOV) | 0.78 |
| T12/T56 | 0.18 | Yc62/f | 0.34 |

6th Embodiment

Figure 11:
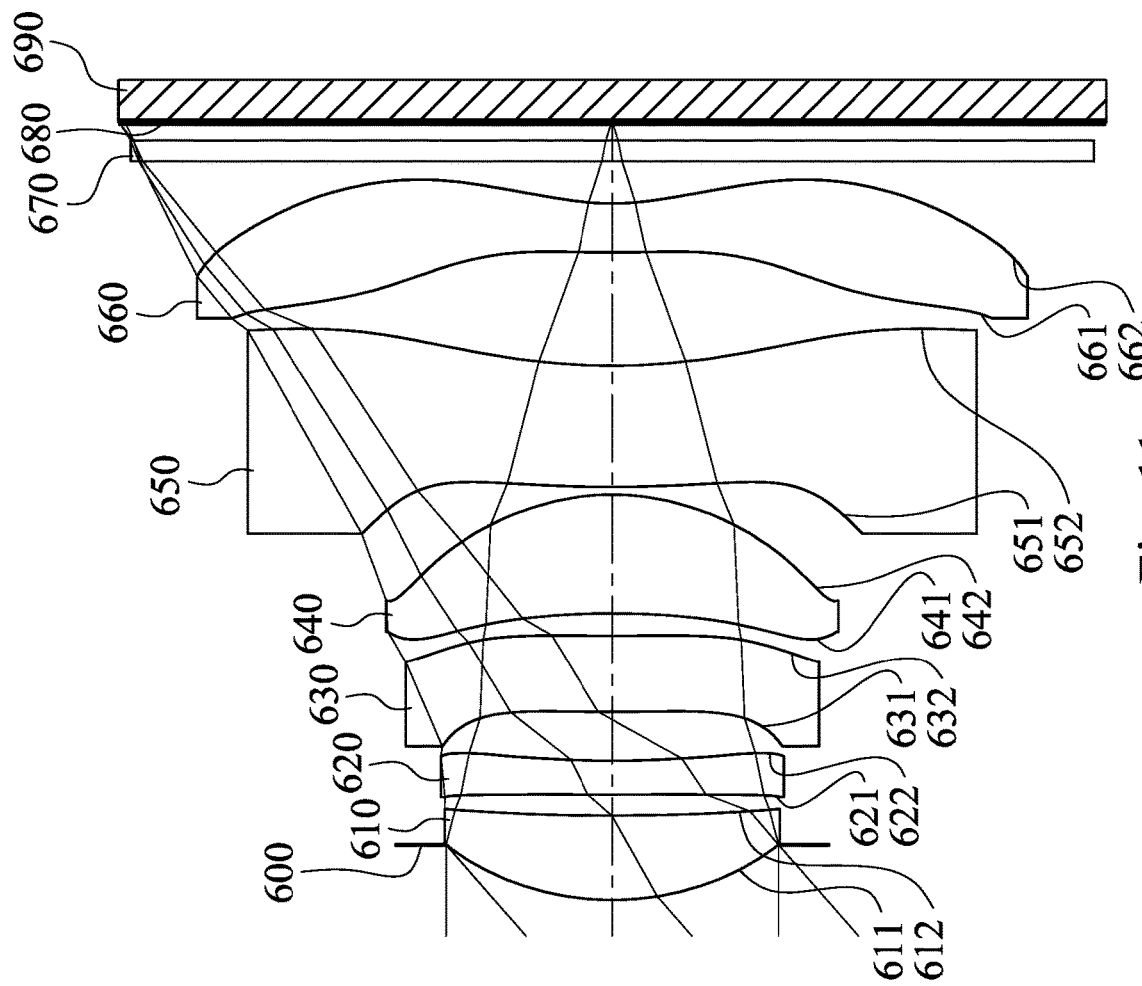
FIG. 11 is a schematic view of an imaging apparatus according to the 6th embodiment of the present disclosure.
Figure 12:
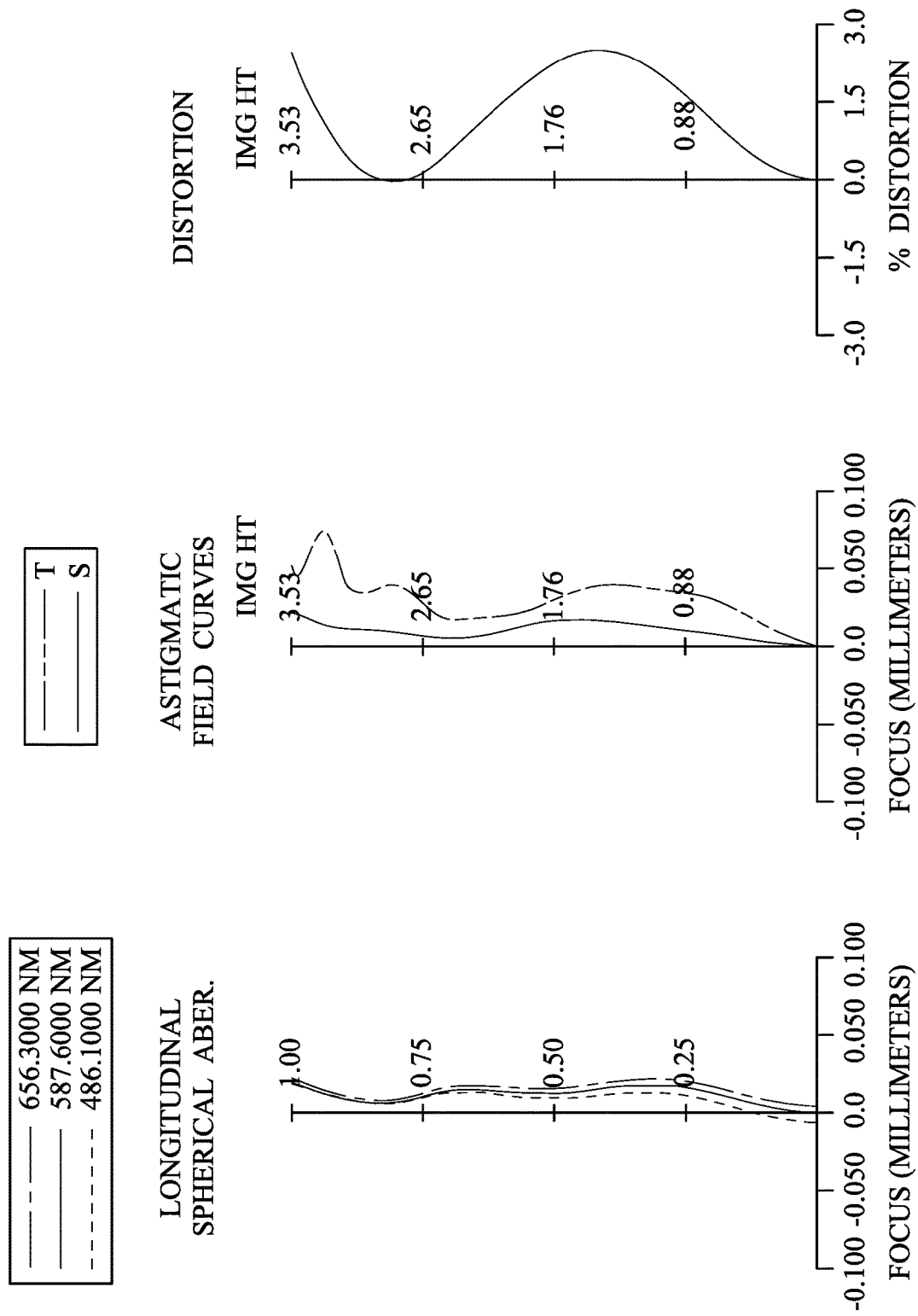
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing assembly (its reference numeral is omitted) and an image sensor 690. The image capturing assembly includes, in order from an object side to an image side, an aperture stop 600, a first lens element 610, a second lens element 620, a third lens element 630, a fourth lens element 640, a fifth lens element 650, a sixth lens element 660, a filter 670 and an image surface 680, wherein the image sensor 690 is disposed on the image surface 680 of the image capturing assembly. The image capturing assembly includes six lens elements (610, 620, 630, 640, 650, 660) without additional one or more lens elements inserted between the first lens element 610 and the sixth lens element 660.

The first lens element 610 with positive refractive power has an object-side surface 611 being convex and an image-side surface 612 being concave. The first lens element 610 is made of a plastic material, and has the object-side surface 611 and the image-side surface 612 being both aspheric.

The second lens element 620 with negative refractive power has an object-side surface 621 being convex and an image-side surface 622 being concave. The second lens element 620 is made of a plastic material, and has the object-side surface 621 and the image-side surface 622 being both aspheric.

The third lens element 630 with positive refractive power has an object-side surface 631 being convex and an image-side surface 632 being concave. The third lens element 630 is made of a plastic material, and has the object-side surface 631 and the image-side surface 632 being both aspheric.

The fourth lens element 640 with positive refractive power has an object-side surface 641 being concave and an image-side surface 642 being convex. The fourth lens element 640 is made of a plastic material, and has the object-side surface 641 and the image-side surface 642 being both aspheric.

The fifth lens element 650 with negative refractive power has an object-side surface 651 being convex and an image-side surface 652 being concave. The fifth lens element 650 is made of a plastic material, and has the object-side surface 651 and the image-side surface 652 being both aspheric. Furthermore, each of the object-side surface 651 and the image-side surface 652 of the fifth lens element 650 includes at least one inflection point.

The sixth lens element 660 with negative refractive power has an object-side surface 661 being convex and an image-side surface 662 being concave. The sixth lens element 660 is made of a plastic material, and has the object-side surface 661 and the image-side surface 662 being both aspheric. Furthermore, the image-side surface 662 of the sixth lens element 660 includes at least one inflection point.

The filter 670 is made of a glass material and located between the sixth lens element 660 and the image surface 680, and will not affect the focal length of the image capturing assembly.

The detailed optical data of the 6th embodiment are shown in Table 11 and the aspheric surface data are shown in Table 12 below.

TABLE 11

6th Embodiment
f = 3.93 mm, Fno = 1.65, HFOV = 41.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.395 | | | | |
| 2 | Lens 1 | 2.064 | ASP | 0.604 | Plastic | 1.535 | 56.3 | 4.45 |
| 3 | | 13.942 | ASP | 0.150 | | | | |
| 4 | Lens 2 | 31.744 | ASP | 0.241 | Plastic | 1.671 | 19.5 | −11.61 |
| 5 | | 6.234 | ASP | 0.351 | | | | |
| 6 | Lens 3 | 12.281 | ASP | 0.545 | Plastic | 1.671 | 19.5 | 49.87 |
| 7 | | 19.059 | ASP | 0.161 | | | | |
| 8 | Lens 4 | −6.488 | ASP | 0.850 | Plastic | 1.530 | 55.8 | 4.18 |
| 9 | | −1.726 | ASP | 0.054 | | | | |
| 10 | Lens 5 | 10.610 | ASP | 0.871 | Plastic | 1.671 | 19.5 | −13.78 |
| 11 | | 4.777 | ASP | 0.810 | | | | |
| 12 | Lens 6 | 9.720 | ASP | 0.350 | Plastic | 1.671 | 19.5 | −3.99 |
| 13 | | 2.068 | ASP | 0.300 | | | | |
| 14 | Filter | Plano | | 0.150 | Glass | 1.517 | 64.2 | — |
| 15 | | Plano | | 0.131 | | | | |
| 16 | Image | Plano | | — | | | | |

Reference wavelength is 587.6 nm (d-line).

TABLE 12

Aspheric Coefficients

| | Surface # | | | | | |
|---|---|---|---|---|---|---|
| | 2 | 3 | 4 | 5 | 6 | 7 |
| k = | 4.4803E−02 | −8.5513E+01 | −8.5996E+01 | −8.9796E+01 | 8.3966E+01 | −9.0000E+01 |
| A4 = | −6.8954E−05 | −1.6917E−02 | −5.8152E−02 | −1.7141E−02 | −1.2441E−01 | −1.0040E−01 |
| A6 = | 1.1455E−02 | 1.7874E−03 | 4.2897E−02 | 1.6300E−02 | 1.6157E−01 | 1.1789E−01 |
| A8 = | −1.5824E−02 | 9.9155E−02 | 9.2309E−02 | 6.1324E−02 | −4.5506E−01 | −1.7733E−01 |
| A10 = | 1.4981E−02 | −1.8341E−01 | −2.0786E−01 | −1.3718E−01 | 6.6483E−01 | 1.4015E−01 |
| A12 = | −5.4757E−03 | 1.3924E−01 | 1.5468E−01 | 1.0052E−01 | −5.6758E−01 | −6.1452E−02 |
| A14 = | 7.3752E−04 | −4.1187E−02 | −4.1826E−02 | −2.7812E−02 | 2.5118E−01 | 1.5328E−02 |
| A16 = | | 1.4349E−03 | | | −4.6274E−02 | −1.7008E−03 |

| | Surface # | | | | | |
|---|---|---|---|---|---|---|
| | 8 | 9 | 10 | 11 | 12 | 13 |
| k = | 2.5855E+00 | −7.6758E−01 | 2.8918E+01 | 1.6304E+00 | −5.3252E+00 | −5.6269E−01 |
| A4 = | −5.9844E−02 | 4.1042E−02 | 1.5365E−02 | −2.6335E−03 | −1.3418E−01 | −1.4589E−01 |
| A6 = | 1.1760E−01 | −7.5052E−02 | −4.6986E−02 | −2.8439E−03 | 3.1120E−02 | 5.1295E−02 |
| A8 = | −1.3776E−01 | 9.6916E−02 | 2.6410E−02 | −1.4366E−03 | 5.9084E−03 | −1.5663E−02 |
| A10 = | 7.5999E−02 | −9.4768E−02 | −1.3206E−02 | 7.5540E−04 | −3.9195E−03 | 3.2746E−03 |
| A12 = | −1.8126E−02 | 5.4712E−02 | 3.0590E−03 | −1.4271E−04 | 7.3675E−04 | −4.2785E−04 |
| A14 = | 1.6032E−03 | −1.7011E−02 | −2.3024E−04 | 1.2752E−05 | −6.3023E−05 | 3.1028E−05 |
| A16 = | | 2.2364E−03 | | −4.5459E−07 | 2.0875E−06 | −9.5633E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.93 | (T23 + T34)/T56 | 0.63 |
| Fno | 1.65 | (R3 − R4)/(R3 + R4) | 0.67 |

-continued

| 6th Embodiment | | | |
|---|---|---|---|
| HFOV [deg.] | 41.2 | f/f3 | 0.08 |
| V2 + V3 + V5 | 58.4 | f1/f3 | 0.09 |
| (N3/V3) + (N5/V5) | 0.17 | f1/f4 | 1.07 |
| f/CT3 | 7.20 | f5/f6 | 3.45 |
| CT1/CT2 | 2.51 | (f/f1) + (f/f2) | 0.54 |
| CT1/CT3 | 1.11 | EPD/TD | 0.48 |
| CT4/CT56 | 1.05 | SD/TD | 0.92 |
| T34/CT3 | 0.30 | TL/ImgH | 1.58 |
| T56/CT6 | 2.31 | TL/f | 1.42 |
| T12/T23 | 0.43 | tan(HFOV) | 0.88 |
| T12/T56 | 0.19 | Yc62/f | 0.35 |

7th Embodiment

Figure 13:
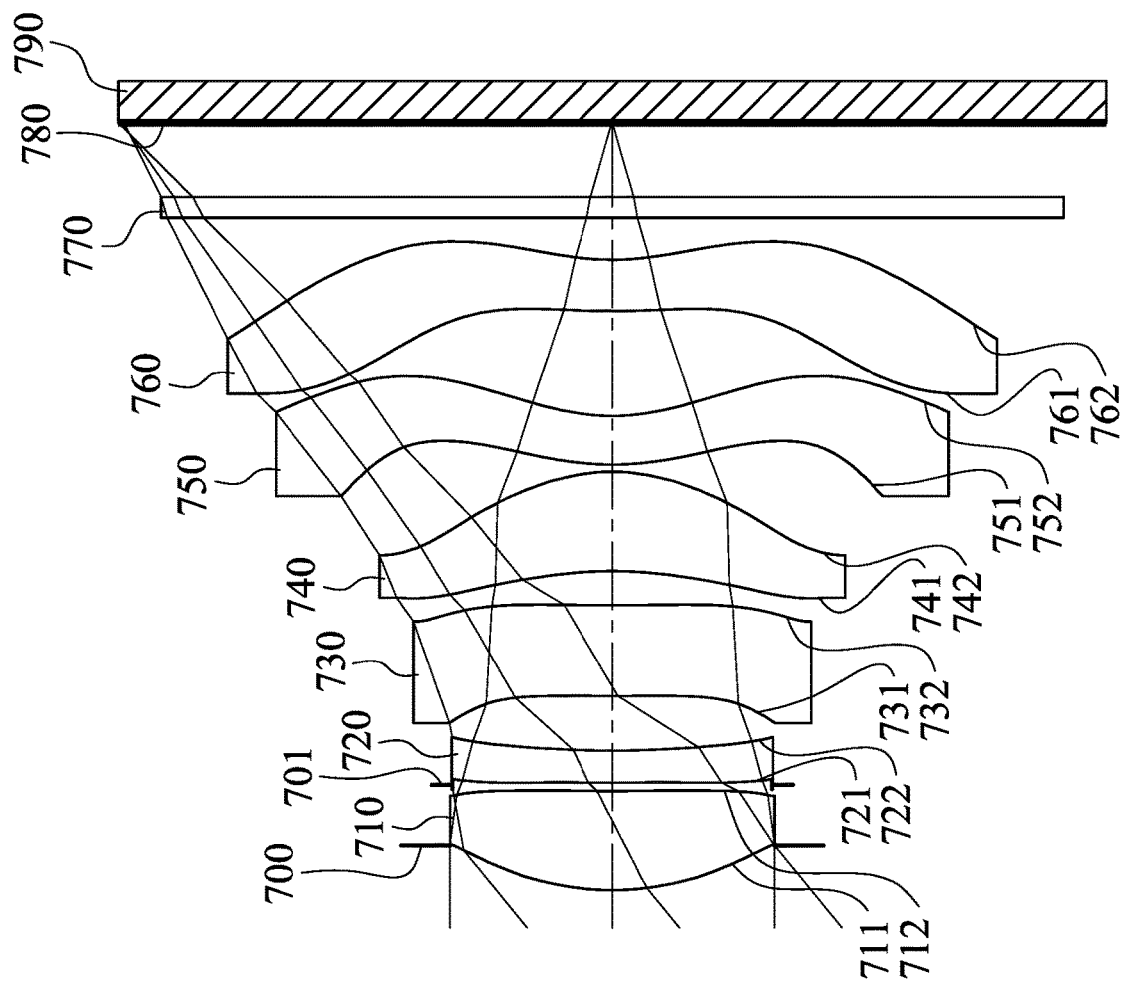
FIG. 13 is a schematic view of an imaging apparatus according to the 7th embodiment of the present disclosure.
Figure 14:
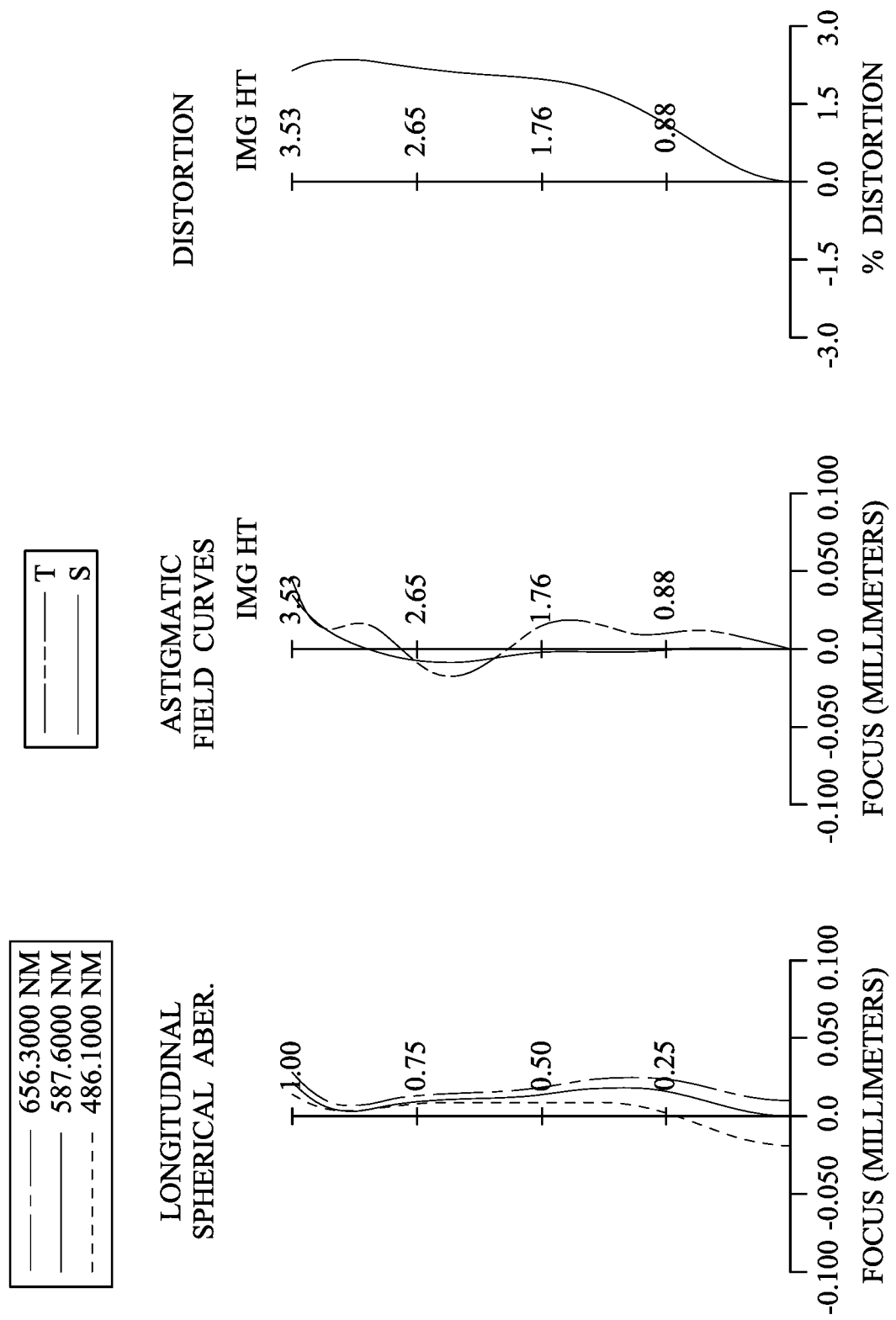
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing assembly (its reference numeral is omitted) and an image sensor 790. The image capturing assembly includes, in order from an object side to an image side, an aperture stop 700, a first lens element 710, a stop 701, a second lens element 720, a third lens element 730, a fourth lens element 740, a fifth lens element 750, a sixth lens element 760, a filter 770 and an image surface 780, wherein the image sensor 790 is disposed on the image surface 780 of the image capturing assembly. The image capturing assembly includes six lens elements (710, 720, 730, 740, 750, 760) without additional one or more lens elements inserted between the first lens element 710 and the sixth lens element 760.

The first lens element 710 with positive refractive power has an object-side surface 711 being convex and an image-side surface 712 being concave. The first lens element 710 is made of a plastic material, and has the object-side surface 711 and the image-side surface 712 being both aspheric.

The second lens element 720 with negative refractive power has an object-side surface 721 being convex and an image-side surface 722 being concave. The second lens element 720 is made of a plastic material, and has the object-side surface 721 and the image-side surface 722 being both aspheric.

The third lens element 730 with negative refractive power has an object-side surface 731 being convex and an image-side surface 732 being concave. The third lens element 730 is made of a plastic material, and has the object-side surface 731 and the image-side surface 732 being both aspheric.

The fourth lens element 740 with positive refractive power has an object-side surface 741 being concave and an image-side surface 742 being convex. The fourth lens element 740 is made of a plastic material, and has the object-side surface 741 and the image-side surface 742 being both aspheric.

The fifth lens element 750 with negative refractive power has an object-side surface 751 being convex and an image-side surface 752 being concave. The fifth lens element 750 is made of a plastic material, and has the object-side surface 751 and the image-side surface 752 being both aspheric. Furthermore, each of the object-side surface 751 and the image-side surface 752 of the fifth lens element 750 includes at least one inflection point.

The sixth lens element 760 with negative refractive power has an object-side surface 761 being convex and an image-side surface 762 being concave. The sixth lens element 760 is made of a plastic material, and has the object-side surface 761 and the image-side surface 762 being both aspheric. Furthermore, the image-side surface 762 of the sixth lens element 760 includes at least one inflection point.

The filter 770 is made of a glass material and located between the sixth lens element 760 and the image surface 780, and will not affect the focal length of the image capturing assembly.

The detailed optical data of the 7th embodiment are shown in Table 13 and the aspheric surface data are shown in Table 14 below.

TABLE 13

7th Embodiment
f = 4.21 mm, Fno = 1.80, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.321 | | | | |
| 2 | Lens 1 | 2.033 | ASP | 0.713 | Plastic | 1.545 | 56.1 | 4.32 |
| 3 | | 12.947 | ASP | 0.044 | | | | |
| 4 | Stop | Plano | | 0.015 | | | | |
| 5 | Lens 2 | 15.219 | ASP | 0.230 | Plastic | 1.661 | 20.3 | −13.46 |
| 6 | | 5.579 | ASP | 0.396 | | | | |
| 7 | Lens 3 | 18.357 | ASP | 0.655 | Plastic | 1.661 | 20.3 | −140.92 |
| 8 | | 15.116 | ASP | 0.246 | | | | |
| 9 | Lens 4 | −3.216 | ASP | 0.715 | Plastic | 1.545 | 56.1 | 4.11 |
| 10 | | −1.423 | ASP | 0.051 | | | | |
| 11 | Lens 5 | 2.080 | ASP | 0.350 | Plastic | 1.639 | 23.3 | −11.29 |
| 12 | | 1.509 | ASP | 0.759 | | | | |
| 13 | Lens 6 | 5.239 | ASP | 0.370 | Plastic | 1.544 | 56.0 | −6.06 |
| 14 | | 1.974 | ASP | 0.300 | | | | |
| 15 | Filter | Plano | | 0.150 | Glass | 1.517 | 64.2 | — |
| 16 | | Plano | | 0.533 | | | | |
| 17 | Image | Plano | | — | | | | |

Reference wavelength is 587.6 nm (d-line).
Effective radius of Stop on Surface 4 is 1.150 mm.

TABLE 14

Aspheric Coefficients

| | Surface # | | | | | |
|---|---|---|---|---|---|---|
| | 2 | 3 | 5 | 6 | 7 | 8 |
| k = | −1.6091E−01 | −8.4598E+01 | 1.9411E+00 | −8.3142E+01 | −9.0000E+01 | 7.1327E+00 |
| A4 = | −2.6329E−03 | −1.1913E−01 | −1.7596E−01 | −5.0768E−02 | −1.2084E−01 | −8.4877E−02 |

TABLE 14-continued

| Aspheric Coefficients | | | | | |
|---|---|---|---|---|---|
| A6 = | 6.5044E−03 | 1.3851E−01 | 2.9221E−01 | 1.2352E−01 | 1.1022E−01 | 1.1532E−01 |
| A8 = | −1.9315E−02 | 1.4570E−02 | −1.2413E−01 | −9.0479E−02 | −3.7832E−01 | −2.0202E−01 |
| A10 = | 1.6565E−02 | −1.7326E−01 | −9.8106E−02 | 2.3743E−02 | 6.4916E−01 | 1.9892E−01 |
| A12 = | −8.2976E−03 | 1.2357E−01 | 1.0816E−01 | −5.6459E−03 | −6.4524E−01 | −1.1881E−01 |
| A14 = | | −2.7894E−02 | −2.6222E−02 | 5.1690E−03 | 3.2792E−01 | 3.9574E−02 |
| A16 = | | | | | −6.3588E−02 | −5.3240E−03 |

| | Surface # | | | | | |
|---|---|---|---|---|---|---|
| | 9 | 10 | 11 | 12 | 13 | 14 |
| k = | −3.4491E+00 | −1.2934E+00 | −3.7513E−01 | −1.7546E+00 | −2.0087E+00 | −1.7230E+00 |
| A4 = | −1.8189E−02 | 3.1691E−02 | −9.6183E−02 | −1.1832E−01 | −1.4050E−01 | −1.5708E−01 |
| A6 = | 9.1591E−02 | −3.7742E−02 | −4.0838E−03 | 3.6697E−02 | 1.8557E−02 | 5.4579E−02 |
| A8 = | −9.6144E−02 | 5.2016E−02 | 9.6722E−03 | −9.1016E−03 | 4.5278E−03 | −1.5502E−02 |
| A10 = | 4.4335E−02 | −4.6290E−02 | −5.1785E−03 | 1.0315E−03 | −1.3960E−03 | 3.2497E−03 |
| A12 = | −7.1322E−03 | 2.4891E−02 | 1.0410E−03 | 6.1650E−05 | 1.2303E−04 | −4.3007E−04 |
| A14 = | | −6.3902E−03 | −6.5839E−05 | −2.3103E−05 | −2.2021E−06 | 3.1103E−05 |
| A16 = | | 6.0226E−04 | | 1.3435E−06 | −1.3479E−07 | −9.2655E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.21 | (T23 + T34)/T56 | 0.85 |
| Fno | 1.80 | (R3 − R4)/(R3 + R4) | 0.46 |
| HFOV [deg.] | 39.3 | f/f3 | −0.03 |
| V2 + V3 + V5 | 64.0 | f1/f3 | −0.03 |
| (N3/V3) + (N5/V5) | 0.15 | f1/f4 | 1.05 |
| f/CT3 | 6.42 | f5/f6 | 1.86 |
| CT1/CT2 | 3.10 | (f/f1) + (f/f2) | 0.66 |
| CT1/CT3 | 1.09 | EPD/TD | 0.51 |
| CT4/T56 | 0.94 | SD/TD | 0.93 |
| T34/CT3 | 0.38 | TL/ImgH | 1.57 |
| T56/CT6 | 2.05 | TL/f | 1.31 |
| T12/T23 | 0.15 | tan(HFOV) | 0.82 |
| T12/T56 | 0.08 | Yc62/f | 0.27 |

8th Embodiment

Figure 15:
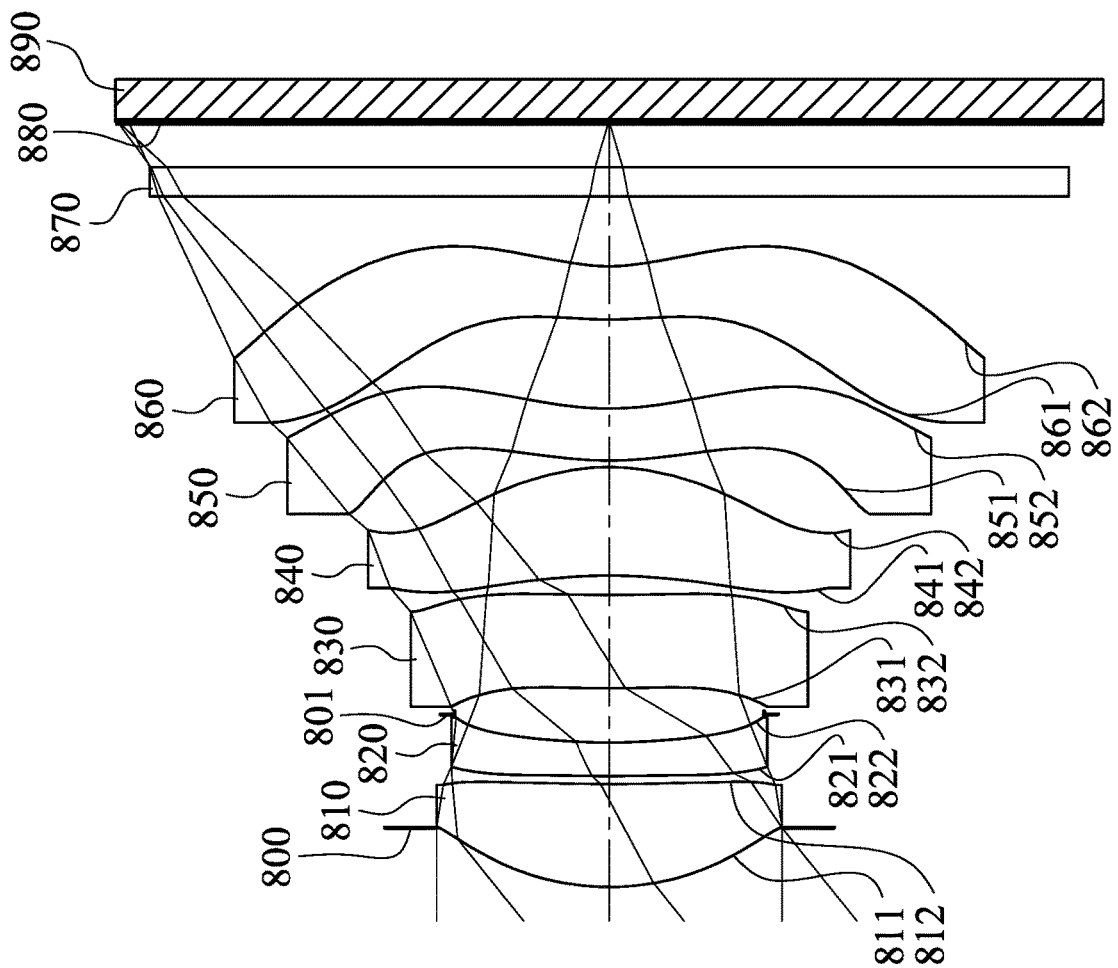
FIG. 15 is a schematic view of an imaging apparatus according to the 8th embodiment of the present disclosure.
Figure 16:
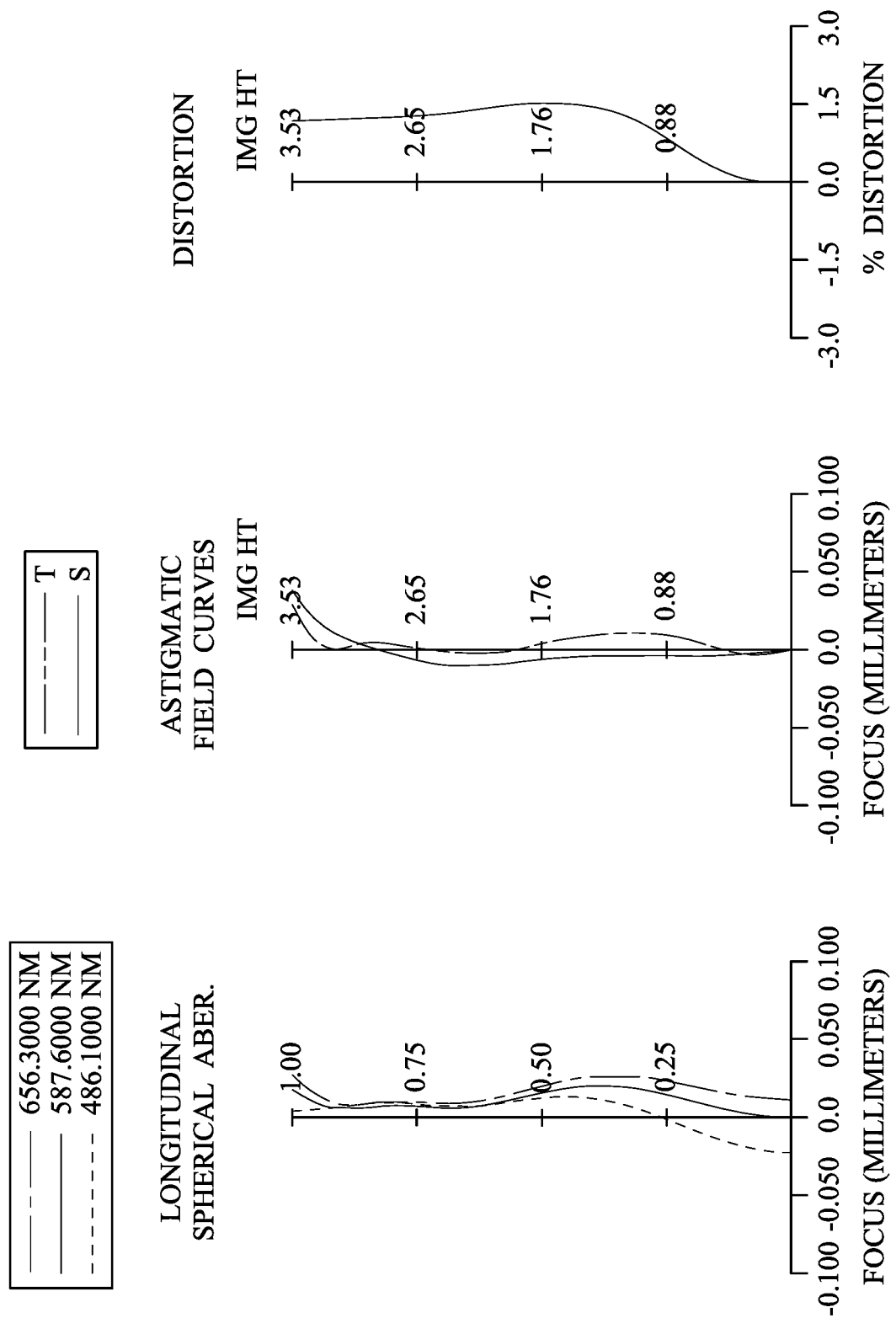
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an image capturing assembly (its reference numeral is omitted) and an image sensor 890. The image capturing assembly includes, in order from an object side to an image side, an aperture stop 800, a first lens element 810, a second lens element 820, a stop 801, a third lens element 830, a fourth lens element 840, a fifth lens element 850, a sixth lens element 860, a filter 870 and an image surface 880, wherein the image sensor 890 is disposed on the image surface 880 of the image capturing assembly. The image capturing assembly includes six lens elements (810, 820, 830, 840, 850, 860) without additional one or more lens elements inserted between the first lens element 810 and the sixth lens element 860.

The first lens element 810 with positive refractive power has an object-side surface 811 being convex and an image-side surface 812 being concave. The first lens element 810 is made of a plastic material, and has the object-side surface 811 and the image-side surface 812 being both aspheric.

The second lens element 820 with negative refractive power has an object-side surface 821 being convex and an image-side surface 822 being concave. The second lens element 820 is made of a plastic material, and has the object-side surface 821 and the image-side surface 822 being both aspheric.

The third lens element 830 with positive refractive power has an object-side surface 831 being convex and an image-side surface 832 being concave. The third lens element 830 is made of a plastic material, and has the object-side surface 831 and the image-side surface 832 being both aspheric.

The fourth lens element 840 with positive refractive power has an object-side surface 841 being concave and an image-side surface 842 being convex. The fourth lens element 840 is made of a plastic material, and has the object-side surface 841 and the image-side surface 842 being both aspheric.

The fifth lens element 850 with negative refractive power has an object-side surface 851 being convex and an image-side surface 852 being concave. The fifth lens element 850 is made of a plastic material, and has the object-side surface 851 and the image-side surface 852 being both aspheric. Furthermore, each of the object-side surface 851 and the image-side surface 852 of the fifth lens element 850 includes at least one inflection point.

The sixth lens element 860 with negative refractive power has an object-side surface 861 being convex and an image-side surface 862 being concave. The sixth lens element 860 is made of a plastic material, and has the object-side surface 861 and the image-side surface 862 being both aspheric. Furthermore, the image-side surface 862 of the sixth lens element 860 includes at least one inflection point.

The filter 870 is made of a glass material and located between the sixth lens element 860 and the image surface 880, and will not affect the focal length of the image capturing assembly.

The detailed optical data of the 8th embodiment are shown in Table 15 and the aspheric surface data are shown in Table 16 below.

TABLE 15

8th Embodiment
f = 4.33 mm, Fno = 1.75, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.426 | | | | |
| 2 | Lens 1 | 1.848 | ASP | 0.738 | Plastic | 1.545 | 56.1 | 4.18 |
| 3 | | 8.415 | ASP | 0.058 | | | | |
| 4 | Lens 2 | 9.461 | ASP | 0.240 | Plastic | 1.660 | 20.4 | −12.52 |
| 5 | | 4.367 | ASP | 0.203 | | | | |
| 6 | Stop | Plano | | 0.187 | | | | |
| 7 | Lens 3 | 11.280 | ASP | 0.673 | Plastic | 1.660 | 20.4 | 365.70 |
| 8 | | 11.553 | ASP | 0.139 | | | | |
| 9 | Lens 4 | −3.958 | ASP | 0.775 | Plastic | 1.544 | 56.0 | 5.32 |
| 10 | | −1.786 | ASP | 0.050 | | | | |
| 11 | Lens 5 | 2.914 | ASP | 0.372 | Plastic | 1.660 | 20.4 | −23.87 |
| 12 | | 2.334 | ASP | 0.642 | | | | |
| 13 | Lens 6 | 3.526 | ASP | 0.380 | Plastic | 1.544 | 56.0 | −5.06 |
| 14 | | 1.488 | ASP | 0.500 | | | | |
| 15 | Filter | Plano | | 0.210 | Glass | 1.517 | 64.2 | — |
| 16 | | Plano | | 0.326 | | | | |
| 17 | Image | Plano | | — | | | | |

Reference wavelength is 587.6 (d-line).
Effective radius of Stop on Surface 6 is 1.110 mm.

TABLE 16

Aspheric Coefficients

| | Surface # | | | | | |
|---|---|---|---|---|---|---|
| | 2 | 3 | 4 | 5 | 7 | 8 |
| k = | 6.5052E−02 | −7.7344E+01 | −5.8570E+01 | −2.3370E+01 | −1.5540E+01 | −1.1686E+01 |
| A4 = | −2.5516E−03 | −1.1621E−01 | −1.7450E−01 | −6.5122E−02 | −1.0615E−01 | −5.0526E−02 |
| A6 = | 1.0577E−03 | 1.5584E−01 | 3.0675E−01 | 1.9518E−01 | 2.6041E−02 | −2.5498E−02 |
| A8 = | 1.9692E−03 | −3.8191E−02 | −1.6444E−01 | −2.0803E−01 | −7.5813E−02 | 3.8512E−02 |
| A10 = | −1.3607E−02 | −7.8799E−02 | −2.0340E−02 | 1.8595E−01 | 6.1525E−02 | −4.3106E−02 |
| A12 = | 1.3231E−02 | 5.7178E−02 | 5.5408E−02 | −1.2050E−01 | −8.5743E−03 | 2.9108E−02 |
| A14 = | −5.6575E−03 | −1.2269E−02 | −1.4416E−02 | 4.2480E−02 | −3.2390E−02 | −1.0455E−02 |
| A16 = | | | | | 2.0176E−02 | 1.7213E−03 |

| | Surface # | | | | | |
|---|---|---|---|---|---|---|
| | 9 | 10 | 11 | 12 | 13 | 14 |
| k = | −2.7582E+00 | −1.5672E+00 | 6.3243E−01 | −9.1983E−01 | −8.4305E+00 | −6.8013E+00 |
| A4 = | 2.8184E−02 | −2.8072E−02 | −9.8273E−02 | −9.3844E−02 | −2.7869E−01 | −1.3564E−01 |
| A6 = | −3.2613E−02 | 2.8143E−02 | 8.6602E−03 | 1.3072E−02 | 1.4299E−01 | 6.0282E−02 |
| A8 = | 4.3592E−02 | −2.1728E−02 | −2.6327E−03 | 2.8684E−03 | −5.3328E−02 | −1.9910E−02 |
| A10 = | −2.1285E−02 | 1.9173E−02 | 8.5939E−04 | −3.5064E−03 | 1.4423E−02 | 4.2790E−03 |
| A12 = | 5.1854E−03 | −6.2280E−03 | −9.9411E−04 | 1.1376E−03 | −2.4113E−03 | −5.5042E−04 |
| A14 = | −5.7246E−04 | 6.1676E−04 | 2.2584E−04 | −1.5796E−04 | 2.1757E−04 | 3.7826E−05 |
| A16 = | | 1.3154E−05 | | 8.1350E−06 | −8.0844E−06 | −1.0466E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.33 | (T23 + T34)/T56 | 0.82 |
| Fno | 1.75 | (R3 − R4)/(R3 + R4) | 0.37 |
| HFOV [deg.] | 38.8 | f/f3 | 0.01 |
| V2 + V3 + V5 | 61.2 | f1/f3 | 0.01 |
| (N3/V3) + (N5/V5) | 0.16 | f1/f4 | 0.79 |
| f/CT3 | 6.44 | f5/f6 | 4.71 |
| CT1/CT2 | 3.08 | (f/f1) + (f/f2) | 0.69 |
| CT1/CT3 | 1.10 | EPD/TD | 0.56 |
| CT4/T56 | 1.21 | SD/TD | 0.90 |

-continued

| 8th Embodiment | | | |
|---|---|---|---|
| T34/CT3 | 0.21 | TL/ImgH | 1.56 |
| T56/CT6 | 1.69 | TL/f | 1.27 |
| T12/T23 | 0.15 | tan(HFOV) | 0.80 |
| T12/T56 | 0.09 | Yc62/f | 0.25 |

9th Embodiment

Figure 17:
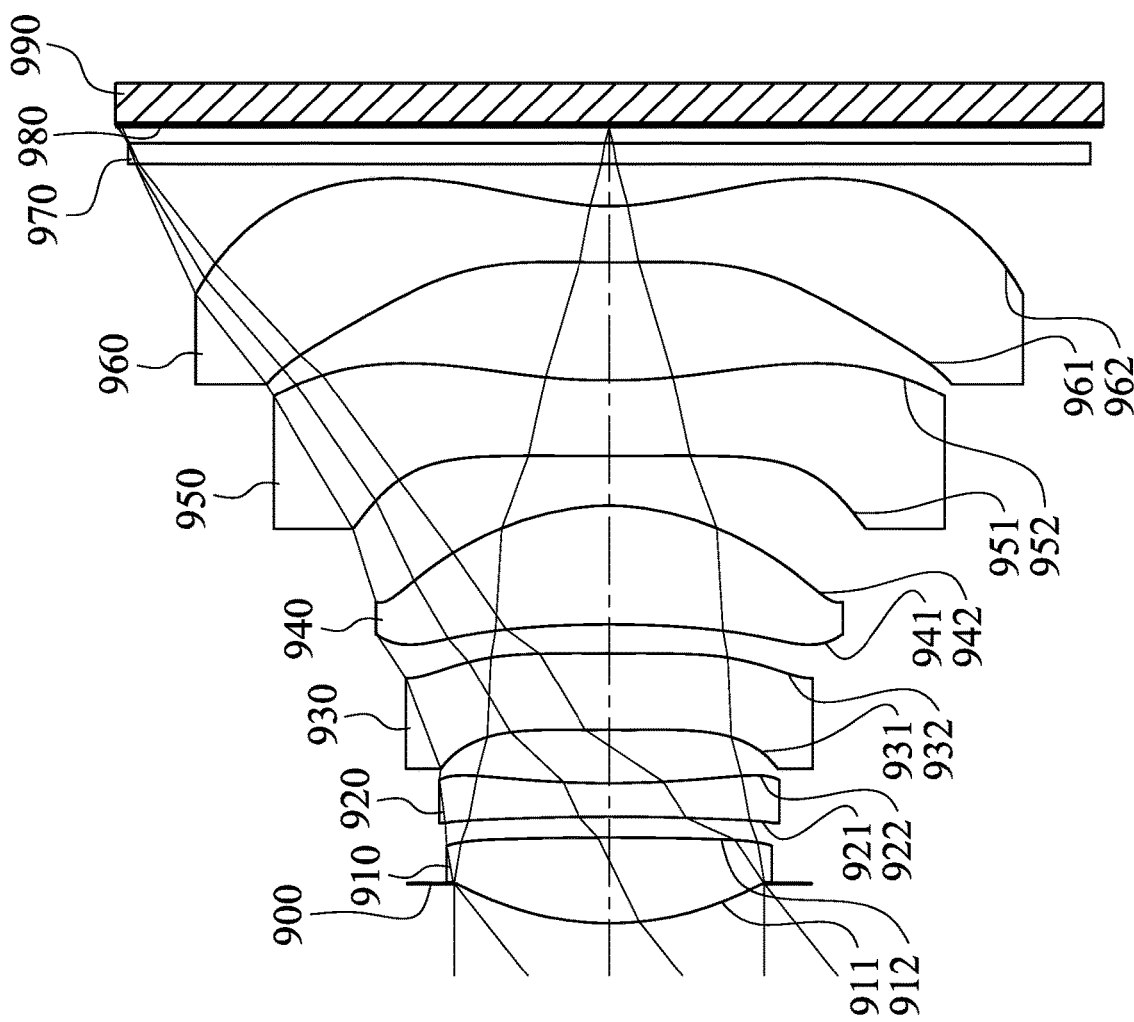
FIG. 17 is a schematic view of an imaging apparatus according to the 9th embodiment of the present disclosure.
Figure 18:
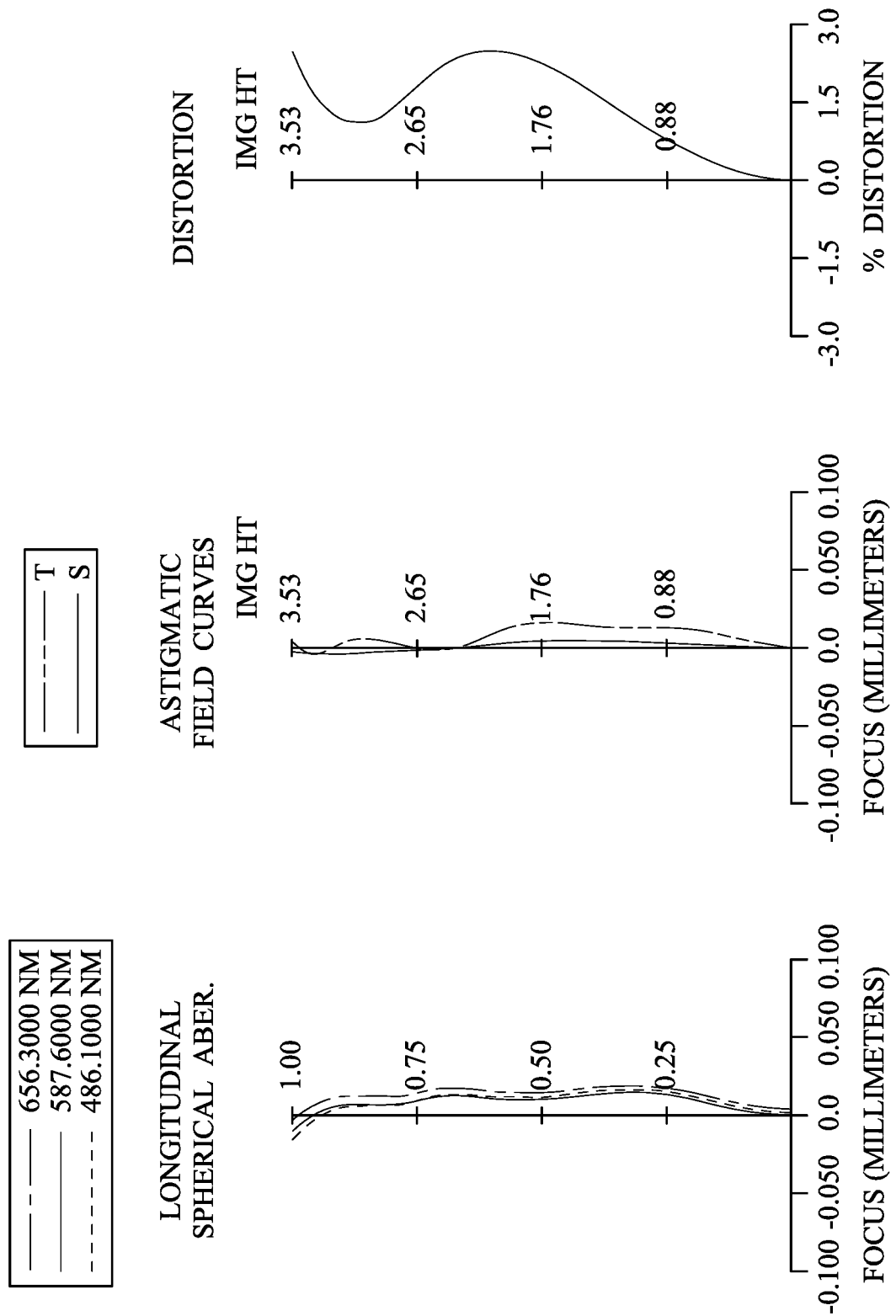
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an image capturing assembly (its reference numeral is omitted) and an image sensor 990. The image capturing assembly includes, in order from an object side to an image side, an aperture stop 900, a first lens element 910, a second lens element 920, a third lens element 930, a fourth lens element 940, a fifth lens element 950, a sixth lens element 960, a filter 970 and an image surface 980, wherein the image sensor 990 is disposed on the image surface 980 of the image capturing assembly. The image capturing assembly includes six lens elements (910, 920, 930, 940, 950, 960) without additional one or more lens elements inserted between the first lens element 910 and the sixth lens element 960.

The first lens element 910 with positive refractive power has an object-side surface 911 being convex and an image-side surface 912 being convex. The first lens element 910 is made of a plastic material, and has the object-side surface 911 and the image-side surface 912 being both aspheric.

The second lens element 920 with negative refractive power has an object-side surface 921 being concave and an image-side surface 922 being concave. The second lens element 920 is made of a plastic material, and has the object-side surface 921 and the image-side surface 922 being both aspheric.

The third lens element 930 with positive refractive power has an object-side surface 931 being convex and an image-side surface 932 being concave. The third lens element 930 is made of a plastic material, and has the object-side surface 931 and the image-side surface 932 being both aspheric.

The fourth lens element 940 with positive refractive power has an object-side surface 941 being concave and an image-side surface 942 being convex. The fourth lens element 940 is made of a plastic material, and has the object-side surface 941 and the image-side surface 942 being both aspheric.

The fifth lens element 950 with negative refractive power has an object-side surface 951 being convex and an image-side surface 952 being concave. The fifth lens element 950 is made of a plastic material, and has the object-side surface 951 and the image-side surface 952 being both aspheric. Furthermore, each of the object-side surface 951 and the image-side surface 952 of the fifth lens element 950 includes at least one inflection point.

The sixth lens element 960 with negative refractive power has an object-side surface 961 being convex and an image-side surface 962 being concave. The sixth lens element 960 is made of a plastic material, and has the object-side surface 961 and the image-side surface 962 being both aspheric. Furthermore, the image-side surface 962 of the sixth lens element 960 includes at least one inflection point.

The filter 970 is made of a glass material and located between the sixth lens element 960 and the image surface 980, and will not affect the focal length of the image capturing assembly.

The detailed optical data of the 9th embodiment are shown in Table 17 and the aspheric surface data are shown in Table 18 below.

TABLE 17

9th Embodiment
f = 4.33 mm, Fno = 1.95, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.285 | | | | |
| 2 | Lens 1 | 2.196 | ASP | 0.613 | Plastic | 1.545 | 56.1 | 3.80 |
| 3 | | −32.153 | ASP | 0.150 | | | | |
| 4 | Lens 2 | −25.270 | ASP | 0.240 | Plastic | 1.650 | 21.4 | −7.36 |
| 5 | | 5.920 | ASP | 0.384 | | | | |
| 6 | Lens 3 | 29.025 | ASP | 0.550 | Plastic | 1.614 | 26.0 | 385.37 |
| 7 | | 32.847 | ASP | 0.208 | | | | |
| 8 | Lens 4 | −10.511 | ASP | 0.850 | Plastic | 1.545 | 56.1 | 3.93 |
| 9 | | −1.831 | ASP | 0.356 | | | | |
| 10 | Lens 5 | 42.846 | ASP | 0.547 | Plastic | 1.614 | 26.0 | −8.45 |
| 11 | | 4.603 | ASP | 0.844 | | | | |
| 12 | Lens 6 | 13.741 | ASP | 0.403 | Plastic | 1.534 | 55.9 | −4.52 |
| 13 | | 2.030 | ASP | 0.300 | | | | |
| 14 | Filter | Plano | | 0.150 | Glass | 1.517 | 64.2 | — |
| 15 | | Plano | | 0.130 | | | | |
| 16 | Image | Plano | | — | | | | |

Reference wavelength is 587.6 nm (d-line).

TABLE 18

Aspheric Coefficients

| Surface # | | | | | |
|---|---|---|---|---|---|
| 2 | 3 | 4 | 5 | 6 | 7 |
| k = -6.0265E-02 | -9.0000E+01 | -9.0000E+01 | -8.9806E+01 | 8.4369E+01 | -9.0000E+01 |
| A4 = -1.8998E-03 | -1.3478E-02 | -5.0837E-02 | -1.3082E-02 | -1.2799E-01 | -1.2221E-01 |
| A6 = 7.8787E-03 | -1.7023E-03 | 9.8624E-02 | 4.5493E-02 | 1.2132E-01 | 1.5318E-01 |
| A8 = -1.7396E-02 | 9.0450E-02 | -2.7408E-02 | -1.1779E-02 | -3.1826E-01 | -2.2242E-01 |
| A10 = 1.4929E-02 | -1.8557E-01 | -1.0768E-01 | -7.3151E-02 | 4.5396E-01 | 1.8258E-01 |
| A12 = -4.8744E-03 | 1.4084E-01 | 1.1649E-01 | 7.3135E-02 | -3.9166E-01 | -8.7173E-02 |
| A14 = -1.5296E-03 | -4.0236E-02 | -3.6571E-02 | -2.3473E-02 | 1.7518E-01 | 2.4575E-02 |
| A16 = | 9.2204E-08 | | | -3.2052E-02 | -3.0894E-03 |

| Surface # | | | | | |
|---|---|---|---|---|---|
| 8 | 9 | 10 | 11 | 12 | 13 |
| k = 2.6067E+00 | -8.2233E-01 | -2.2546E+01 | 2.0564E+00 | -5.3252E+00 | -5.6926E-01 |
| A4 = -7.8321E-02 | -5.8543E-03 | -2.3444E-02 | -1.9068E-02 | -1.1913E-01 | -1.3989E-01 |
| A6 = 1.4633E-01 | 3.4823E-02 | 2.2181E-02 | -6.4295E-03 | 3.4715E-02 | 5.0531E-02 |
| A8 = -1.5934E-01 | -2.4690E-02 | -3.5138E-02 | -6.4893E-04 | -9.1856E-03 | -1.5665E-02 |
| A10 = 8.5047E-02 | -2.0956E-03 | 1.7923E-02 | 1.4871E-03 | 3.2726E-03 | 3.2686E-03 |
| A12 = -2.0670E-02 | 8.3430E-03 | -4.6441E-03 | -4.8409E-04 | -8.1191E-04 | -4.2835E-04 |
| A14 = 1.9179E-03 | -3.5527E-03 | 4.8650E-04 | 6.6952E-05 | 1.0113E-04 | 3.1103E-05 |
| A16 = | 5.3984E-04 | | -3.5140E-06 | -4.9154E-06 | -9.5524E-07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.33 | (T23 + T34)/T56 | 0.70 |
| Fno | 1.95 | (R3 − R4)/(R3 + R4) | 1.61 |
| HFOV [deg.] | 38.4 | f/f3 | 0.01 |
| V2 + V3 + V5 | 73.3 | f1/f3 | 0.01 |
| (N3/V3) + (N5/V5) | 0.12 | f1/f4 | 0.97 |
| f/CT3 | 7.88 | f5/f6 | 1.87 |
| CT1/CT2 | 2.55 | (f/f1) + (f/f2) | 0.55 |
| CT1/CT3 | 1.11 | EPD/TD | 0.43 |
| CT4/CT6 | 1.01 | SD/TD | 0.94 |
| T34/CT3 | 0.38 | TL/ImgH | 1.62 |
| T56/CT6 | 2.09 | TL/f | 1.32 |
| T12/T23 | 0.39 | tan(HFOV) | 0.79 |
| T12/T56 | 0.18 | Yc62/f | 0.35 |

10th Embodiment

Figure 19:
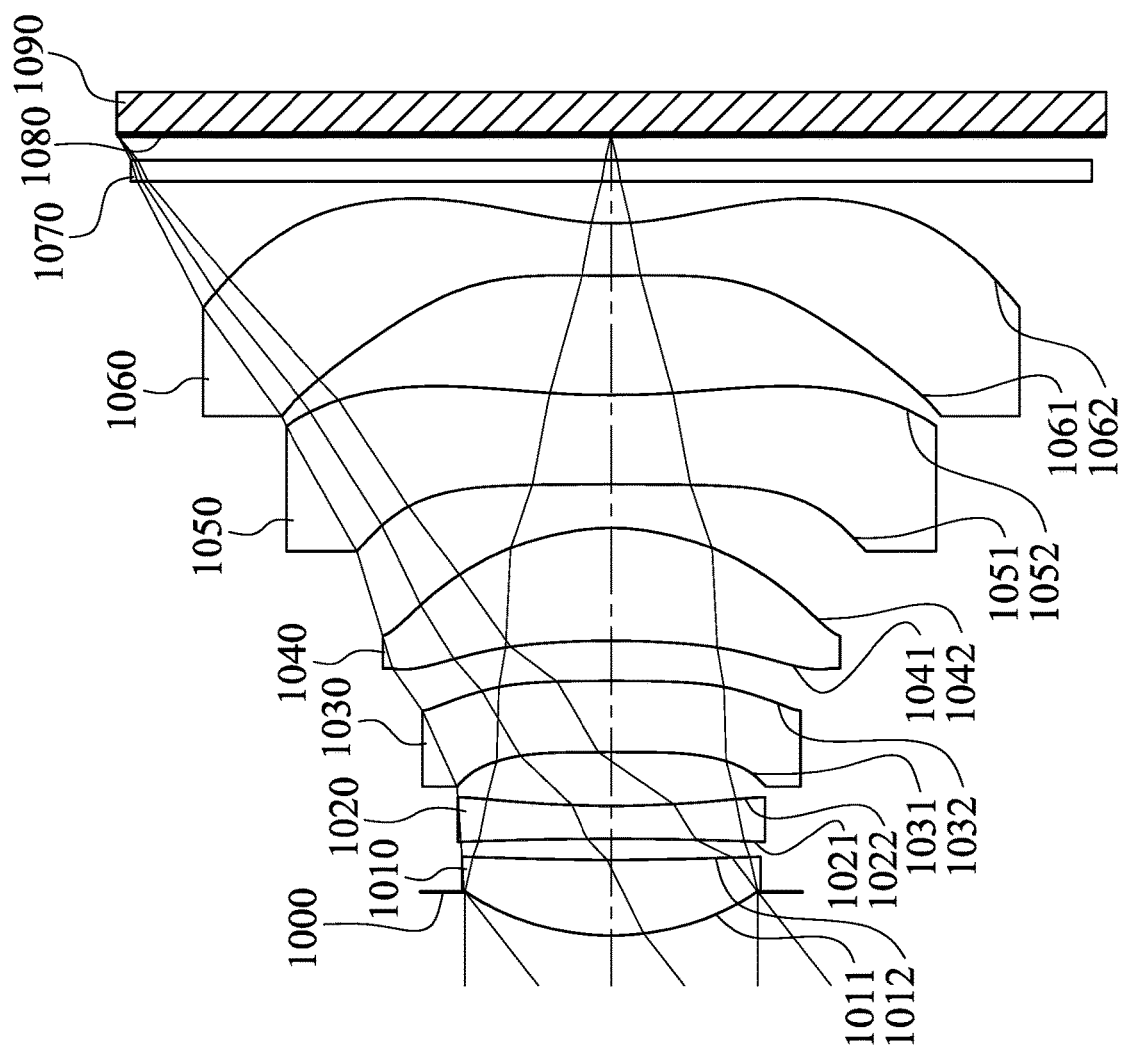
FIG. 19 is a schematic view of an imaging apparatus according to the 10th embodiment of the present disclosure.
Figure 20:
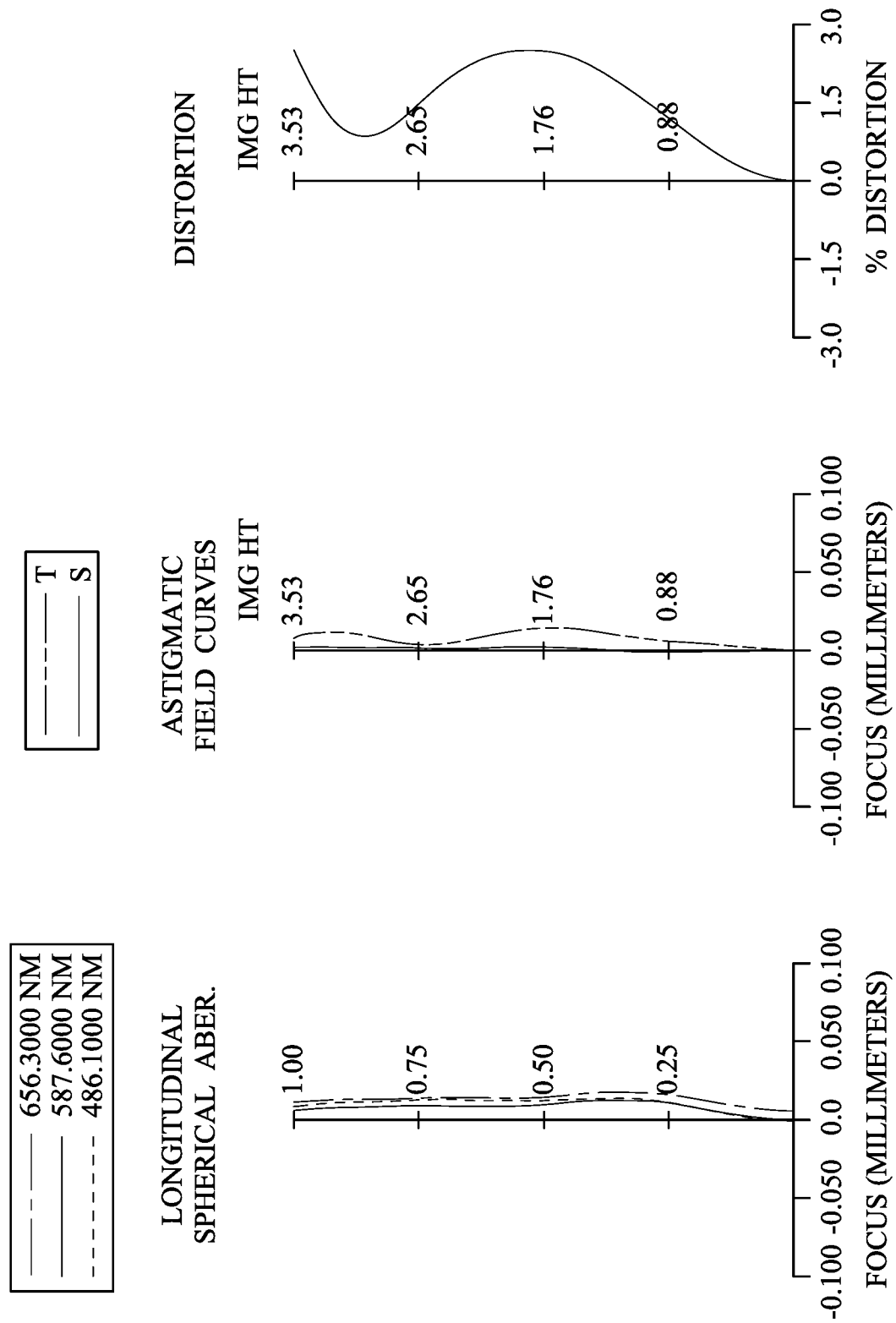
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an image capturing assembly (its reference numeral is omitted) and an image sensor 1090. The image capturing assembly includes, in order from an object side to an image side, an aperture stop 1000, a first lens element 1010, a second lens element 1020, a third lens element 1030, a fourth lens element 1040, a fifth lens element 1050, a sixth lens element 1060, a filter 1070 and an image surface 1080, wherein the image sensor 1090 is disposed on the image surface 1080 of the image capturing assembly. The image capturing assembly includes six lens elements (1010, 1020, 1030, 1040, 1050, 1060) without additional one or more lens elements inserted between the first lens element 1010 and the sixth lens element 1060.

The first lens element 1010 with positive refractive power has an object-side surface 1011 being convex and an image-side surface 1012 being concave. The first lens element 1010 is made of a plastic material, and has the object-side surface 1011 and the image-side surface 1012 being both aspheric.

The second lens element 1020 with negative refractive power has an object-side surface 1021 being concave and an image-side surface 1022 being concave. The second lens element 1020 is made of a plastic material, and has the object-side surface 1021 and the image-side surface 1022 being both aspheric.

The third lens element 1030 with positive refractive power has an object-side surface 1031 being concave and an image-side surface 1032 being convex. The third lens element 1030 is made of a plastic material, and has the object-side surface 1031 and the image-side surface 1032 being both aspheric.

The fourth lens element 1040 with positive refractive power has an object-side surface 1041 being concave and an image-side surface 1042 being convex. The fourth lens element 1040 is made of a plastic material, and has the object-side surface 1041 and the image-side surface 1042 being both aspheric.

The fifth lens element 1050 with negative refractive power has an object-side surface 1051 being concave and an image-side surface 1052 being concave. The fifth lens element 1050 is made of a plastic material, and has the object-side surface 1051 and the image-side surface 1052 being both aspheric. Furthermore, the image-side surface 1052 of the fifth lens element 1050 includes at least one inflection point.

The sixth lens element 1060 with negative refractive power has an object-side surface 1061 being convex and an image-side surface 1062 being concave. The sixth lens element 1060 is made of a plastic material, and has the object-side surface 1061 and the image-side surface 1062 being both aspheric. Furthermore, the image-side surface 1062 of the sixth lens element 1060 includes at least one inflection point.

The filter 1070 is made of a glass material and located between the sixth lens element 1060 and the image surface 1080, and will not affect the focal length of the image capturing assembly.

The detailed optical data of the 10th embodiment are shown in Table 19 and the aspheric surface data are shown in Table 20 below.

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.39 | (T23 + T34)/T56 | 0.79 |
| Fno | 2.10 | (R3 − R4)/(R3 + R4) | 1.10 |

TABLE 19

10th Embodiment
f = 4.39 mm, Fno = 2.10, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.311 | | | | |
| 2 | Lens 1 | 1.970 | ASP | 0.538 | Plastic | 1.545 | 56.1 | 4.02 |
| 3 | | 17.794 | ASP | 0.150 | | | | |
| 4 | Lens 2 | −129.829 | ASP | 0.240 | Plastic | 1.650 | 21.4 | −9.24 |
| 5 | | 6.298 | ASP | 0.384 | | | | |
| 6 | Lens 3 | −47.351 | ASP | 0.509 | Plastic | 1.614 | 26.0 | 165.60 |
| 7 | | −32.434 | ASP | 0.288 | | | | |
| 8 | Lens 4 | −6.960 | ASP | 0.808 | Plastic | 1.545 | 56.1 | 4.10 |
| 9 | | −1.760 | ASP | 0.313 | | | | |
| 10 | Lens 5 | −47.450 | ASP | 0.638 | Plastic | 1.650 | 21.4 | −9.03 |
| 11 | | 6.733 | ASP | 0.850 | | | | |
| 12 | Lens 6 | 14.598 | ASP | 0.378 | Plastic | 1.534 | 55.9 | −4.49 |
| 13 | | 2.041 | ASP | 0.300 | | | | |
| 14 | Filter | Plano | | 0.150 | Glass | 1.517 | 64.2 | — |
| 15 | | Plano | | 0.184 | | | | |
| 16 | Image | Plano | | — | | | | |

Reference wavelength is 587.6 nm (d-line).

TABLE 20

Aspheric Coefficients

| Surface # | | | | | |
|---|---|---|---|---|---|
| 2 | 3 | 4 | 5 | 6 | 7 |

| | | | | | |
|---|---|---|---|---|---|
| k = | 1.3838E−01 | 9.0000E+01 | −9.0000E+01 | −8.9806E+01 | 8.4369E+01 | −9.0000E+01 |
| A4 = | 1.9729E−03 | −2.4219E−02 | −7.3782E−02 | −2.2403E−02 | −1.2166E−01 | −9.1970E−02 |
| A6 = | 1.1133E−02 | 3.5243E−03 | 1.2456E−01 | 6.7487E−02 | 2.2341E−02 | 3.3487E−02 |
| A8 = | −1.5168E−02 | 9.5944E−02 | −6.0645E−02 | −2.4681E−02 | −4.0260E−02 | −5.4740E−02 |
| A10 = | 1.6272E−02 | −1.8240E−01 | −4.4533E−02 | −4.8307E−02 | −2.7996E−02 | 6.0184E−02 |
| A12 = | −4.6198E−03 | 1.4227E−01 | 5.9540E−02 | 4.3887E−02 | 1.0442E−01 | −3.4587E−02 |
| A14 = | −1.0145E−03 | −4.3606E−02 | −1.8711E−02 | −1.2917E−02 | −1.1055E−01 | 1.0981E−02 |
| A16 = | | 9.2202E−08 | | | 3.4831E−02 | −1.2645E−03 |

| Surface # | | | | | |
|---|---|---|---|---|---|
| 8 | 9 | 10 | 11 | 12 | 13 |

| | | | | | |
|---|---|---|---|---|---|
| k = | 2.6067E+00 | −7.1047E−01 | −9.0000E+01 | 3.3037E+00 | −5.3252E+00 | −5.6679E−01 |
| A4 = | −3.2433E−02 | 1.7382E−02 | −3.8008E−03 | −1.5594E−02 | −1.4055E−01 | −1.4545E−01 |
| A6 = | 2.1876E−02 | −5.6157E−03 | −1.4284E−02 | −1.1162E−02 | 3.9911E−02 | 5.1367E−02 |
| A8 = | −3.0355E−02 | −8.7173E−03 | −3.7075E−02 | 5.0512E−03 | −9.3667E−03 | −1.5680E−02 |
| A10 = | 1.9929E−02 | 5.4726E−03 | 4.9663E−03 | −1.0210E−02 | 3.3809E−03 | 3.2642E−03 |
| A12 = | −4.6375E−03 | −8.4988E−04 | −1.9238E−03 | 7.2933E−05 | −9.4909E−04 | −4.2862E−04 |
| A14 = | 3.7168E−04 | −4.1953E−04 | 2.5527E−04 | 4.4474E−06 | 1.3385E−04 | 3.1126E−05 |
| A16 = | | 1.6813E−04 | | −6.8397E−07 | −7.2960E−06 | −9.4871E−07 |

-continued

| 10th Embodiment | | | |
|---|---|---|---|
| HFOV [deg.] | 38.0 | f/f3 | 0.03 |
| V2 + V3 + V5 | 68.7 | f1/f3 | 0.02 |
| (N3/V3) + (N5/V5) | 0.14 | f1/f4 | 0.98 |
| f/CT3 | 8.63 | f5/f6 | 2.01 |
| CT1/CT2 | 2.24 | (f/f1) + (f/f2) | 0.62 |
| CT1/CT3 | 1.06 | EPD/TD | 0.41 |
| CT4/T56 | 0.95 | SD/TD | 0.94 |
| T34/CT3 | 0.57 | TL/ImgH | 1.62 |
| T56/CT6 | 2.25 | TL/f | 1.30 |
| T12/T23 | 0.39 | tan(HFOV) | 0.78 |
| T12/T56 | 0.18 | Yc62/f | 0.32 |

11th Embodiment

Figure 21:
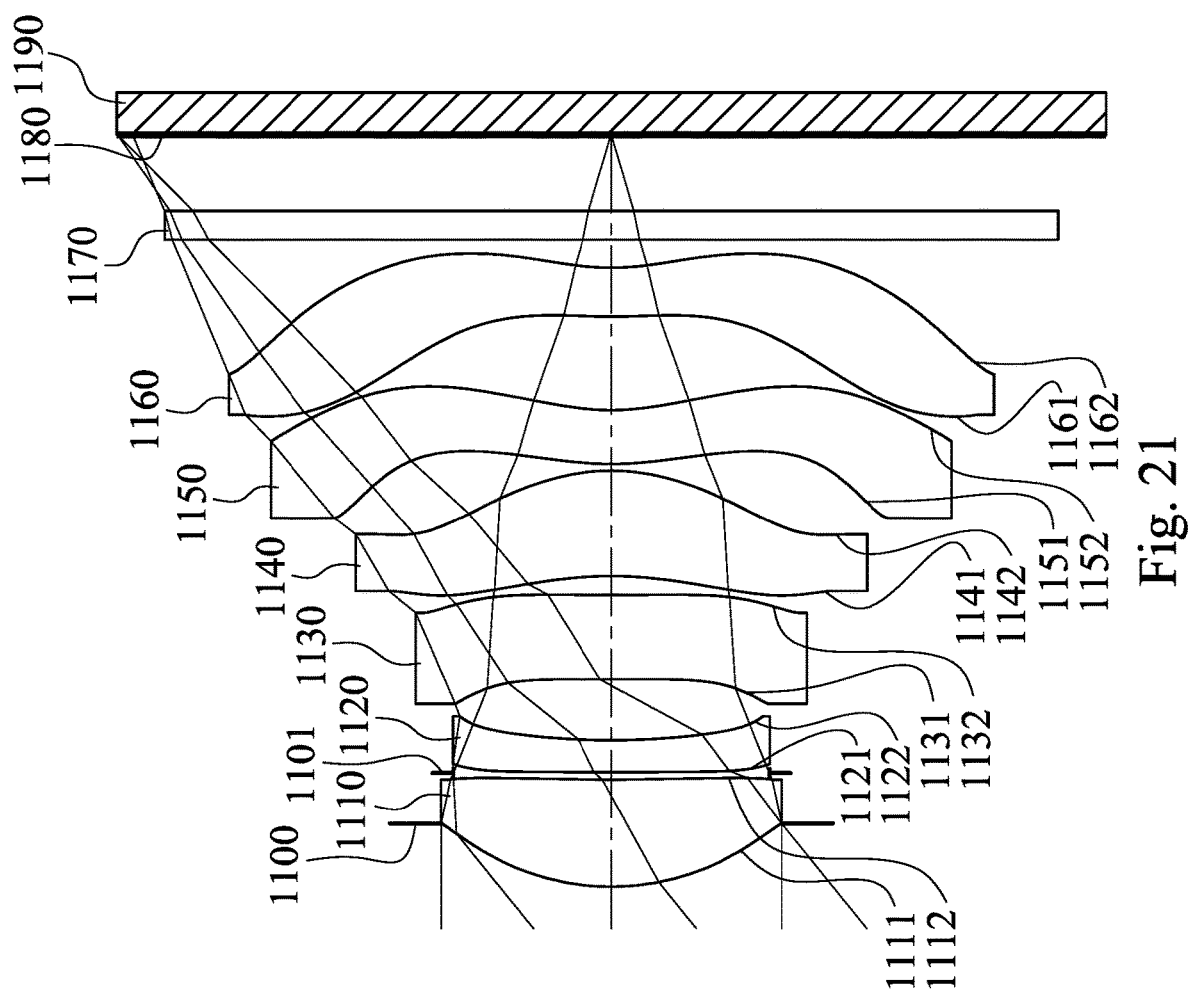
FIG. 21 is a schematic view of an imaging apparatus according to the 11th embodiment of the present disclosure.
Figure 22:
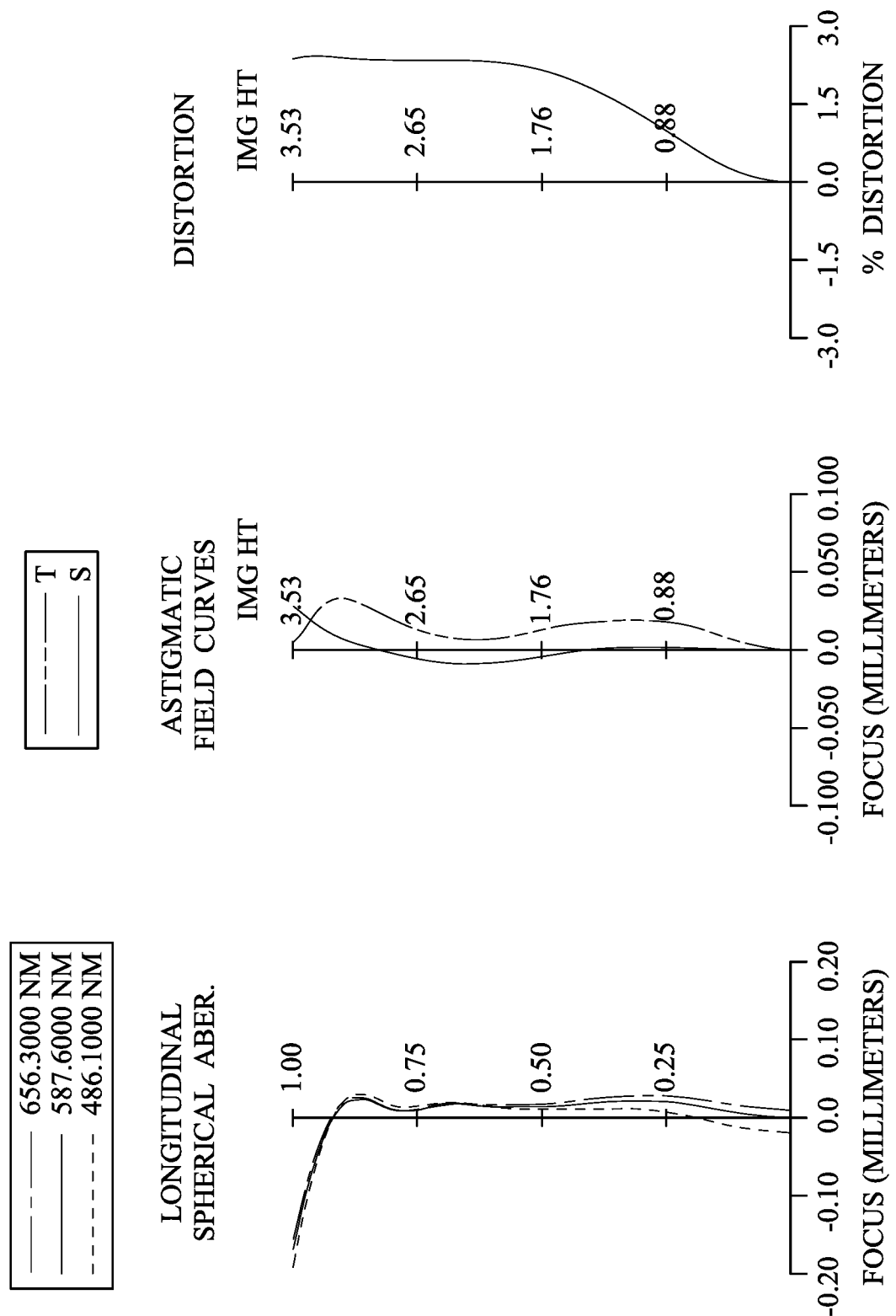
FIG. 22 shows spherical aberration curves, astigmatic field curves and a distortion curve of the imaging apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes an image capturing assembly (its reference numeral is omitted) and an image sensor 1190. The image capturing assembly includes, in order from an object side to an image side, an aperture stop 1100, a first lens element 1110, a stop 1101, a second lens element 1120, a third lens element 1130, a fourth lens element 1140, a fifth lens element 1150, a sixth lens element 1160, a filter 1170 and an image surface 1180, wherein the image sensor 1190 is disposed on the image surface 1180 of the image capturing assembly. The image capturing assembly includes six lens elements (1110, 1120, 1130, 1140, 1150, 1160) without additional one or more lens elements inserted between the first lens element 1110 and the sixth lens element 1160.

The first lens element 1110 with positive refractive power has an object-side surface 1111 being convex and an image-side surface 1112 being concave. The first lens element 1110 is made of a plastic material, and has the object-side surface 1111 and the image-side surface 1112 being both aspheric.

The second lens element 1120 with negative refractive power has an object-side surface 1121 being convex and an image-side surface 1122 being concave. The second lens element 1120 is made of a plastic material, and has the object-side surface 1121 and the image-side surface 1122 being both aspheric.

The third lens element 1130 with negative refractive power has an object-side surface 1131 being convex and an image-side surface 1132 being concave. The third lens element 1130 is made of a plastic material, and has the object-side surface 1131 and the image-side surface 1132 being both aspheric.

The fourth lens element 1140 with positive refractive power has an object-side surface 1141 being concave and an image-side surface 1142 being convex. The fourth lens element 1140 is made of a plastic material, and has the object-side surface 1141 and the image-side surface 1142 being both aspheric.

The fifth lens element 1150 with negative refractive power has an object-side surface 1151 being convex and an image-side surface 1152 being concave. The fifth lens element 1150 is made of a plastic material, and has the object-side surface 1151 and the image-side surface 1152 being both aspheric. Furthermore, each of the object-side surface 1151 and the image-side surface 1152 of the fifth lens element 1150 includes at least one inflection point.

The sixth lens element 1160 with negative refractive power has an object-side surface 1161 being convex and an image-side surface 1162 being concave. The sixth lens element 1160 is made of a plastic material, and has the object-side surface 1161 and the image-side surface 1162 being both aspheric. Furthermore, the image-side surface 1162 of the sixth lens element 1160 includes at least one inflection point.

The filter 1170 is made of a glass material and located between the sixth lens element 1160 and the image surface 1180, and will not affect the focal length of the image capturing assembly.

The detailed optical data of the 11th embodiment are shown in Table 21 and the aspheric surface data are shown in Table 22 below.

TABLE 21

11th Embodiment
f = 4.24 mm, Fno = 1.70, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.453 | | | | |
| 2 | Lens 1 | 1.781 | ASP | 0.770 | Plastic | 1.545 | 56.0 | 3.80 |
| 3 | | 10.821 | ASP | 0.046 | | | | |
| 4 | Stop | Plano | | 0.005 | | | | |
| 5 | Lens 2 | 14.509 | ASP | 0.230 | Plastic | 1.660 | 20.4 | −11.60 |
| 6 | | 4.980 | ASP | 0.434 | | | | |
| 7 | Lens 3 | 25.660 | ASP | 0.603 | Plastic | 1.660 | 20.4 | −537.15 |
| 8 | | 23.705 | ASP | 0.135 | | | | |
| 9 | Lens 4 | −2.886 | ASP | 0.757 | Plastic | 1.544 | 55.9 | 4.99 |
| 10 | | −1.527 | ASP | 0.050 | | | | |
| 11 | Lens 5 | 2.530 | ASP | 0.384 | Plastic | 1.639 | 23.3 | −13.82 |
| 12 | | 1.850 | ASP | 0.667 | | | | |
| 13 | Lens 6 | 5.211 | ASP | 0.350 | Plastic | 1.515 | 56.5 | −5.62 |
| 14 | | 1.818 | ASP | 0.200 | | | | |
| 15 | Filter | Plano | | 0.210 | Glass | 1.517 | 64.2 | — |
| 16 | | Plano | | 0.543 | | | | |
| 17 | Image | Plano | | — | | | | |

Reference wavelength is 587.6 nm (d-line).
Effective radius of Stop on Surface 4 is 1.130 mm.

TABLE 22

Aspheric Coefficients

| | Surface # | | | | | |
|---|---|---|---|---|---|---|
| | 2 | 3 | 5 | 6 | 7 | 8 |
| k = | 1.7563E−01 | −6.1007E+01 | −8.9993E+01 | −2.2449E+01 | −5.2728E+01 | −7.1263E+01 |
| A4 = | −7.4855E−03 | −1.0094E−01 | −1.3832E−01 | −4.2111E−02 | −1.1320E−01 | −5.4451E−02 |
| A6 = | 1.7508E−02 | 1.4623E−01 | 2.8354E−01 | 1.6692E−01 | 7.9216E−02 | 2.2722E−02 |
| A8 = | −3.6739E−02 | −4.6541E−02 | −2.1675E−01 | −2.1296E−01 | −3.9374E−01 | −8.7936E−02 |
| A10 = | 3.2548E−02 | −9.6241E−02 | 3.4363E−02 | 2.0172E−01 | 7.9538E−01 | 1.0967E−01 |
| A12 = | −1.3147E−02 | 9.2248E−02 | 5.0472E−02 | −1.2662E−01 | −9.2541E−01 | −7.3149E−02 |
| A14 = | | −2.4954E−02 | −1.8551E−02 | 4.7883E−02 | 5.5461E−01 | 2.6795E−02 |
| A16 = | | | | | −1.2699E−01 | −3.8250E−03 |

| | Surface # | | | | | |
|---|---|---|---|---|---|---|
| | 9 | 10 | 11 | 12 | 13 | 14 |
| k = | −8.5589E+00 | −1.5029E+00 | −7.6300E−02 | −3.7529E+00 | −9.0425E+01 | −9.8877E+00 |
| A4 = | 2.3429E−02 | −4.8341E−03 | −1.5631E−01 | −1.3317E−01 | −2.0732E−01 | −1.2686E−01 |
| A6 = | −2.3231E−02 | 2.2472E−02 | 5.8548E−02 | 7.2392E−02 | 8.3793E−02 | 5.6324E−02 |
| A8 = | 3.3583E−02 | −2.9883E−02 | −1.9789E−02 | −2.9536E−02 | −2.0482E−02 | −1.8358E−02 |
| A10 = | −1.1961E−02 | 3.7472E−02 | 2.1096E−03 | 7.3886E−03 | 3.8648E−03 | 3.9546E−03 |
| A12 = | 1.1255E−03 | −1.7134E−02 | 7.0026E−05 | −1.0808E−03 | −5.1533E−04 | −5.2983E−04 |
| A14 = | | 3.2197E−03 | 1.0331E−06 | 8.6503E−05 | 3.9866E−05 | 3.9243E−05 |
| A16 = | | −2.1243E−04 | | −2.9714E−06 | −1.2988E−06 | −1.1958E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 4.24 | (T23 + T34)/T56 | 0.85 |
| Fno | 1.70 | (R3 − R4)/(R3 + R4) | 0.49 |
| HFOV [deg.] | 39.0 | f/f3 | −0.01 |
| V2 + V3 + V5 | 64.1 | f1/f3 | −0.01 |
| (N3/V3) + (N5/V5) | 0.15 | f1/f4 | 0.76 |
| f/CT3 | 7.04 | f5/f6 | 2.46 |
| CT1/CT2 | 3.35 | (f/f1) + (f/f2) | 0.75 |
| CT1/CT3 | 1.28 | EPD/TD | 0.56 |
| CT4/T56 | 1.13 | SD/TD | 0.90 |
| T34/CT3 | 0.22 | TL/ImgH | 1.53 |
| T56/CT6 | 1.91 | TL/f | 1.27 |
| T12/T23 | 0.12 | tan(HFOV) | 0.81 |
| T12/T56 | 0.08 | Yc62/f | 0.24 |

12th Embodiment

Figure 23:
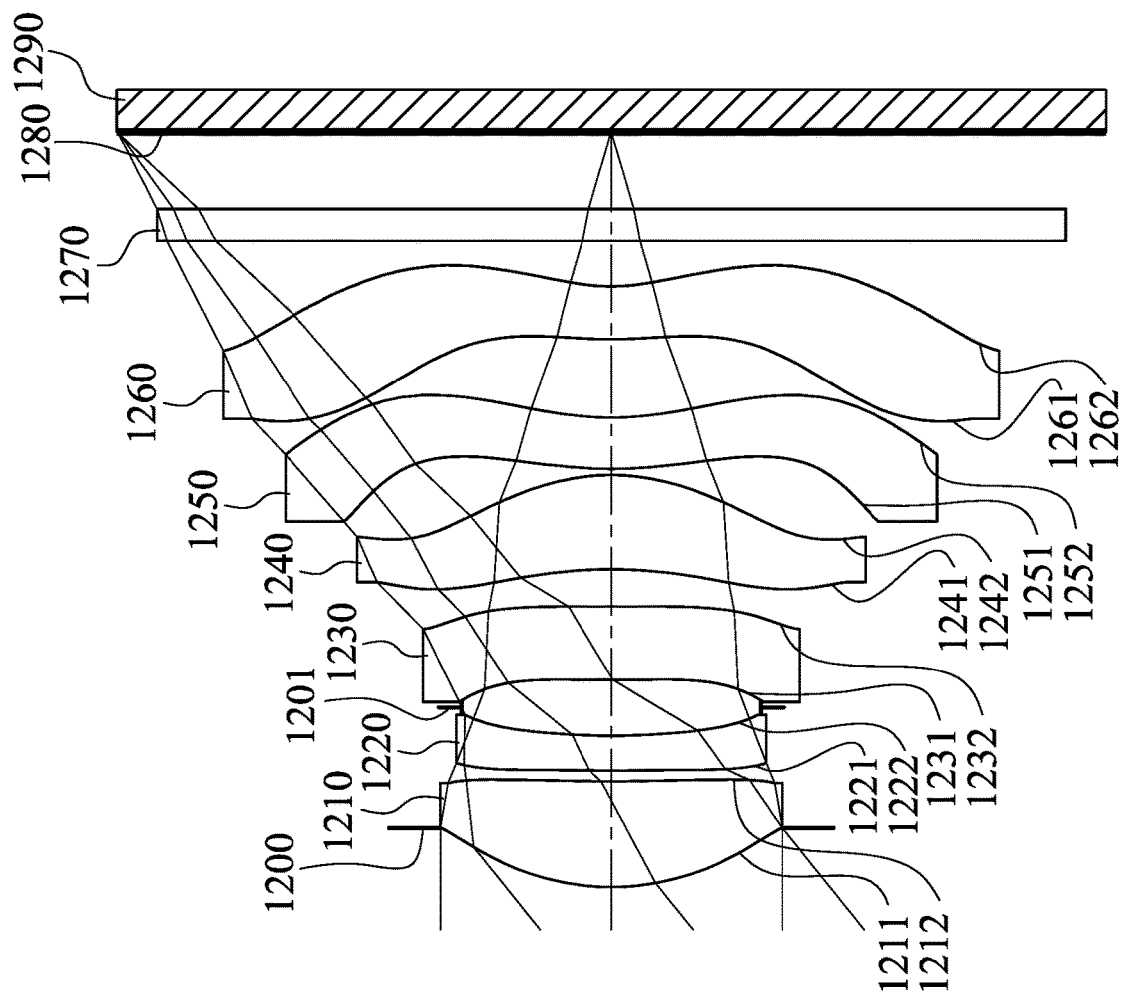
FIG. 23 is a schematic view of an imaging apparatus according to the 12th embodiment of the present disclosure.
Figure 24:
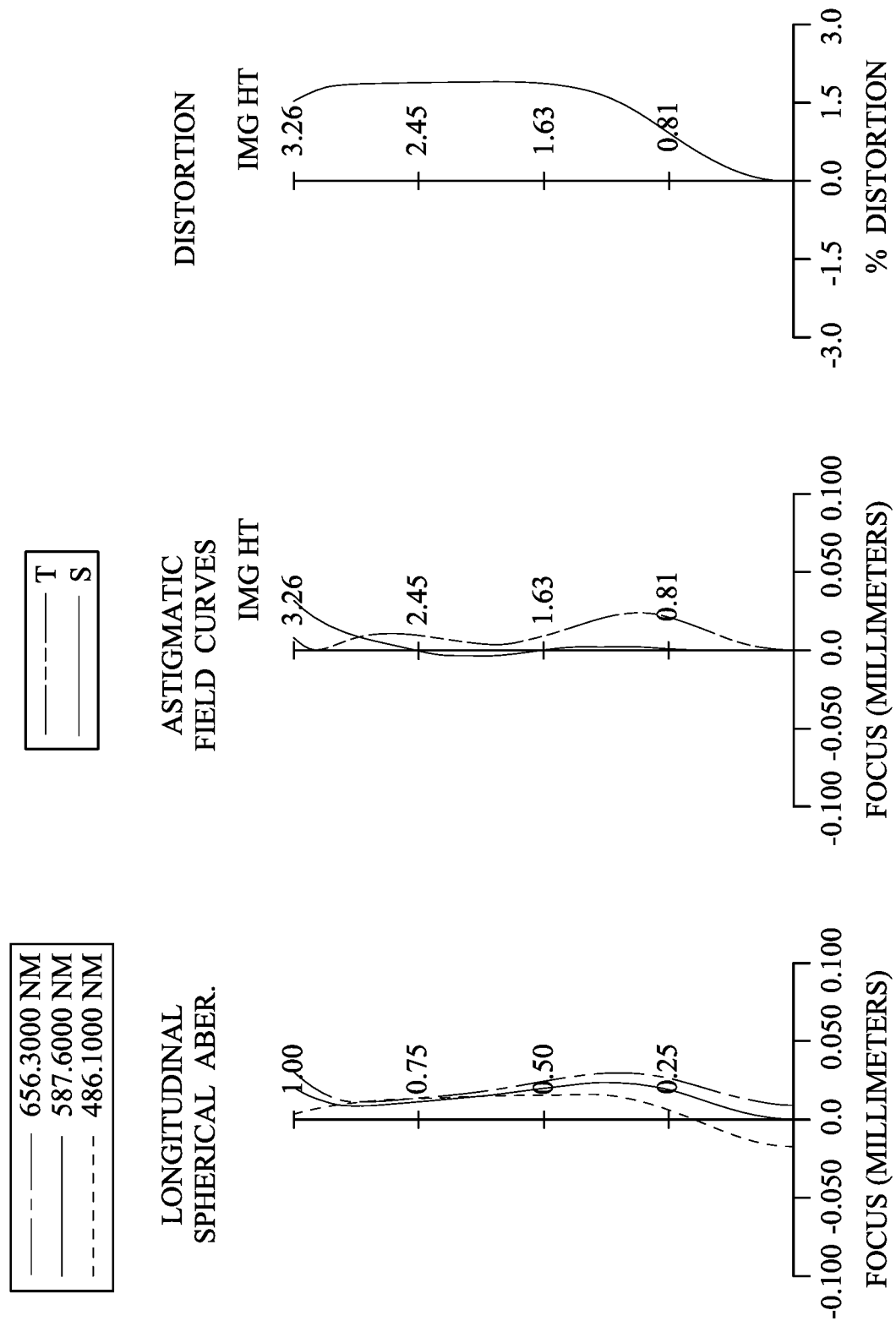
FIG. 24 shows spherical aberration curves, astigmatic field curves and a distortion curve of the imaging apparatus according to the 12th embodiment.

FIG. 23 is a schematic view of an imaging apparatus according to the 12th embodiment of the present disclosure. FIG. 24 shows spherical aberration curves, astigmatic field curves and a distortion curve of the imaging apparatus according to the 12th embodiment. In FIG. 23, the imaging apparatus includes an image capturing assembly (its reference numeral is omitted) and an image sensor 1290. The image capturing assembly includes, in order from an object side to an image side, an aperture stop 1200, a first lens element 1210, a second lens element 1220, a stop 1201, a third lens element 1230, a fourth lens element 1240, a fifth lens element 1250, a sixth lens element 1260, a filter 1270 and an image surface 1280, wherein the image sensor 1290 is disposed on the image surface 1280 of the image capturing assembly. The image capturing assembly includes six lens elements (1210, 1220, 1230, 1240, 1250, 1260) without additional one or more lens elements inserted between the first lens element 1210 and the sixth lens element 1260.

The first lens element 1210 with positive refractive power has an object-side surface 1211 being convex and an image-side surface 1212 being concave. The first lens element 1210 is made of a plastic material, and has the object-side surface 1211 and the image-side surface 1212 being both aspheric.

The second lens element 1220 with negative refractive power has an object-side surface 1221 being convex and an image-side surface 1222 being concave. The second lens element 1220 is made of a plastic material, and has the object-side surface 1221 and the image-side surface 1222 being both aspheric.

The third lens element 1230 with positive refractive power has an object-side surface 1231 being convex and an image-side surface 1232 being concave. The third lens element 1230 is made of a plastic material, and has the object-side surface 1231 and the image-side surface 1232 being both aspheric.

The fourth lens element 1240 with positive refractive power has an object-side surface 1241 being concave and an image-side surface 1242 being convex. The fourth lens element 1240 is made of a plastic material, and has the object-side surface 1241 and the image-side surface 1242 being both aspheric.

The fifth lens element 1250 with negative refractive power has an object-side surface 1251 being convex and an image-side surface 1252 being concave. The fifth lens element 1250 is made of a plastic material, and has the object-side surface 1251 and the image-side surface 1252 being both aspheric. Furthermore, each of the object-side surface 1251 and the image-side surface 1252 of the fifth lens element 1250 includes at least one inflection point.

The sixth lens element 1260 with negative refractive power has an object-side surface 1261 being convex and an image-side surface 1262 being concave. The sixth lens element 1260 is made of a plastic material, and has the object-side surface 1261 and the image-side surface 1262 being both aspheric. Furthermore, the image-side surface 1262 of the sixth lens element 1260 includes at least one inflection point.

The filter 1270 is made of a glass material and located between the sixth lens element 1260 and the image surface 1280, and will not affect the focal length of the image capturing assembly.

The detailed optical data of the 12th embodiment are shown in Table 23 and the aspheric surface data are shown in Table 24 below.

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

TABLE 23

12th Embodiment
f = 3.98 mm, Fno = 1.76, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.390 | | | | |
| 2 | Lens 1 | 1.678 | ASP | 0.698 | Plastic | 1.545 | 56.1 | 3.66 |
| 3 | | 9.080 | ASP | 0.070 | | | | |
| 4 | Lens 2 | 13.360 | ASP | 0.230 | Plastic | 1.660 | 20.4 | −9.60 |
| 5 | | 4.268 | ASP | 0.189 | | | | |
| 6 | Stop | Plano | | 0.182 | | | | |
| 7 | Lens 3 | 17.997 | ASP | 0.487 | Plastic | 1.660 | 20.4 | 50.02 |
| 8 | | 39.139 | ASP | 0.247 | | | | |
| 9 | Lens 4 | −2.985 | ASP | 0.622 | Plastic | 1.544 | 56.0 | 4.60 |
| 10 | | −1.462 | ASP | 0.040 | | | | |
| 11 | Lens 5 | 2.728 | ASP | 0.340 | Plastic | 1.660 | 20.4 | −13.09 |
| 12 | | 1.971 | ASP | 0.521 | | | | |
| 13 | Lens 6 | 3.184 | ASP | 0.350 | Plastic | 1.511 | 56.8 | −5.25 |
| 14 | | 1.402 | ASP | 0.300 | | | | |
| 15 | Filter | Plano | | 0.210 | Glass | 1.517 | 64.2 | — |
| 16 | | Plano | | 0.510 | | | | |
| 17 | Image | Plano | | — | | | | |

Reference wavelength is 587.6 nm (d-line).
Effective radius of Stop on Surface 6 is 0.990 mm.

TABLE 24

Aspheric Coefficients

| Surface # | | | | | |
|---|---|---|---|---|---|
| 2 | 3 | 4 | 5 | 7 | 8 |

| | 2 | 3 | 4 | 5 | 7 | 8 |
|---|---|---|---|---|---|---|
| k = | 1.1929E−01 | −9.4727E+01 | −9.9000E+01 | −1.5689E+01 | −4.4747E+01 | −9.9000E+01 |
| A4 = | −8.1933E−03 | −1.0336E−01 | −1.6063E−01 | −6.8406E−02 | −1.6044E−01 | −1.0498E−01 |
| A6 = | 1.3222E−02 | 1.2461E−01 | 3.2697E−01 | 2.4706E−01 | 1.2792E−01 | 6.5582E−02 |
| A8 = | −4.0956E−02 | 1.8111E−03 | −1.7072E−01 | −2.5563E−01 | −5.1425E−01 | −1.2241E−01 |
| A10 = | 3.8576E−02 | −1.5828E−01 | −9.3184E−02 | 2.1133E−01 | 9.8225E−01 | 1.2927E−01 |
| A12 = | −1.8634E−02 | 1.2311E−01 | 1.5156E−01 | −1.4691E−01 | −1.1282E+00 | −8.3758E−02 |
| A14 = | −1.5629E−03 | −3.1240E−02 | −4.4827E−02 | 7.0800E−02 | 6.6253E−01 | 3.0649E−02 |
| A16 = | | | | | −1.4010E−01 | −3.2528E−03 |

| | Surface # | | | | | |
|---|---|---|---|---|---|---|

| | 9 | 10 | 11 | 12 | 13 | 14 |
|---|---|---|---|---|---|---|
| k = | −6.2725E+00 | −1.5286E+00 | 1.3668E−02 | −1.6078E+00 | −3.5359E+01 | −7.0632E+00 |
| A4 = | −1.7817E−02 | −1.1705E−02 | −1.3062E−01 | −1.5095E−01 | −2.3132E−01 | −1.4465E−01 |
| A6 = | 7.3036E−02 | 4.4642E−02 | 3.8617E−02 | 6.5293E−02 | 8.3550E−02 | 6.4228E−02 |
| A8 = | −4.5582E−02 | −3.8735E−02 | −1.8471E−02 | −2.6317E−02 | −1.4417E−02 | −2.2142E−02 |
| A10 = | 2.0941E−02 | 3.7107E−02 | 3.7801E−03 | 6.5902E−03 | 2.1580E−03 | 5.4300E−03 |
| A12 = | −5.5919E−03 | −1.5035E−02 | −8.1126E−04 | −9.2379E−04 | −3.8381E−04 | −8.5000E−04 |
| A14 = | 5.1351E−04 | 2.3061E−03 | 1.6766E−04 | 7.0135E−05 | 4.6868E−05 | 7.4693E−05 |
| A16 = | | −8.9059E−05 | | −2.5032E−06 | −2.3118E−06 | −2.7523E−06 |

| 12th Embodiment | | | |
|---|---|---|---|
| f [mm] | 3.98 | (T23 + T34)/T56 | 1.19 |
| Fno | 1.76 | (R3 − R4)/(R3 + R4) | 0.52 |
| HFOV [deg.] | 38.8 | f/f3 | 0.08 |
| V2 + V3 + V5 | 61.2 | f1/f3 | 0.07 |
| (N3/V3) + (N5/V5) | 0.16 | f1/f4 | 0.79 |
| f/CT3 | 8.16 | f5/f6 | 2.49 |
| CT1/CT2 | 3.03 | (f/f1) + (f/f2) | 0.67 |
| CT1/CT3 | 1.43 | EPD/TD | 0.57 |
| CT4/T56 | 1.19 | SD/TD | 0.90 |
| T34/CT3 | 0.51 | TL/ImgH | 1.53 |
| T56/CT6 | 1.49 | TL/f | 1.26 |
| T12/T23 | 0.19 | tan(HFOV) | 0.80 |
| T12/T56 | 0.13 | Yc62/f | 0.26 |

13th Embodiment

Figure 26:
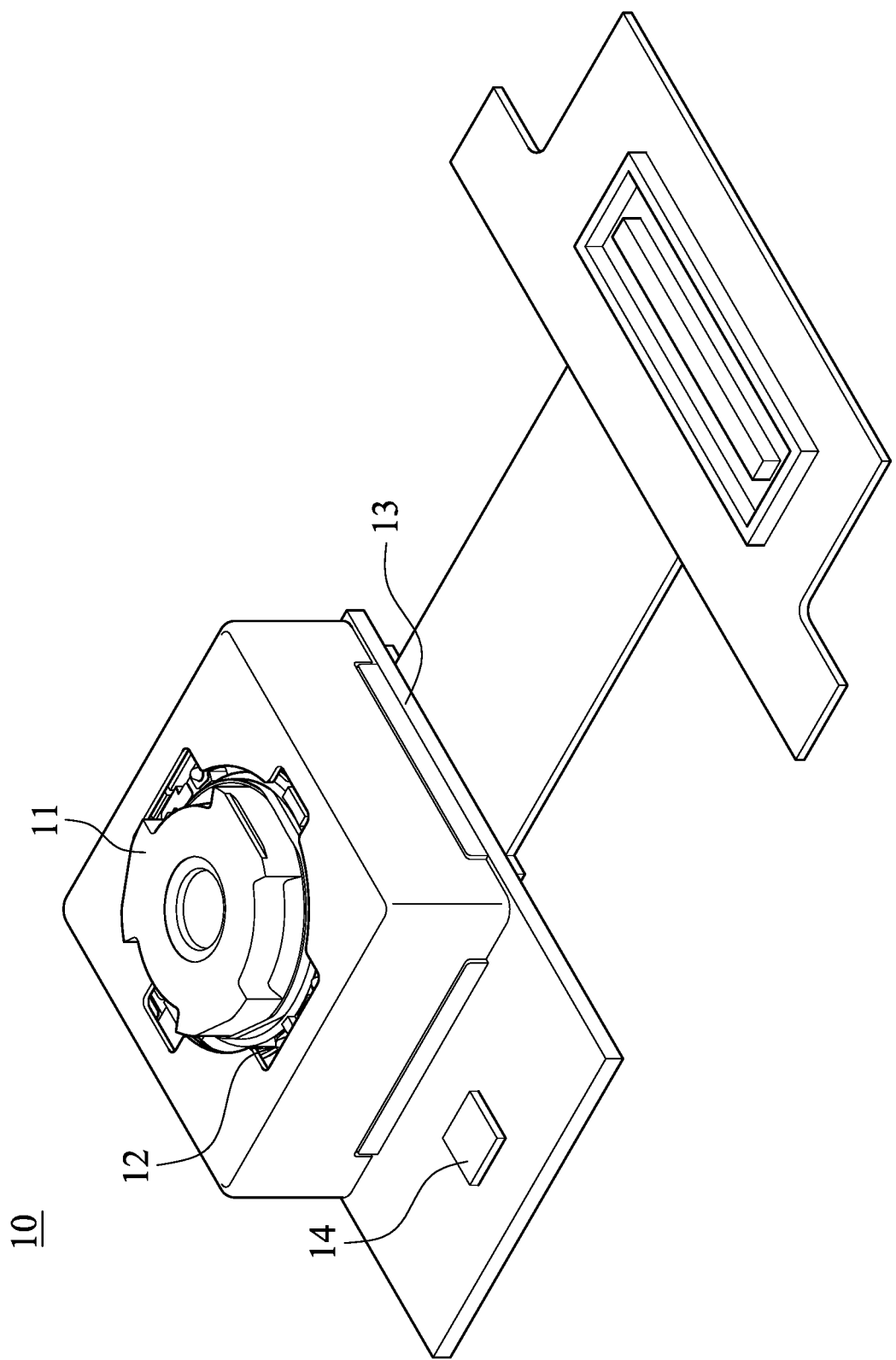
FIG. 26 is a three-dimensional schematic view of an imaging apparatus according to the 13th embodiment of the present disclosure.

FIG. 26 is a three-dimensional schematic view of an imaging apparatus 10 according to the 13th embodiment of the present disclosure. In FIG. 26, the imaging apparatus 10 of the 13th embodiment is a camera module, the imaging apparatus 10 includes an imaging lens assembly 11, a driving apparatus 12 and an image sensor, wherein the imaging lens assembly 11 includes the image capturing assembly of the 1st embodiment and a lens barrel (not shown in drawings) for carrying the image capturing assembly 11. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image capturing assembly can obtain a favorable imaging position by the driving apparatus 12 so as to capture clear images when the imaged object is disposed at different object distances.

The imaging apparatus 10 can include the image sensor 13 located on the image surface of the image capturing assembly 11, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an Jo accelerometer, a gyroscope, and a Hall Effect sensor. In the 13th embodiment, the image stabilization module 14 is a gyroscope, but is not limited thereto. Therefore, the variation of different axial directions of the image capturing assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

14th Embodiment

Figure 27A:
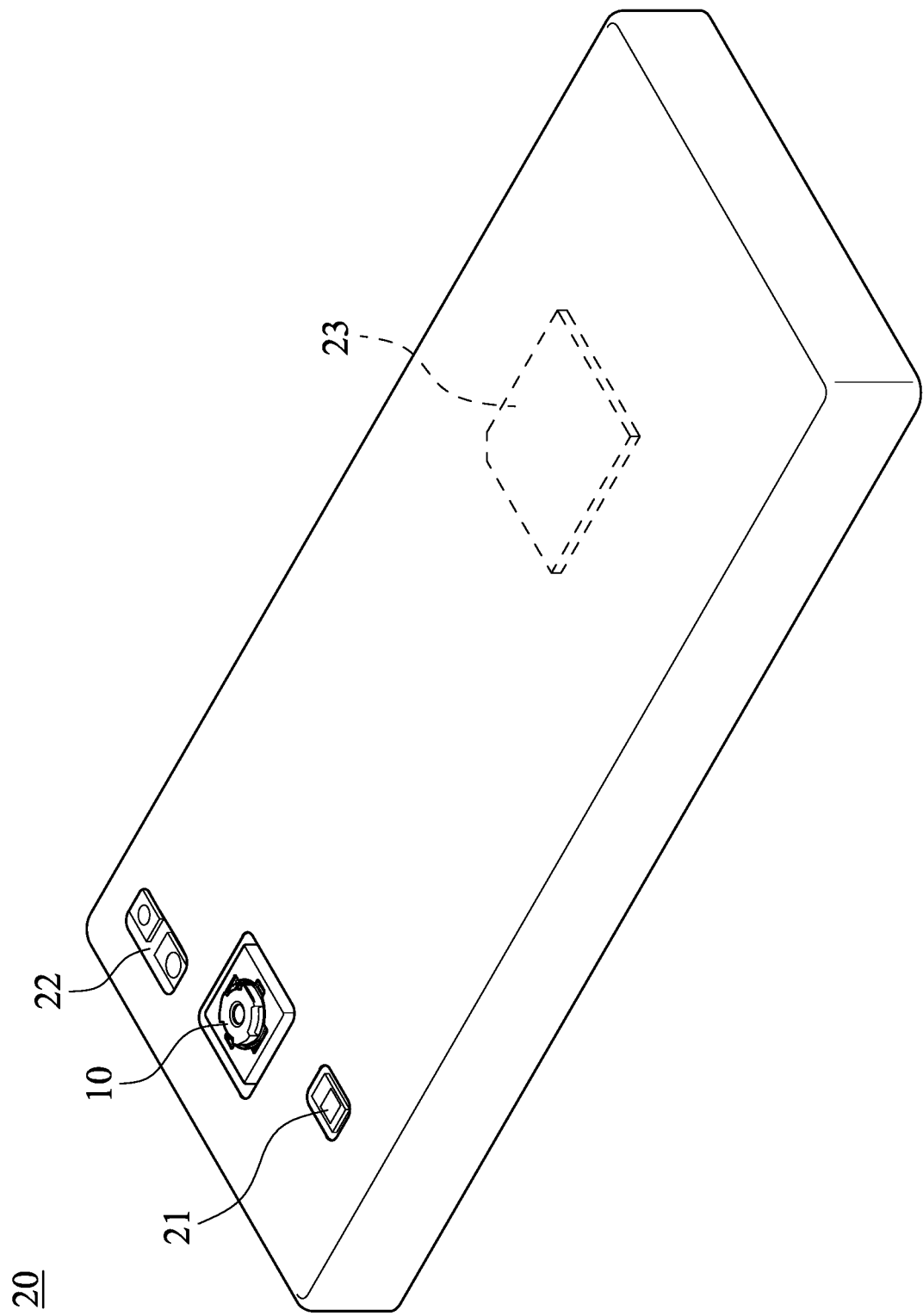
FIG. 27A is a schematic view of one side of an electronic device according to the 14th embodiment of the present disclosure.
Figure 27B:
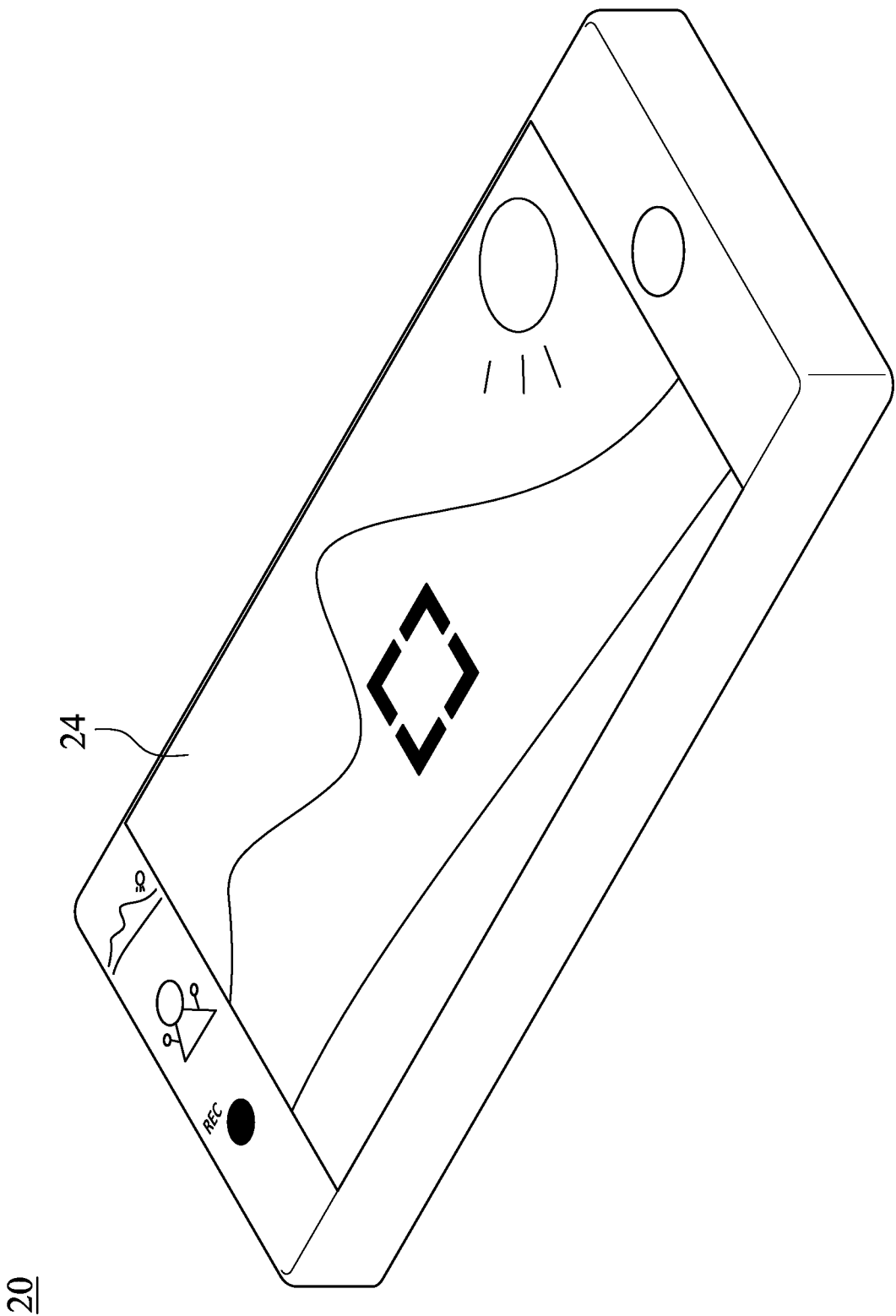
FIG. 27B is a schematic view of another side of the electronic device of FIG. 27A.
Figure 27C:
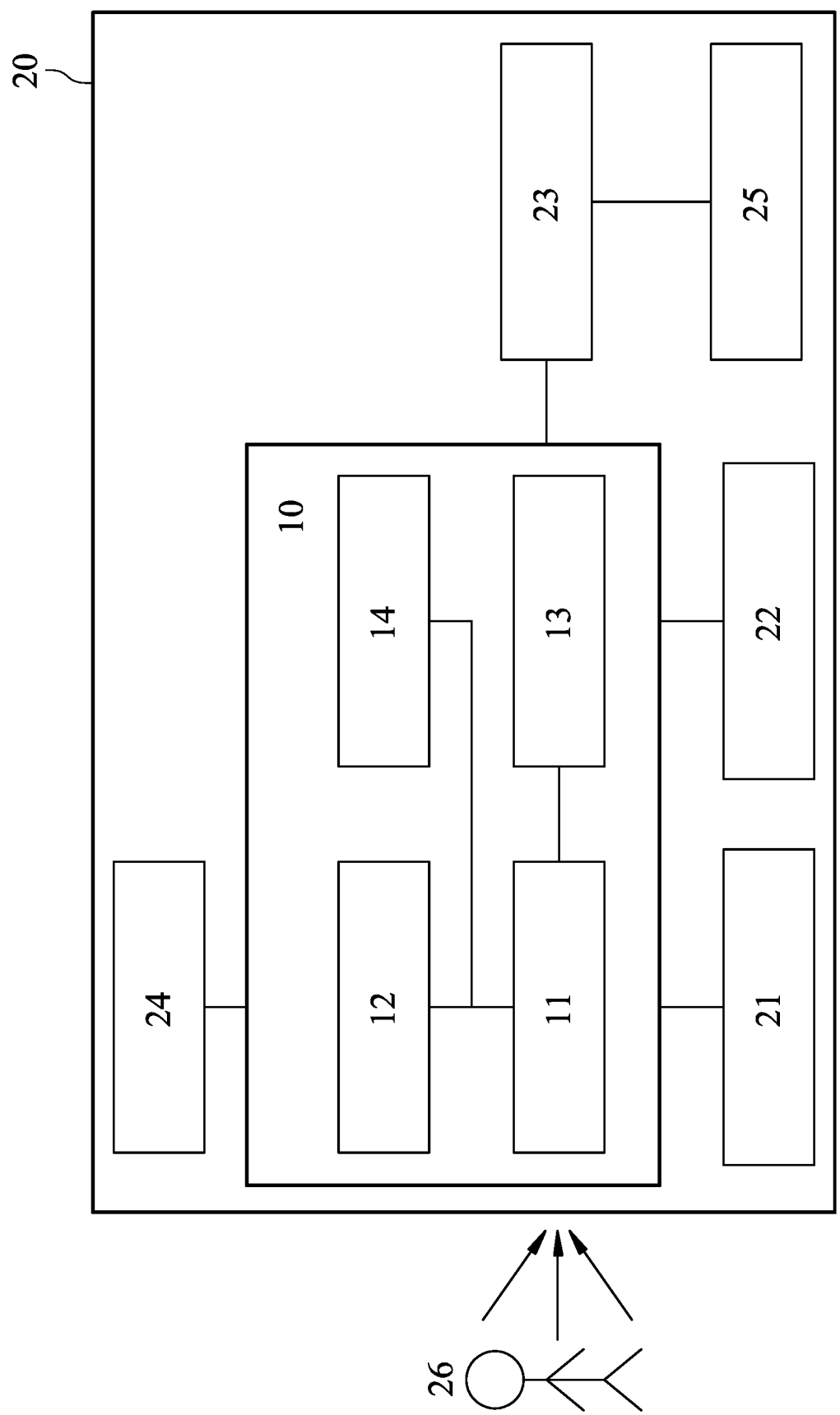
FIG. 27C is a system schematic view of the electronic device of FIG. 27A.

FIG. 27A is a schematic view of one side of an electronic device 20 according to the 14th embodiment of the present disclosure. FIG. 27B is a schematic view of another side of the electronic device 20 of FIG. 27A. FIG. 27C is a system schematic view of the electronic device 20 of FIG. 27A. In FIGS. 27A, 27B and 27C, the electronic device 20 according to the 14th embodiment is a smartphone, wherein the electronic device 20 includes the imaging apparatus 10, a flash module 21, a focusing assisting module 22, an image signal processor 23, a user interface 24 and an image software processor 25. When the user captures images of an imaged object 26 via the user interface 24, the electronic device 20 focuses and generates an image via the imaging apparatus 10 while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

The imaging apparatus 10 according to the 14th embodiment is the same as the imaging apparatus 10 according to the 13th embodiment, and will not describe again herein.

15th Embodiment

FIG. 28 is a schematic view of an electronic device 30 according to the 15th embodiment of the present disclosure. The electronic device 30 of the 15th embodiment is a tablet personal computer, wherein the electronic device 30 includes an imaging apparatus 31, wherein the imaging apparatus 31 is the same as stated in the 13th embodiment, and will not describe again herein.

16th Embodiment

Figure 29:
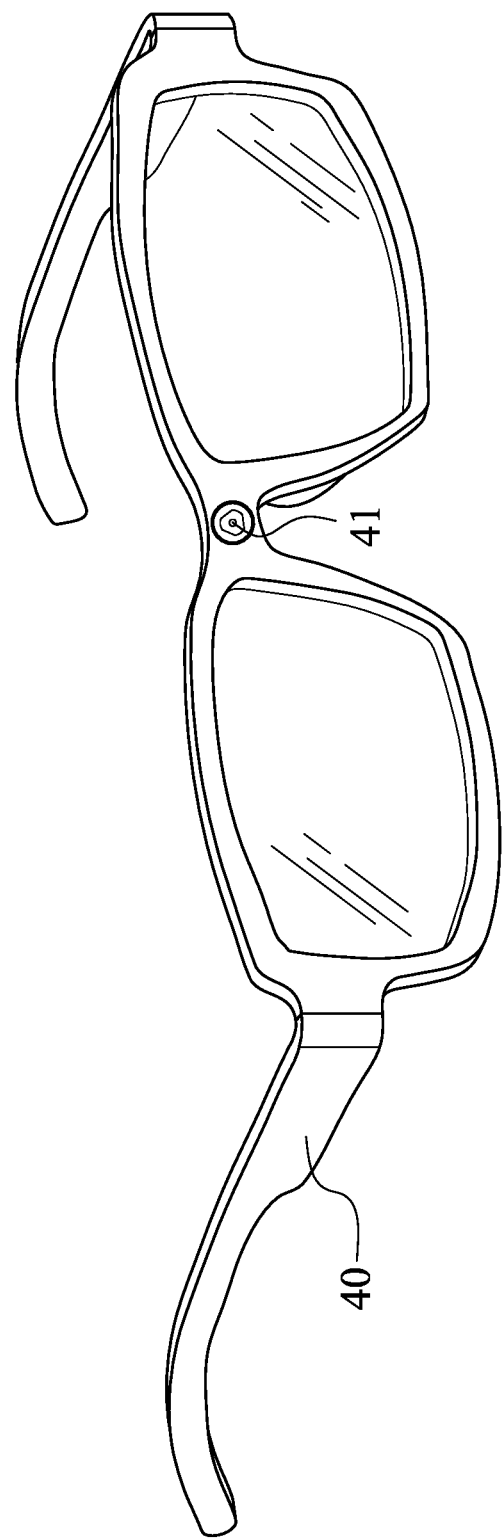
FIG. 29 is a schematic view of an electronic device according to the 16th embodiment of the present disclosure.

FIG. 29 is a schematic view of an electronic device 40 according to the 16th embodiment of the present disclosure. The electronic device 40 of the 16th embodiment is a wearable device, wherein the electronic device 40 includes an imaging apparatus 41, wherein the imaging apparatus 41 is the same as stated in the 13th embodiment, and will not describe again herein.

The foregoing description, for purpose of explanation, has been described with reference to specific embodiments. It is to be noted that Tables 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. An image capturing assembly comprising six lens elements, the six lens elements being, in order from an object side to an image side:
   a first lens element having positive refractive power;
   a second lens element;
   a third lens element;

a fourth lens element with positive refractive power having an image-side surface being convex in a paraxial region thereof;

a fifth lens element having an image-side surface being concave in a paraxial region thereof; and a sixth lens element having an image-side surface being concave in a paraxial region thereof, wherein the image-side surface of the sixth lens element comprises at least one inflection point;

wherein an Abbe number of the second lens element is V2, an Abbe number of the third lens element is V3, an Abbe number of the fifth lens element is V5, a focal length of the image capturing assembly is f, a central thickness of the third lens element is CT3, a focal length of the first lens element is f1, a focal length of the third lens element is f3, an axial distance between the second lens element and the third lens element is T23, an axial distance between the third lens element and the fourth lens element is T34, an axial distance between the fifth lens element and the sixth lens element is T56, and the following conditions are satisfied:

$30.0 < V2+V3+V5 < 90.0$;

$1.50 < f/CT3 \leq 8.63$;

$-1.0 < f1/f3 < 0.40$; and $(T23+T34)/T56 < 0.87$.

2. The image capturing assembly of claim 1, wherein the second lens element has negative refractive power, and the sixth lens element has negative refractive power.

3. The image capturing assembly of claim 1, further comprising:

an aperture stop located on an object side of the second lens element, wherein an axial distance between the aperture stop and the image-side surface of the sixth lens element is SD, an axial distance between an object-side surface of the first lens element and the image-side surface of the sixth lens element is TD, and the following condition is satisfied:

$0.85 < SD/TD < 0.98$.

4. The image capturing assembly of claim 3, wherein the axial distance between the aperture stop and the image-side surface of the sixth lens element is SD, the axial distance between the object-side surface of the first lens element and the image-side surface of the sixth lens element is TD, and the following condition is satisfied:

$0.90 \leq SD/TD < 0.98$.

5. The image capturing assembly of claim 1, wherein the focal length of the image capturing assembly is f, the focal length of the first lens element is f1, a focal length of the second lens element is f2, and the following condition is satisfied:

$0.40 < (f/f1)+(f/f2) < 1.0$.

6. The image capturing assembly of claim 5, wherein the focal length of the image capturing assembly is f, the focal length of the first lens element is f1, the focal length of the second lens element is f2, and the following condition is satisfied:

$0.45 < (f/f1)+(f/f2) < 0.74$.

7. The image capturing assembly of claim 1, wherein the focal length of the image capturing assembly is f, the central thickness of the third lens element is CT3, and the following condition is satisfied:

$1.50 < f/CT3 < 7.30$.

8. The image capturing assembly of claim 1, wherein an axial distance between the first lens element and the second lens element is T12, the axial distance between the second lens element and the third lens element is T23, and the following condition is satisfied:

$0 < T12/T23 < 0.80$.

9. The image capturing assembly of claim 1, wherein the axial distance between the fifth lens element and the sixth lens element is T56, a central thickness of the sixth lens element is CT6, and the following condition is satisfied:

$1.20 < T56/CT6 < 3.50$.

10. The image capturing assembly of claim 1, wherein the focal length of the first lens element is f1, a focal length of the fourth lens element is f4, and the following condition is satisfied:

$0.50 < f1/f4 < 1.80$.

11. The image capturing assembly of claim 10, wherein the focal length of the first lens element is f1, the focal length of the fourth lens element is f4, and the following condition is satisfied:

$0.75 < f1/f4 < 1.30$.

12. The image capturing assembly of claim 1, wherein an axial distance between an object-side surface of the first lens element and an image surface is TL, the focal length of the image capturing assembly is f, and the following condition is satisfied:

$1.20 < TL/f < 1.45$.

13. The image capturing assembly of claim 1, wherein an entrance pupil diameter of the image capturing assembly is EPD, an axial distance between an object-side surface of the first lens element and the image-side surface of the sixth lens element is TD, and the following condition is satisfied:

$0.35 < EPD/TD < 1.0$.

14. The image capturing assembly of claim 1, wherein a central thickness of the fourth lens element is CT4, the axial distance between the fifth lens element and the sixth lens element is T56, and the following condition is satisfied:

$0.60 < CT4/T56 < 1.50$.

15. The image capturing assembly of claim 14, wherein the central thickness of the fourth lens element is CT4, the axial distance between the fifth lens element and the sixth lens element is T56, and the following condition is satisfied:

$0.70 < CT4/T56 < 1.25$.

16. The image capturing assembly of claim 1, wherein an axial distance between the first lens element and the second lens element is T12, the axial distance between the fifth lens element and the sixth lens element is T56, and the following condition is satisfied:

$0 < T12/T56 < 0.21$.

17. The image capturing assembly of claim 1, wherein a focal length of the fifth lens element is f5, a focal length of the sixth lens element is f6, and the following condition is satisfied:

$f5/f6 < 2.75$.

18. The image capturing assembly of claim 1, wherein a central thickness of the first lens element is CT1, a central thickness of the second lens element is CT2, and the following condition is satisfied:

$CT1/CT2<3.15.$

19. An imaging apparatus, comprising:
the image capturing assembly of claim 1;
a driving apparatus connected to the image capturing assembly; and
an image sensor, wherein the image sensor is disposed on an image surface of the image capturing assembly.

20. An electronic device, comprising:
the imaging apparatus of claim 19.

21. An image capturing assembly comprising six lens elements, the six lens elements being, in order from an object side to an image side:
a first lens element having positive refractive power;
a second lens element;
a third lens element;
a fourth lens element with positive refractive power having an image-side surface being convex in a paraxial region thereof;
a fifth lens element having an object-side surface being convex in a paraxial region thereof and an image-side surface being concave in a paraxial region thereof; and
a sixth lens element having an image-side surface being concave in a paraxial region thereof, wherein the image-side surface of the sixth lens element comprises at least one inflection point;
wherein an Abbe number of the second lens element is V2, an Abbe number of the third lens element is V3, an Abbe number of the fifth lens element is V5, a central thickness of the first lens element is CT1, a central thickness of the third lens element is CT3, a focal length of the image capturing assembly is f, a focal length of the third lens element is f3, an axial distance between the second lens element and the third lens element is T23, an axial distance between the third lens element and the fourth lens element is T34, an axial distance between the fifth lens element and the sixth lens element is T56, and the following conditions are satisfied:

$30.0<V2+V3+V5<90.0;$ $0.15<CT1/CT3<1.50;$ $-1.80<f/f3<0.25;$ $1.50<f/CT3\leq 8.63;$ and $(T23+T34)/T56<0.87.$ 22. The image capturing assembly of claim 21, wherein the sixth lens element has an object-side surface being convex in a paraxial region thereof.

23. The image capturing assembly of claim 21, wherein the third lens element has negative refractive power.

24. The image capturing assembly of claim 21, wherein the central thickness of the first lens element is CT1, the central thickness of the third lens element is CT3, and the following condition is satisfied:

$0.35<CT1/CT3<1.30.$

25. The image capturing assembly of claim 21, wherein the Abbe number of the second lens element is V2, the Abbe number of the third lens element is V3, the Abbe number of the fifth lens element is V5, and the following condition is satisfied:

$35.0<V2+V3+V5<72.0.$

26. The image capturing assembly of claim 21, wherein a focal length of the fifth lens element is f5, a focal length of the sixth lens element is f6, and the following condition is satisfied:

$f5/f6<2.75.$

27. The image capturing assembly of claim 21, wherein the axial distance between the third lens element and the fourth lens element is T34, the central thickness of the third lens element is CT3, and the following condition is satisfied:

$0.22\leq T34/CT3<0.55.$

28. The image capturing assembly of claim 21, wherein a vertical distance between a non-axial critical point on the image-side surface of the sixth lens element and an optical axis is Yc62, a focal length of the image capturing assembly is f, and the following condition is satisfied:

$0.10<Yc62/f<1.0.$

29. The image capturing assembly of claim 21, wherein a curvature radius of an object-side surface of the second lens element is R3, a curvature radius of an image-side surface of the second lens element is R4, and the following condition is satisfied:

$-0.10<(R3-R4)/(R3+R4)<1.15.$

30. The image capturing assembly of claim 21, wherein at least one surface of the fifth lens element comprises at least one inflection point, a refractive index of the third lens element is N3, a refractive index of the fifth lens element is N5, the Abbe number of the third lens element is V3, the Abbe number of the fifth lens element is V5, and the following condition is satisfied:

$0.12<(N3/V3)+(N5/V5)<0.25.$

31. The image capturing assembly of claim 21, wherein an axial distance between an object-side surface of the first lens element and an image surface is TL, a maximum image height of the image capturing assembly is ImgH, a half of a maximum field of view of the image capturing assembly is HFOV, an f-number of the image capturing assembly is Fno, and the following conditions are satisfied:

$TL/ImgH<2.0;$ $0.75<\tan(HFOV)<1.40;$ and $1.20<Fno<2.20.$

* * * * *